(12) United States Patent
Mishiba et al.

(10) Patent No.: US 11,760,247 B2
(45) Date of Patent: Sep. 19, 2023

(54) DYNAMIC DAMPER, HEADREST, AND VEHICULAR SEAT

(71) Applicant: TS TECH CO., LTD., Asaka (JP)

(72) Inventors: Kazuhiro Mishiba, Tochigi (JP); Tadashi So, Tochigi (JP); Taro Murayama, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 112 days.

(21) Appl. No.: 17/422,926

(22) PCT Filed: Jan. 10, 2020

(86) PCT No.: PCT/JP2020/000657
§ 371 (c)(1),
(2) Date: Jul. 14, 2021

(87) PCT Pub. No.: WO2020/149231
PCT Pub. Date: Jul. 23, 2020

(65) Prior Publication Data
US 2022/0089076 A1    Mar. 24, 2022

(30) Foreign Application Priority Data

Jan. 16, 2019  (JP) ................................ 2019-005572
Jan. 16, 2019  (JP) ................................ 2019-005573
(Continued)

(51) Int. Cl.
*B60N 2/879*    (2018.01)
*F16F 7/108*    (2006.01)

(52) U.S. Cl.
CPC .............. *B60N 2/879* (2018.02); *F16F 7/108* (2013.01); *F16F 2222/08* (2013.01); *F16F 2230/0011* (2013.01); *F16F 2232/08* (2013.01)

(58) Field of Classification Search
CPC ...... B60N 2/879; F16F 7/108; F16F 2222/08; F16F 2230/0011; F16F 2232/08
See application file for complete search history.

(56) References Cited

U.S. PATENT DOCUMENTS 9,387,784 B2 *   7/2016  Haga ......................... B60N 2/80
9,452,697 B2 *   9/2016  Okubo ..................... B60N 2/68
(Continued)

FOREIGN PATENT DOCUMENTS

JP          2002/242986 A      8/2002
JP          2004/301219 A     10/2004
(Continued)

OTHER PUBLICATIONS

International Search Report and Written Opinion with English Translation issued in PCT/JP2020/000657, dated Mar. 10, 2020 (8pages).

(Continued)

*Primary Examiner* — Philip F Gabler
(74) *Attorney, Agent, or Firm* — Dority & Manning, P.A.

(57) ABSTRACT

A dynamic damper is provided which includes a weight, an elastic member that supports the weight so as to allow vibration, and a damper case that houses the weight and the elastic member, wherein the dynamic damper also includes corner part checking means for checking at least some corner parts among corner parts where at least one end face of the weight and first and second side faces that are each continuous from the one end face and are adjacent to each other meet. This enables the ease of assembly to be enhanced by enabling a corner part of a weight to be checked when assembling the weight into a damper case, and also enables the state in which the elastic member is mounted on an end part of the weight to be easily checked.

11 Claims, 38 Drawing Sheets

(30) Foreign Application Priority Data

| | | | |
|---|---|---|---|
| Feb. 22, 2019 | (JP) | ................................ | 2019-031038 |
| Aug. 27, 2019 | (JP) | ................................ | 2019-154551 |
| Dec. 19, 2019 | (JP) | ................................ | 2019-228854 |

(56) References Cited

U.S. PATENT DOCUMENTS

| | | | | |
|---|---|---|---|---|
| 9,981,586 B2* | 5/2018 | Mizobata | ................. | B60N 2/80 |
| 9,981,587 B2* | 5/2018 | Mizobata | ................. | B60N 2/80 |
| 10,150,394 B2* | 12/2018 | Kobayashi | ............... | B60N 2/80 |
| 10,227,026 B2* | 3/2019 | Takahashi | ................ | B60N 2/80 |
| 10,384,377 B2* | 8/2019 | Mizobata | ............ | B29C 44/1257 |
| 10,647,234 B2* | 5/2020 | Okubo | ..................... | B60N 2/80 |
| 11,440,453 B2* | 9/2022 | Tamhankar | ............ | B60N 2/879 |
| 2014/0077565 A1* | 3/2014 | Baumgarten | ........... | B60N 2/885 |
| | | | | 297/404 |
| 2015/0159721 A1 | 6/2015 | Okubo | | |
| 2016/0339816 A1* | 11/2016 | Mizobata | ................. | B60N 2/68 |
| 2017/0225597 A1 | 8/2017 | Okubo | | |
| 2018/0178695 A1 | 6/2018 | Okubo | | |
| 2019/0084460 A1 | 3/2019 | Okubo | | |

FOREIGN PATENT DOCUMENTS

| | | |
|---|---|---|
| JP | 2006312983 | 11/2006 |
| JP | 2014/213793 A | 11/2014 |
| JP | 2014213746 | 11/2014 |
| JP | 2016/215772 A | 12/2016 |
| JP | 2016/215775 A | 12/2016 |

OTHER PUBLICATIONS

Japanese Notice for Reasons for Refusal (w/ English translation) for corresponding Application No. JP 2019-005573, dated Feb. 24, 2023, 6 pages.

* cited by examiner

FIG.10
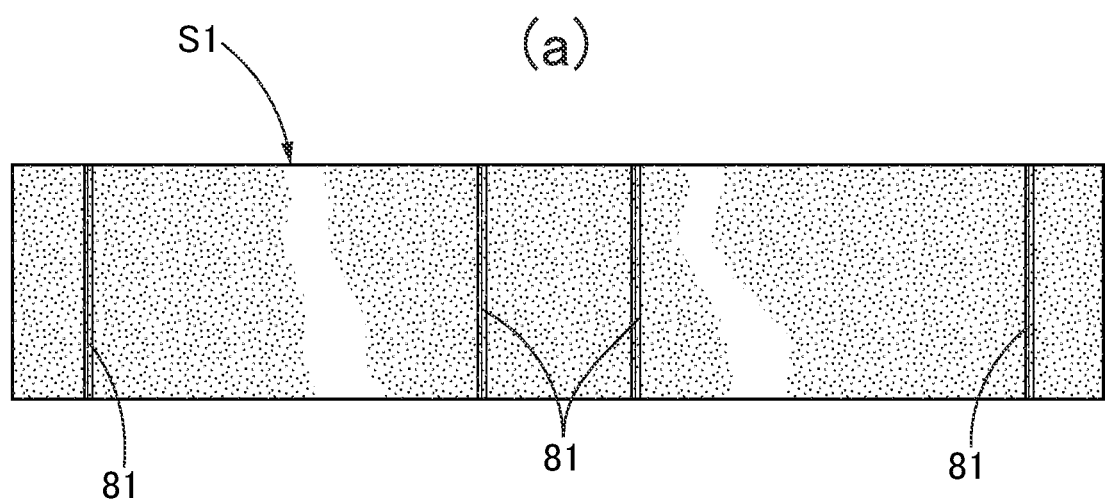
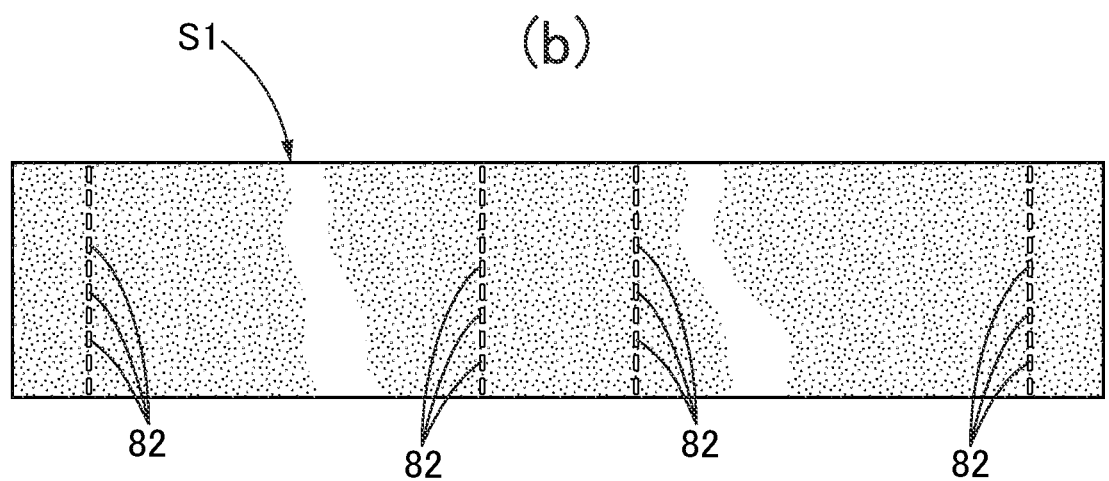

FIG.29
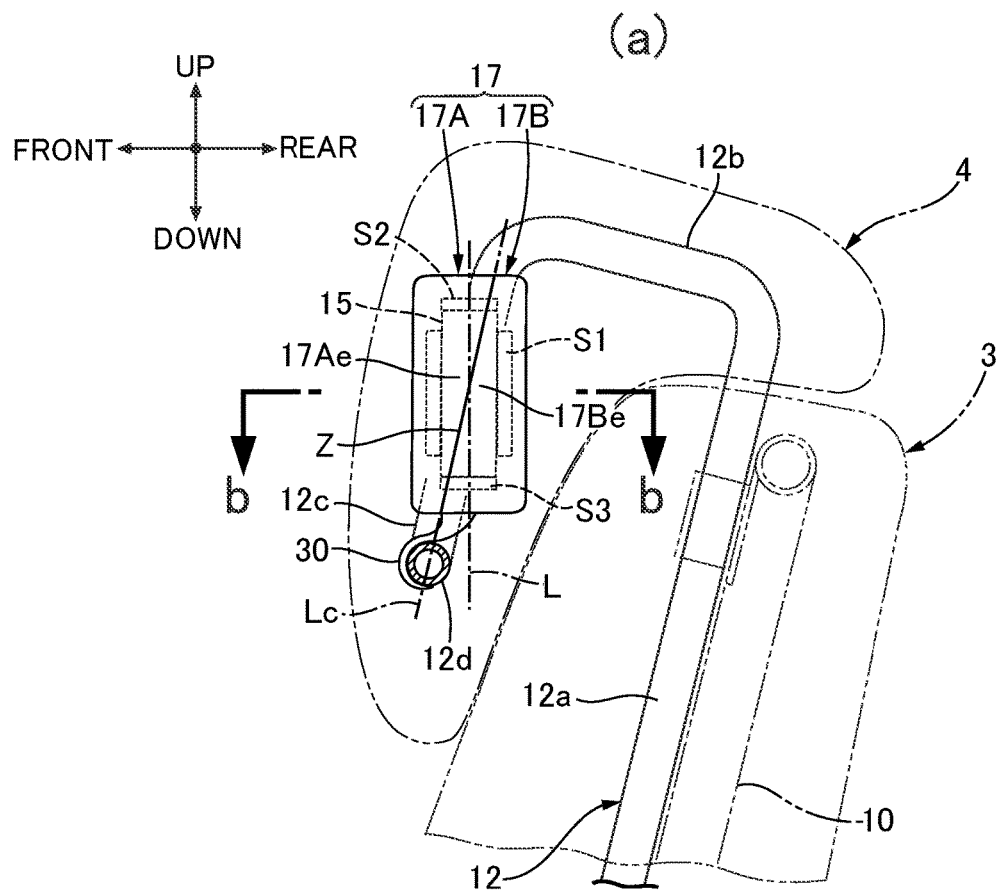
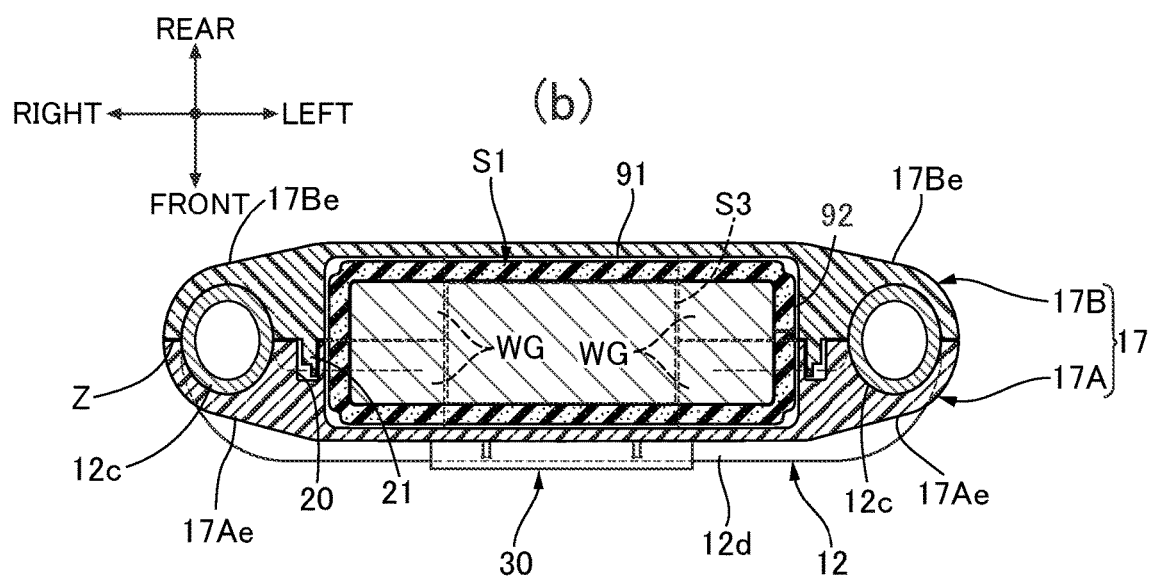

FIG.38
(a)
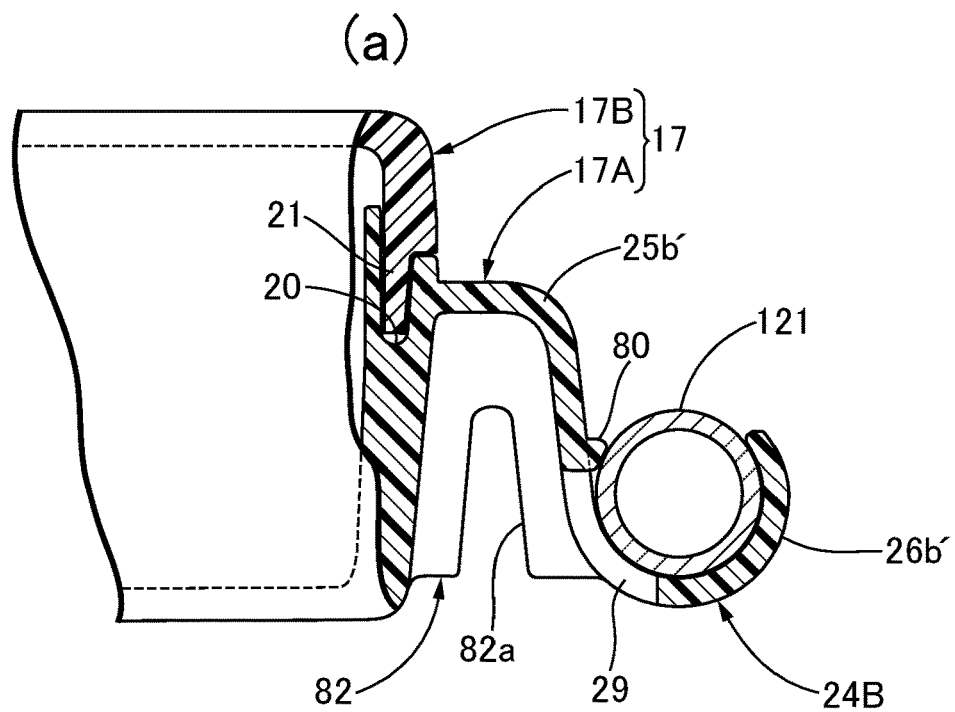
(b)
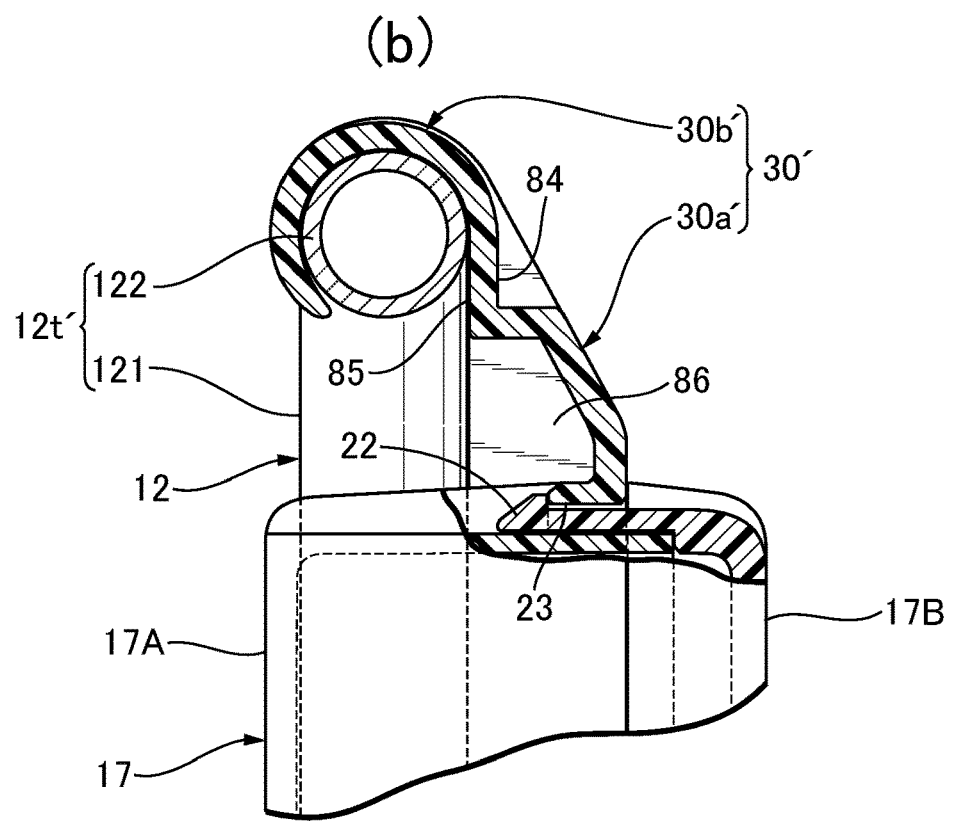

DYNAMIC DAMPER, HEADREST, AND VEHICULAR SEAT

CROSS REFERENCE TO RELATED APPLICATIONS

This application is the U.S. national stage entry of International Application No. PCT/JP2020/000657 filed under the Patent Cooperation Treaty and having a filing date of Jan. 10, 2020, which claims priority to Japanese Patent Application No. 2019-005572 having a filing date of Jan. 16, 2019, Japanese Patent Application No. 2019-005573 having a filing date of Jan. 16, 2019, Japanese Patent Application No. 2019-031038 having a filing date of Feb. 22, 2019, Japanese Patent Application No. 2019-154551 having a filing date of Aug. 27, 2019, and Japanese Patent Application No. 2019-228854 having a filing date of Dec. 19, 2019, all of which are incorporated herein by reference.

TECHNICAL FIELD

The present invention relates to a dynamic damper that includes a weight and an elastic member supporting the weight so that the weight can vibrate, and a vehicular seat that has the dynamic damper provided on a headrest or a seat back.

BACKGROUND ART

An arrangement in which a dynamic damper as above is applied to for example a vehicular seat and utilized for reducing vibration of the seat is conventionally known, as disclosed in Patent Document 1.

PRIOR ART DOCUMENTS

Patent Documents

Patent Document 1: Japanese Patent No. 6110853

SUMMARY OF THE INVENTION

Problems to be Solved by the Invention

First Problem

The dynamic damper disclosed in Patent Document 1 includes a damper case that houses a weight and an elastic member, and since the entire face of the weight is covered by the elastic member, the weight cannot be incorporated into the damper case while being directly seen, which is a first problem.

However, if a corner part of the weight can be seen directly when incorporating the weight and the elastic member into the damper case, since positioning of the weight with respect to an inner face of the damper case can be directly and easily carried out, this is effective in terms of enhancing the ease of assembly of the weight, and it is also effective in terms of checking the state in which the elastic member is mounted on an end part of the weight.

The present invention has been accomplished in light of the above circumstances, and it is a first object thereof to provide a dynamic damper that enables the ease of assembly to be enhanced by enabling a corner part of a weight to be checked when assembling the weight into a damper case, and that enables the state in which the elastic member is mounted on an end part of the weight to be easily checked, and to provide a headrest and vehicular seat that are equipped with the dynamic damper.

Second Problem

In the dynamic damper disclosed in Patent Document 1 above, since movement restriction means for restricting movement of the weight in a specific direction is not provided, the weight vibrates in all directions of the seat such as fore-and-aft, left-and-right, and up-and-down directions, so as to be able to exhibit a damping function.

However, depending on the object to be damped (for example, a vehicular seat), it can be expected that vibration only in a specific direction will be desirably damped by a dynamic damper. In this case, if the weight is displaced and vibrates in a direction other than the specific direction, the weight unnecessarily moves accordingly, and there is a possibility that a damping effect for vibration in the specific direction that is originally desired to be damped will be degraded, which is a second problem.

The present invention has been accomplished in light of the above circumstances, and it is a second object thereof to provide a dynamic damper that can restrict movement of a weight in a predetermined direction and enables a damping effect for vibration in a specific direction that is originally desired to be damped to be efficiently exhibited, and to provide a headrest and vehicular seat that are equipped with the dynamic damper.

Third Problem

In a vehicular seat equipped with a dynamic damper as disclosed in Patent Document 1, a frame of a headrest has an inclined pillar part that extends while being inclined upward to the rear in order to support a damper case housing a weight and an elastic member and a headrest cushion member. Because the damper case is disposed in a rearwardly-inclined attitude so as to follow the inclined pillar part, which is inclined rearward, the weight, which extends in the up-and-down direction within the damper case, is also disposed in the same rearwardly-inclined attitude.

Because of this, when the weight vibrates in the fore-and-aft direction due to travel vibration, etc., a rearward-facing component of the self-weight of the weight due to the rearwardly-inclined attitude acts so as to bias the weight somewhat rearward, it becomes impossible to make the weight vibrate smoothly in the fore-and-aft direction with good balance, and there is a possibility that the damping effect by the dynamic damper will be somewhat impaired, which is a third problem.

The present invention has been accomplished in light of the above circumstances, and it is a third object thereof to provide a dynamic damper that enables a damping effect for vibration in the fore-and-aft direction to be efficiently exhibited by enabling the weight to vibrate in the fore-and-aft direction with good balance while not being affected by the self-weight of the weight, and to provide a vehicular seat that is equipped with the dynamic damper.

Means for Solving the Problems

Solution Means for First Problem

In order to achieve the first object, according to a first aspect of the present invention, there is provided a dynamic damper comprising a weight, an elastic member that supports the weight so that the weight can vibrate, and a damper case that houses the weight and the elastic member, characterized in that the dynamic damper comprises corner part checking means for checking at least some corner parts among corner parts where at least one end face of the weight and first and second side faces that are each continuous from the one end face and are adjacent to each other meet.

Further, according to a second aspect of the present invention in addition to the first aspect, the elastic member comprises a first elastic member that covers an outside face between one end face and another end face of the weight over substantially an entire periphery, and second and third elastic members that each provide a join between the one end face and the other end face of the weight and an inner face of the damper case.

Furthermore, according to a third aspect of the present invention, in addition to the second aspect, the corner part checking means is formed from a cutout part that is formed in the first elastic member so as to expose at least some of the corner parts among a plurality of the corner parts of the weight.

Moreover, according to a fourth aspect of the present invention, in addition to the second aspect, the first elastic member is formed into an end part shape that exposes at least one end part of the weight that includes at least two of the corner parts, and the end part shape forms the corner part checking means.

Further, according to a fifth aspect of the present invention, in addition to any one of the second to fourth aspects, the weight is formed so as to have a polygonal cross section, the first elastic member has a bent part that corresponds to a corner of a side face of the weight, and the bent part is provided with bending facilitation means that makes bending of the first elastic member easier via the bent part than via a part other than the bent part.

Further, according to a sixth aspect of the present invention, in addition to any one of the second to fifth aspects, the first elastic member and the second and third elastic members are formed from different elastic materials.

Furthermore, according to a seventh aspect of the present invention, in addition to the sixth aspect, the bending facilitation means is formed from a thin part that is formed in part of the first elastic member so as to correspond to a corner of a side face of the weight.

Moreover, according to an eighth aspect of the present invention, in addition to any one of the second to seventh aspects, the first elastic member is disposed so as to be spaced from at least one of the second and third elastic members.

Further, according to a ninth aspect of the present invention, in addition to any one of the second to eighth aspects, a friction-reducing member that is positioned on the side opposite to the weight and abuts against an inner face of the damper case is mounted on the second and third elastic members, and the second and third elastic members are disposed in a compressed state between the friction-reducing member and the weight within the damper case.

Furthermore, according to a tenth aspect of the present invention, there is provided a headrest comprising the dynamic damper having any one of the first to ninth aspects, wherein the damper case is retained by a frame or a cushion member of the headrest.

Moreover, according to an eleventh aspect of the present invention, there is provided a vehicular seat comprising the dynamic damper having any one of the first to ninth aspects, wherein the damper case is retained by a cushion member or a frame of at least one of a seat back and a seat cushion.

Solution Means for Second Problem

In order to achieve the second object, according to a twelfth aspect of the present invention, there is provided a dynamic damper that includes a weight (15) and an elastic member (S1 to S3) that supports the weight (15) so that the weight (15) can vibrate, characterized in that the dynamic damper includes movement restriction means (WG) that restricts movement of the weight (15) in a predetermined direction. In accordance with the twelfth aspect, movement of the weight in a predetermined direction is restricted, unnecessary movement of the weight in the predetermined direction can be suppressed, the dynamic damper can thereby efficiently exhibit an effect in damping vibration in the specific direction that is originally desired to be damped, and it becomes easy to optimize (tune) a damping mode according to the mode of vibration of a damping target.

Furthermore, according to a thirteenth aspect of the present invention, in addition to the twelfth aspect, the movement restriction means is formed from a weight guide part (WG) that slidably guides movement of the weight (15) in a specific direction that is different from the predetermined direction. In accordance with the thirteenth aspect, the weight guide part, which slidably guides the weight in the specific direction, functions also as the movement restriction means, the structure can accordingly be simplified, and consequently a contribution can be made to reducing the cost.

Moreover, according to a fourteenth aspect of the present invention, in addition to the twelfth or thirteenth aspect, the dynamic damper includes a damper case (17) that houses the weight (15) and the elastic member (S1 to S3), and the weight guide part (WG) is disposed at a position that avoids the elastic member (S1 to S3) within the damper case (17). In accordance with the fourteenth aspect, since the weight guide part is disposed at a position that avoids the elastic member within the damper case, it is possible to dispose the weight guide part within the damper case without inhibiting smooth elastic deformation of the elastic member.

Furthermore, according to a fifteenth aspect of the present invention, in addition to the fourteenth aspect, the weight guide part (WG) is projectingly provided on an inner face of the damper case (17). In accordance with the fifteenth aspect, it becomes possible to easily form the weight guide part (and consequently the movement restriction means) by utilizing an inner wall of the damper case.

Moreover, according to a sixteenth aspect of the present invention, in addition to the fifteenth aspect, at least a pair of the weight guide parts (WG) are projectingly provided on mutually opposing the inner faces of the damper case (17) respectively. In accordance with the sixteenth aspect, it is possible to stably and appropriately restrict movement of the weight and guide sliding thereof by use of the pair of mutually opposing weight guide parts.

Moreover, according to a seventeenth aspect of the present invention, in addition to the fourteenth to sixteenth aspects, the elastic member includes the first elastic member (S1) that covers an outside face between one end face and the other end face of the weight (15) over substantially the entire periphery, and the second and third elastic members (S2, S3) that each provide a join between the one end face and the other end face of the weight (15) and the inner face of the damper case (17). In accordance with the seventeenth aspect, since the elastic member is formed in a divided manner from the first to third elastic members, compared with a case in which the weight is covered by a single elastic member, it is possible to simplify as much as possible the shape of individual elastic members, and the ease of molding of the elastic member is good. Moreover, due to the first elastic member and the second and third elastic members being formed from different elastic materials, it is possible to optimize selection of materials, setting of hardness, setting of thickness, etc. of the first elastic member and the second and third elastic members depending on the direction of vibration that is to be damped.

Furthermore, according to an eighteenth aspect of the present invention, in addition to the seventeenth aspect, a friction-reducing member (70) that is positioned on a side opposite to the weight (15) and abuts against the inner face of the damper case (17) is mounted on the second and third elastic members (S2, S3), and the second and third elastic members (S2, S3) are disposed in a compressed state between the friction-reducing member (70) and the weight (15) within the damper case (17). In accordance with the eighteenth aspect, is it not only possible to impart to the second and third elastic members sufficient hardness as a damper spring, but it is also possible to easily fix them to an inner face of the damper case via the friction-reducing member without looseness, thus enhancing the ease of assembly of the dynamic damper.

Moreover, according to a nineteenth aspect of the present invention, in addition to the eighteenth aspect, the friction-reducing member (70) is interposed between the weight guide part (WG) and the damper case (17). In accordance with the nineteenth aspect, it is possible, by utilizing effectively a dead space between the weight guide part (and consequently the movement restriction means) and the damper case, to dispose the friction-reducing member without problems, thus simplifying the structure and reducing the size.

Furthermore, according to a twentieth aspect of the present invention, in addition to any one of the seventeenth to nineteenth aspects, each pair of the weight guide parts (WG) projectingly provided on mutually opposing inner faces of the damper case (17) are disposed so as to face each other with the second and third elastic members (S2, S3) sandwiched therebetween. In accordance with the twentieth aspect, it becomes possible, by utilizing a space within the damper case on opposite sides of the second and third elastic members, to dispose the pair of weight guide parts without problems.

Moreover, according to a twenty-first aspect of the present invention, in addition to the eighteenth or nineteenth aspect, the friction-reducing member (70) is formed from a synthetic resin material. In accordance with the twenty-first aspect, it becomes possible to easily form the friction-reducing member with a desired shape.

Furthermore, a twenty-second aspect of the present invention is a headrest that includes the dynamic damper having any one of the fourteenth to twenty-first aspects, wherein the damper case (17) is retained by a frame (12) or a cushion member (13) of a headrest (4). In accordance with the twenty-second aspect, it becomes possible to exhibit the effects of the twelfth aspect in a headrest.

Moreover, a twenty-third aspect of the present invention is a vehicular seat that includes the dynamic damper having any one of the fourteenth to twenty-first aspects, wherein the damper case (17) is retained by a cushion member (13) or at least one of frames (6, 10) of a seat back (3) and a seat cushion (2). In accordance with the twenty-third aspect, it becomes possible to exhibit the effects of the twelfth aspect in a vehicular seat.

Solution Means for Third Problem

In order to achieve the third object, a twenty-fourth aspect of the present invention provides a dynamic damper in which a weight (15) is supported, via an elastic member (S2, S3), on a frame (12, 10) of a headrest (4) or a seat back (3) of a seat (1) or a cushion member (13) supported on the frame (12, 10) so that the weight (15) can vibrate at least in a fore-and-aft direction, characterized in that the weight (15) is disposed so as to extend in an up-and-down direction on one vertical line (L) when the seat is viewed from a side. In accordance with the twenty-fourth aspect, due to the weight being disposed so as to extend in the up-and-down direction on one vertical line when the seat is viewed from the side (that is, it is disposed in a non-inclined manner), the weight receives hardly any biasing force toward one side in the fore-and-aft direction due to its self-weight. Since it thereby becomes possible for the weight to vibrate smoothly with good balance in the fore-and-aft direction with a simple structure in which the weight is merely placed in a vertical attitude, the damping effect due to the dynamic damper can be enhanced.

Furthermore, according to a twenty-fifth aspect of the present invention, in addition to the twenty-fourth aspect, the weight (15) has an upper half and a lower half having a symmetrical shape. In accordance with the twenty-fifth aspect, the weight has good weight balance between above and below the center of gravity and becomes less inclined in the fore-and-aft direction. It thereby becomes possible for the weight to vibrate with better balance in the fore-and-aft direction, thus enabling the damping effect to be further enhanced.

Moreover, according to a twenty-sixth aspect of the present invention, in addition to the twenty-fourth or twenty-fifth aspect, a damper case (17) housing the weight (15) and the elastic member (S2, S3) is fixed to the frame (12, 10) or the cushion member (13), and the weight (15) is supported on the damper case (17) via the elastic member (S2, S3) so that the weight (15) can vibrate in the fore-and-aft direction. In accordance with the twenty-sixth aspect, since the weight and the elastic member can be combined into a unit within the damper case and can be incorporated into the seat, handling becomes simple, and the ease of assembly onto the seat becomes good.

Furthermore, according to a twenty-seventh aspect of the present invention, in addition to the twenty-sixth aspect, the weight (15) is supported on the damper case (17) via an upper and lower pair of the elastic members (S2, S3) sandwiching the weight (15) in the up-and-down direction, and the upper and lower pair of elastic members (S2, S3) and the weight (15) are disposed so as to be arranged on the one vertical line (L) when the seat is viewed from the side. In accordance with the twenty-seventh aspect, the weight can be stably and elastically supported as it is in a vertical attitude via the elastic members immediately above and immediately below the weight. It thereby becomes possible for the weight to vibrate with better balance in the fore-and-aft direction, thus enabling the damping effect to be further enhanced.

Moreover, according to a twenty-eighth aspect of the present invention, in addition to the twenty-sixth or twenty-seventh aspect, the frame (12, 10) has on a periphery of the damper case (17) an inclined pillar portion (12c, 10a) that extends in the up-and-down direction and is inclined upward toward one side in the fore-and-aft direction in order to support at least the cushion member (13), and the damper case (17) is disposed so as to extend in the up-and-down direction on the one vertical line (L) when the seat is viewed from the side and intersects the inclined pillar portion (12c, 10a). In accordance with the twenty-eighth aspect, even when an inclined frame member of the frame is present on the periphery of the damper case, since the weight within the damper case is placed in a vertical attitude (that is, a non-inclined attitude) so as to obliquely intersect the inclined frame member, it is possible for the weight to vibrate smoothly with good balance in the fore-and-aft direction.

Furthermore, according to a twenty-ninth aspect of the present invention, in addition to the twenty-eighth aspect, the damper case (17) is disposed further rearward than a front face of the inclined pillar portion (12c) when the seat is viewed from the side. In accordance with the twenty-ninth aspect, it is possible to prevent effectively a front face of the headrest or the seat back from giving a disagreeable sensation due to the damper case protruding forward.

Moreover, according to a thirtieth aspect of the present invention, in addition to the twenty-eighth aspect, the damper case (17) is disposed so as to partially overlap an axis (Lc) of the inclined pillar portion (12c, 10a) when the seat is viewed from the side. In accordance with the thirtieth aspect, as well as it being possible to suppress as much as possible a disagreeable sensation given by the front face of the headrest or the seat back due to the damper case protruding forward, it is also possible to somewhat suppress interference with another member or an increase in the size of the headrest or the seat back due to the damper case protruding rearward.

Furthermore, according to a thirty-first aspect of the present invention, in addition to the twenty-eighth aspect, the damper case (17) is disposed so that an upper part of the damper case (17) protrudes further forward than the inclined pillar portion (12c) and a lower part of the damper case (17) protrudes further rearward than the inclined pillar portion (12c), and the amount of forward protrusion of the upper part with respect to the inclined pillar portion (12c) is smaller than the amount of rearward protrusion of the lower part. In accordance with the thirty-first aspect, as well as it being possible to suppress as much as possible a disagreeable sensation given by the front face of the headrest or the seat back due to the damper case protruding forward, it is possible to somewhat suppress interference with another member or an increase in the size of the headrest or the seat back due to the damper case protruding rearward.

Moreover, according to a thirty-second aspect of the present invention, in addition to the twenty-eighth aspect, the frame (12) has a pair of the inclined pillar portions (12c) that are arranged in the left-and-right direction with the damper case (17) sandwiched therebetween, and a lateral linking bar (12d) that extends in the left-and-right direction so as to provide a link between lower ends of the pair of inclined pillar portions (12c), and a lower face of the damper case (17) abuts against and is supported on an upper face of the lateral linking bar (12d). In accordance with the thirty-second aspect, it becomes possible to stably and directly support the lower face of the damper case on the frame (in particular the lateral linking bar) without complicating the structure via which the damper case is supported by the frame.

Furthermore, according to a thirty-third aspect of the present invention, in addition to the twenty-ninth aspect, a mounting arm part (24A', 24B') that extends further forward than a front face of the damper case (17) is connectedly provided on the damper case (17), and gripping means (26a, 26b) that can grip the inclined pillar portion (12c) further on a front side than the front face of the damper case (17) is provided on an extremity part of the mounting arm part (24A', 24B'). In accordance with the thirty-third aspect, since the damper case, which is present closer to the rear with respect to the inclined pillar part, is in a vertical attitude, even when at least the lower part of the damper case is spaced further rearward from the inclined pillar part, it is possible to mount without problems the damper case on the inclined pillar part via the mounting arm part, which extends further forward than the front face of the damper case.

Moreover, according to a thirty-fourth aspect of the present invention, in addition to the twenty-eighth aspect, a pair of left and right mounting arm parts (24A, 24B) are connectedly provided on left and right side walls of the damper case (17), and the mounting arm parts (24A, 24B) have gripping means (26a, 26b) that can grip a portion of the inclined pillar portion (12c) that obliquely intersects and overlaps the damper case (17) when the seat is viewed from the side. In accordance with the thirty-fourth aspect, even when the inclined pillar part, which is gripped by the gripping means of the mounting arm part, is in a positional relationship in which it obliquely intersects the damper case (in other words, a positional relationship in which the gripping means and the damper case are twisted), it becomes possible to mount the damper case on the inclined pillar part via the mounting arm part without problems.

Furthermore, according to a thirty-fifth aspect of the present invention, a headrest (4) or a seat back (3) is equipped with the dynamic damper (D) having any one of the twenty-fourth to thirty-fourth aspects. In accordance with the thirty-fifth aspect, a headrest or seat back equipped with the dynamic damper having any one of the aspects of the present invention is provided.

In the sections of the Solution Means for Third Problem and the later-mentioned Description of Embodiments of the Solution Means, front and rear/left and right are front and rear/left and right with reference to a seat correctly installed on an installation face (for example, a vehicle floor face).

Effects of the Invention

In accordance with the first aspect of the present invention, since among the corner parts where at least one end face of the weight and the first and second side faces, which are continuous from the one end face and are adjacent to each other, meet, at least some of the corner parts can be checked when the weight is assembled into the damper case, it is possible to directly and easily carry out positioning of the weight corner part with respect to the inner face of the damper case when the weight is assembled, and it is thereby possible to enhance the ease of assembly of the weight into the damper case, and consequently the ease of assembly of the dynamic damper. Moreover, it is possible, by checking the corner part of the weight prior to the weight being assembled into the damper case, to easily carry out checking in advance of the state in which the elastic member is mounted on the weight end part.

Furthermore, in accordance with the second aspect, since the elastic member is dividedly formed from the first elastic member, which covers an outside face of the weight over substantially the entire periphery, and the second and third elastic members, which each provide a join between the one end face and the other end face of the weight and an inner face of the damper case, compared with a case in which the weight is covered by a single elastic member, it is possible to simplify as much as possible the shape of individual elastic members, and the ease of molding of the elastic member is good.

Moreover, in accordance with the third aspect, since the corner part checking means is formed from the cutout part, which is formed in the first elastic member so as to expose at least some of the corner parts among the plurality of corner parts of the weight, it is only necessary to form a cutout part corresponding to the corner part in the first elastic member, and production is easy.

Furthermore, in accordance with the fourth aspect, since the first elastic member is formed into the end part shape, which exposes at least one end part of the weight that includes at least two of the corner parts, and the end part shape forms the corner part checking means, it is only necessary to simply reduce the size of the first elastic member so as to be smaller than the weight, and production is easy.

Moreover, in accordance with the fifth aspect, since the weight is formed so as to have a polygonal cross section, the first elastic member has the bent part, which corresponds to a corner of a side face of the weight, and the bent part is provided with the bending facilitation means, which makes bending of the first elastic member easier via the bent part than via a part other than the bent part, the first elastic member can easily be bent so as to correspond to a corner of the side face of the weight having a polygonal cross section, and the ease of assembly is good.

Furthermore, in accordance with the sixth aspect, since the first elastic member and the second and third elastic members are formed from different elastic materials, it is possible to optimize selection of materials, setting of hardness, setting of thickness, etc. of the first elastic member and the second and third elastic members depending on the direction of vibration that is to be damped.

Moreover, in accordance with the seventh aspect, since the bending facilitation means is formed from the thin part, which is formed in part of the first elastic member so as to correspond to a corner of a side face of the weight, it becomes possible, merely by making part of the first elastic member thinner, to easily bend the first elastic member without problems so as to correspond to a corner of the side face of the weight.

Furthermore, in accordance with the eighth aspect, it becomes possible, by simply disposing the first elastic member so as to be spaced from at least one of the second and third elastic members, to check the corner part, and the production becomes easy.

Moreover, in accordance with the ninth aspect, since the friction-reducing member, which is positioned on the side opposite to the weight and abuts against an inner face of the damper case, is mounted on the second and third elastic members, and the second and third elastic members are disposed in a compressed state between the friction-reducing member and the weight within the damper case, is it not only possible to impart to the second and third elastic members sufficient hardness as a damper spring, but it is also possible to easily fix them to an inner face of the damper case via the friction-reducing member without looseness, thus enhancing the ease of assembly of the dynamic damper.

Furthermore, in accordance with the tenth aspect, it becomes possible to exhibit the effects of the first aspect in a headrest.

Moreover, in accordance with the eleventh aspect, it becomes possible to exhibit the effects of the first aspect in a vehicular seat.

BRIEF DESCRIPTION OF DRAWINGS

FIG. 9 (a) shows the first embodiment, and FIGS. 9 (b) to (d) show modified examples.

FIG. 10 is a developed view showing a mode of deployment prior to the first elastic member being wrapped around the weight; FIG. 10 (a) shows the first embodiment (that is, corresponding to a view in the direction of arrow 9a in FIG. 6), and FIG. 10 (b) shows a modified example.

FIG. 29 shows the internal structure of a headrest related to the seventh embodiment, FIG. 29 (a) being a view corresponding to FIG. 26, and FIG. 29 (b) being a sectional view along line b-b in FIG. 29 (a).

FIG. 38 (a) is an enlarged sectional view along line 38a-38a in FIG. 36 (a), and FIG. 38 (b) is an enlarged sectional view along line 38b-38b in FIG. 36 (a).

EXPLANATION OF REFERENCE NUMERALS AND SYMBOLS

Figure 1:
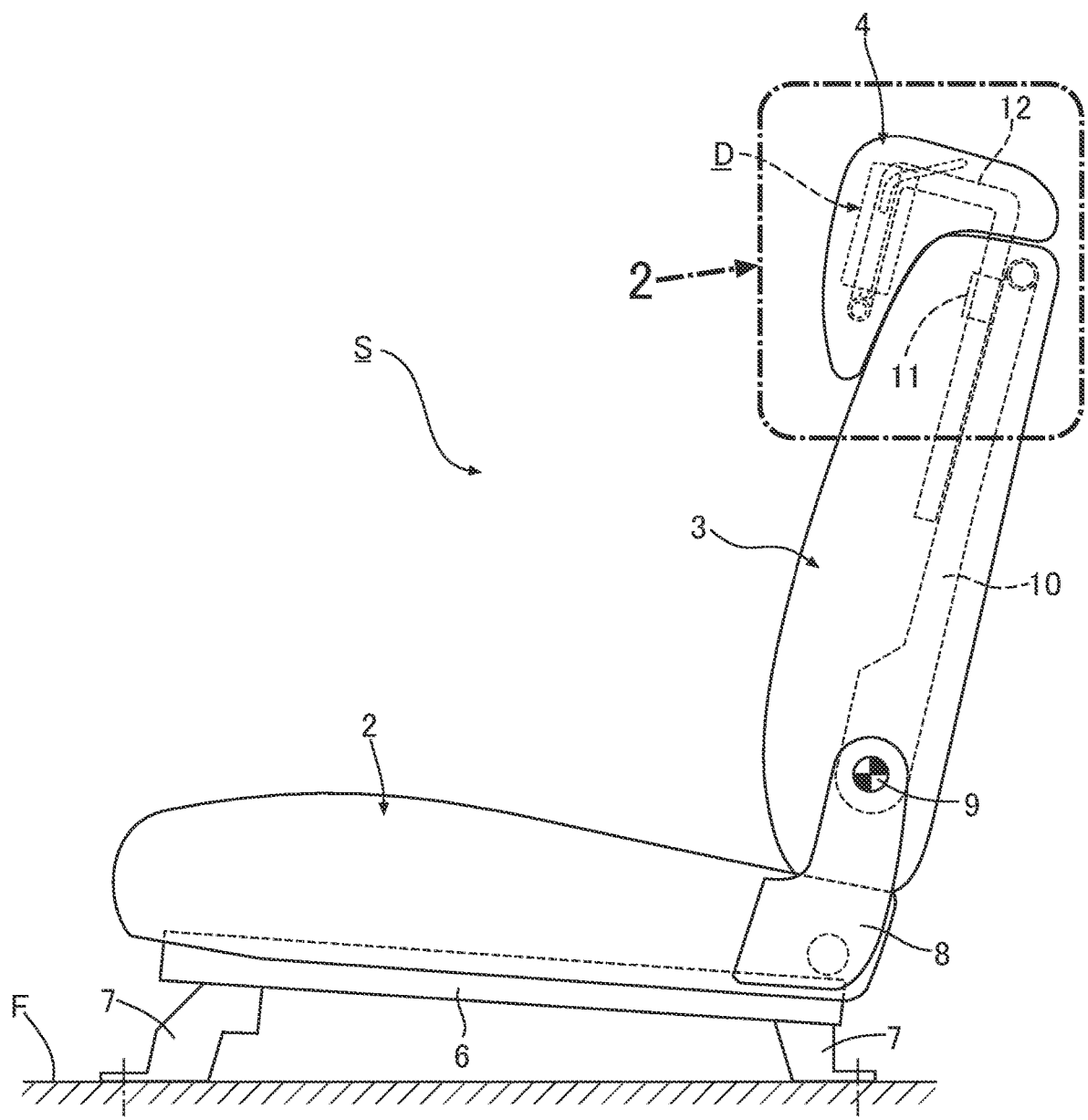
FIG. 1 is a side view of an automobile seat device related to a first embodiment of the present invention (that is, solution means of the first and second problems).
Figure 2:
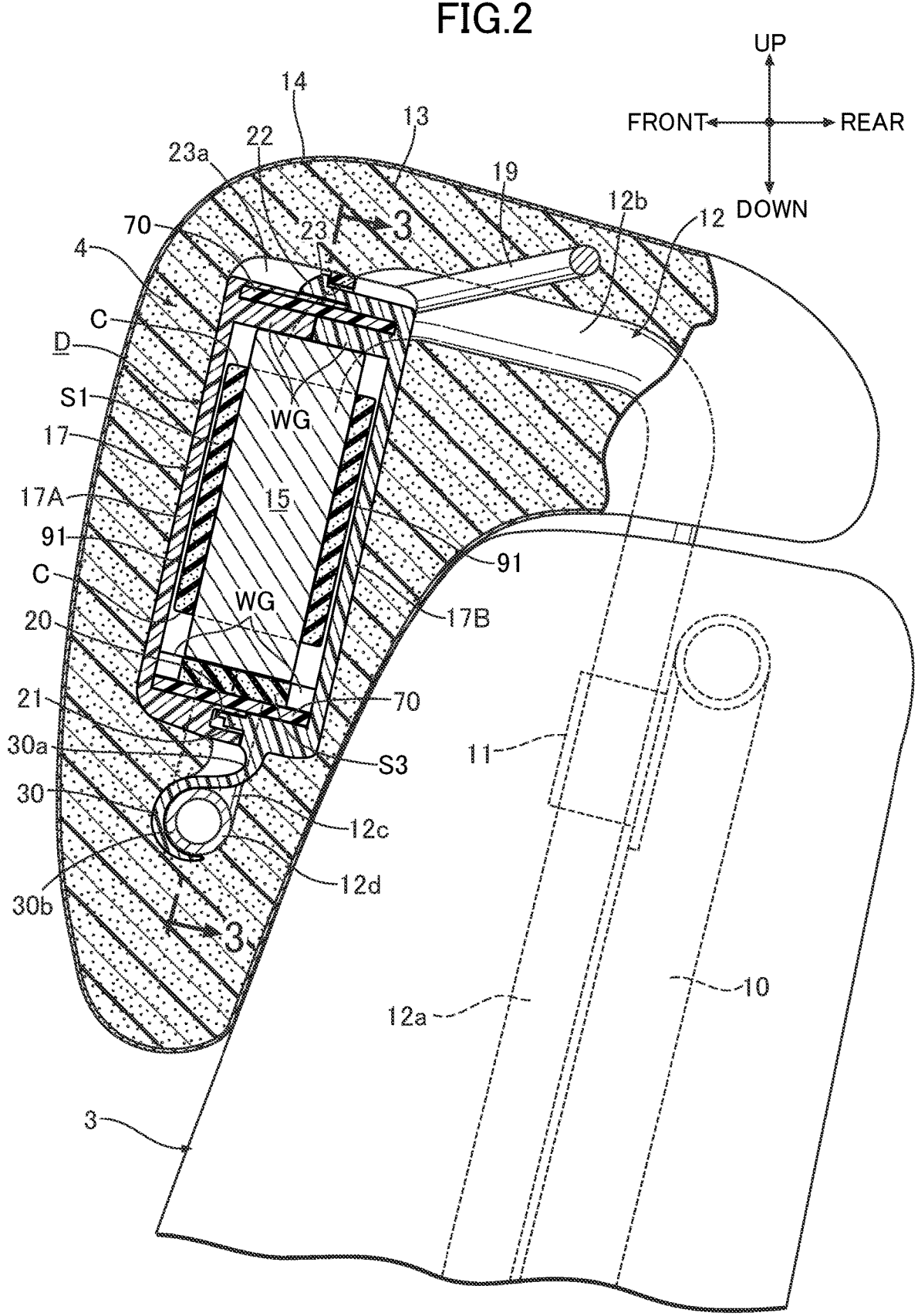
FIG. 2 is an enlarged sectional view of an essential part of a part (a peripheral part of a headrest) shown by arrow 2 in FIG. 1 (sectional view along line 2-2 in FIG. 3).
Figure 3:
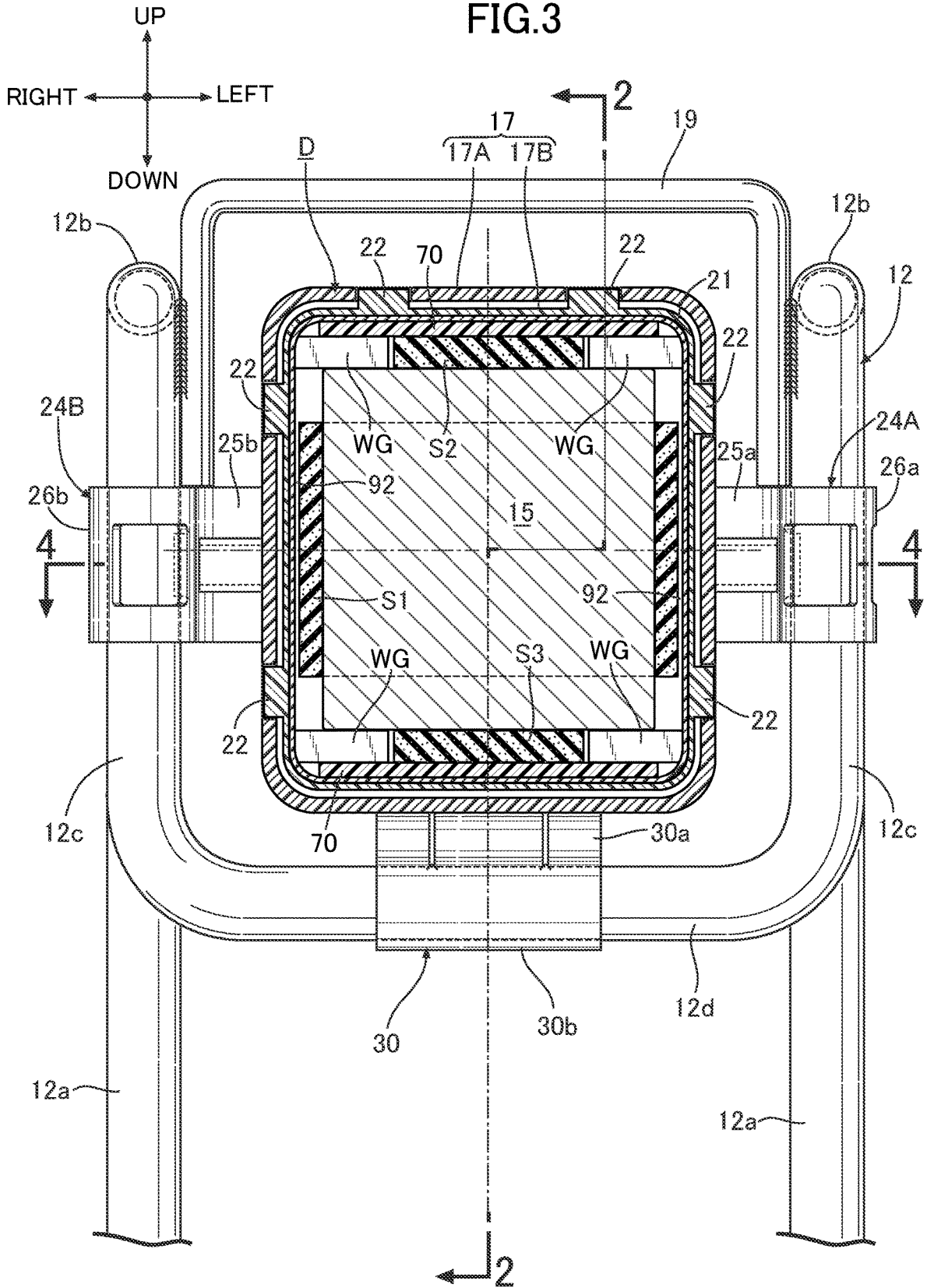
FIG. 3 is a sectional view along line 3-3 in FIG. 2.

C End part shape as corner part checking means
C' Cutout part as corner part checking means
D Dynamic damper
E Corner part
S1 to S3 First to third elastic members as elastic member
S1c Bent part
L Longitudinal center line of damper case as one vertical line
Lc Axis of inclined frame member as inclined pillar part
WG Weight guide part as movement restriction means
1 Automobile seat as vehicular seat
2 Seat cushion
3 Seat back
4 Headrest
6 Seat cushion frame as frame
10 Seat back frame as frame
10a Longitudinal frame member as inclined pillar portion
12 Headrest frame as frame
12c Inclined frame member as inclined pillar portion
12d Lateral frame member as lateral linking bar
13 Cushion member
15 Weight
15a Upper end face
15b Lower end face
15c First side face
15d Second side face
17 Damper case
24A, 24B; 24A', 24B' First and second elastic support parts as mounting arm part
26a, 26b Gripping claw as gripping means
70 Friction-reducing member
81 Thin part as bending facilitation means
82 Small hole as bending facilitation means

MODES FOR CARRYING OUT THE INVENTION

Embodiments of Solution Means for First and Second Problems

A first embodiment of the present invention (that is, Solution Means for First and Second Problems) shown in FIG. 1 to FIG. 13 is first explained. In the explanation below, front and rear and left and right are stated with reference to an automobile as a vehicle to which the present invention is applied.

In FIG. 1, an automobile seat 1 is formed from a seat cushion 2, a seat back 3, and a headrest 4. The seat cushion 2 has a seat cushion frame 6 having a plurality of support legs 7 formed on its lower part, and the support legs 7 are fixed to an automobile floor F. A conventionally known position-adjusting mechanism that can adjust the position of the support legs 7 in the fore-and-aft direction may be disposed between the support legs 7 and the floor F.

A pair of left and right brackets 8 protruding upward are provided so as to be connected to a rear end part of the seat cushion frame 6, and a seat back frame 10 of the seat back 3 is reclinably linked to the brackets 8 via a pivot shaft 9.

A pair of left and right support tubes 11 are fixedly provided on an upper end part of the seat back frame 10, and these support tubes 11 support the headrest 4 so that it can be raised and lowered and can be fixed.

As shown in FIG. 2 to FIG. 6, the headrest 4 is formed into a teardrop shape from a headrest frame 12, a foamed urethane cushion member 13 supported by the headrest frame 12, and a skin 14 covering the surface of the cushion member 13, and a dynamic damper D is mounted on the headrest frame 12.

The headrest frame 12 is formed by bending a pipe material and is formed from a pair of left and right main frame members 12a supported on the pair of support tubes 11, upper frame members 12b bending forward from upper ends of the main frame members 12a, a pair of left and right front longitudinal frame members 12c extending while bending downward from front ends of the upper frame members 12b, and a front lateral frame member 12d providing an integral link between lower end parts of the front longitudinal frame members 12c, and a reinforcing cross bar 19 having a smaller diameter than that of the pipe material is welded to the left and right front longitudinal frame members 12c so as to bridge them.

The cushion member 13 is formed so as to cover the headrest frame 12 from upper parts of the main frame members 12a to the front lateral frame member 12d, and the cushion member 13 is covered with the skin 14. Before forming the cushion member 13, the dynamic damper D is mounted by utilizing the front longitudinal frame members 12c and the front lateral frame member 12d.

The dynamic damper D includes a weight 15, a first elastic member S1 covering an outside face of the weight 15 between one end face and the other end face in the up-and-down direction over the entire periphery, second and third elastic members S2, S3 covering the one end face and the other end face respectively in the up-and-down direction of the weight 15, and a damper case 17 housing the weight 15 and the elastic members S1 to S3. As described later, the weight 15 is elastically supported on the damper case 17 mainly via the second and third elastic members S2, S3 so that it can vibrate.

The weight 15 is made of a metal (for example, made of cast iron) and is formed into a substantially rectangular parallelepiped shape that is flat in the fore-and-aft direction in the illustrated example.

The first elastic member S1 is formed into a rectangular sheet shape and fixed (for example, adhered) to a side face of the weight 15 in a state in which it is wrapped around the outside face of the weight 15 over the entire periphery. In a state in which the first elastic member S1 and the weight 15 are set within the damper case 17, slight gaps 91, 92 are set between the first elastic member S1 and inner faces of front and rear side walls and inner faces of left and right side walls of the damper case 17. When the weight 15 vibrates in the fore-and-aft and left-and-right directions, front and rear side faces and left and right side faces of the first elastic member S1 collide with the inner faces of the damper case 17 so as to fill the gaps 91, 92, and the impact at that time is absorbed and alleviated by elastic deformation of the first elastic member S1.

The first elastic member S1 may be disposed so that the gaps 91, 92 are not generated in a state in which the first elastic member S1 and the weight 15 are set within the damper case 17 (that is, it abuts against the inner faces of the damper case 17 in a non-compressed state or a slightly compressed state).

An upper end part and a lower end part of the first elastic member S1 are formed into an end part shape C so as to expose an upper end part and a lower end part, including left and right corner parts E on the upper and lower sides, of the weight 15 as a band shape (that is, so as to have an end part shape that is set further back toward the center in the up-and-down direction than the upper end and the lower end of the weight 15, in other words so as to have a size that is shorter in the up-and-down direction than the weight 15).

The end part shape C forms corner part checking means for checking at least some of the corner parts E of the weight 15. In this case, the corner part E of the weight 15 means a corner part formed by each of the end faces in the up-and-down direction of the weight 15 and first and second side faces (that is, a front side face and left and right side faces) that are continuous from the respective end faces and are adjacent to each other meeting together (in other words three faces of the weight 15 meeting together).

Figure 7:
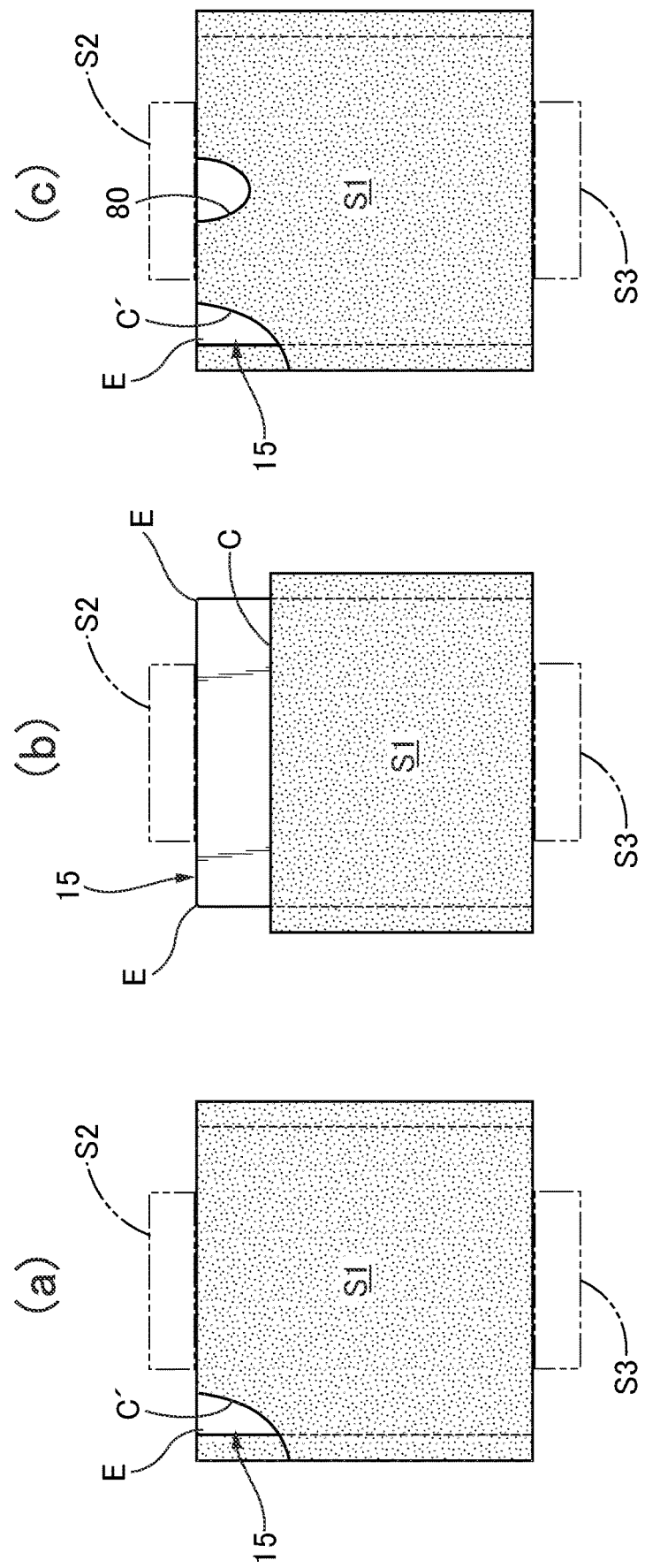
FIG. 7 is a front view showing a modified example of corner part checking means (first elastic member).

FIG. 7 shows modified examples of the corner part checking means; for example, (a) shows corner part checking means formed by a cutout part C' that is formed by cutting out part (a corner part) of the first elastic member S1 so as to expose only one corner part among the plurality of corner parts E of the weight 15. Furthermore, (b) shows an arrangement in which the first elastic member S1 has the end part shape C, which exposes an end part on only one side of the upper and lower sides of the weight 15 in the same manner as in the embodiment, and the end part shape C is corner part checking means.

Although not illustrated, the first elastic member S1 may be formed from a transparent synthetic resin material to give corner part checking means. Furthermore, (c) shows an arrangement in which, in addition to the modified example of (a), a cutout part 80 for exposing an end part of the weight 15 in an intermediate part in the width direction (that is, in the left-and-right direction) is formed in one of upper and lower end parts of the first elastic member S1.

Since the weight 15 is formed so as to have a polygonal shape in cross section (more specifically, in a horizontal cross section) because of the weight 15 being formed into a substantially rectangular parallelepiped shape as described above, the first elastic member S1 has a bent part S1c corresponding to a corner on an outside face of the weight 15. The bent part S1c is provided with bending facilitation means that makes it easier to bend than a portion of the first elastic member S1 other than the bent part S1c.

Figure 4:
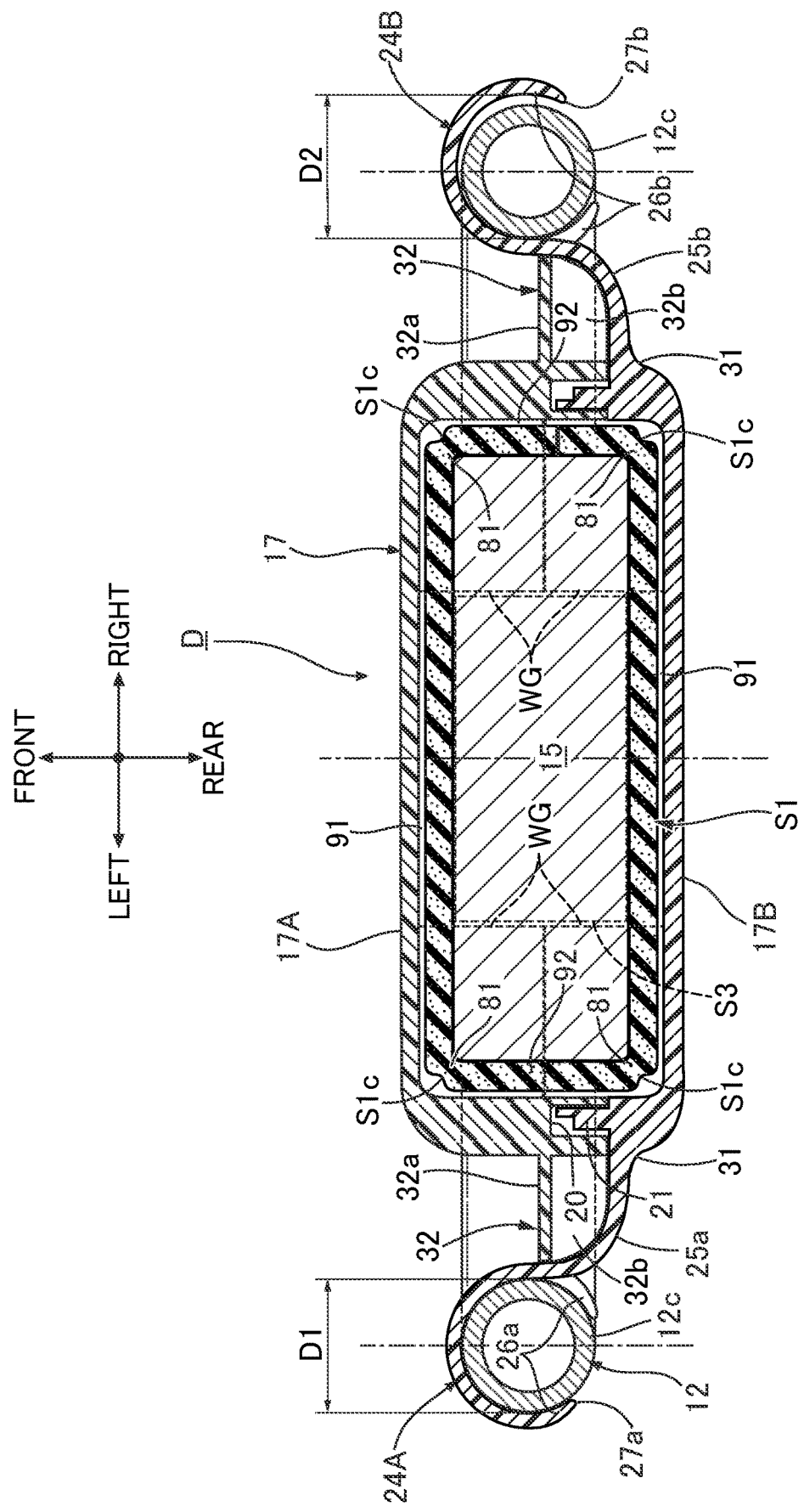
FIG. 4 is an enlarged sectional view along line 4-4 in FIG. 3.
Figure 5:
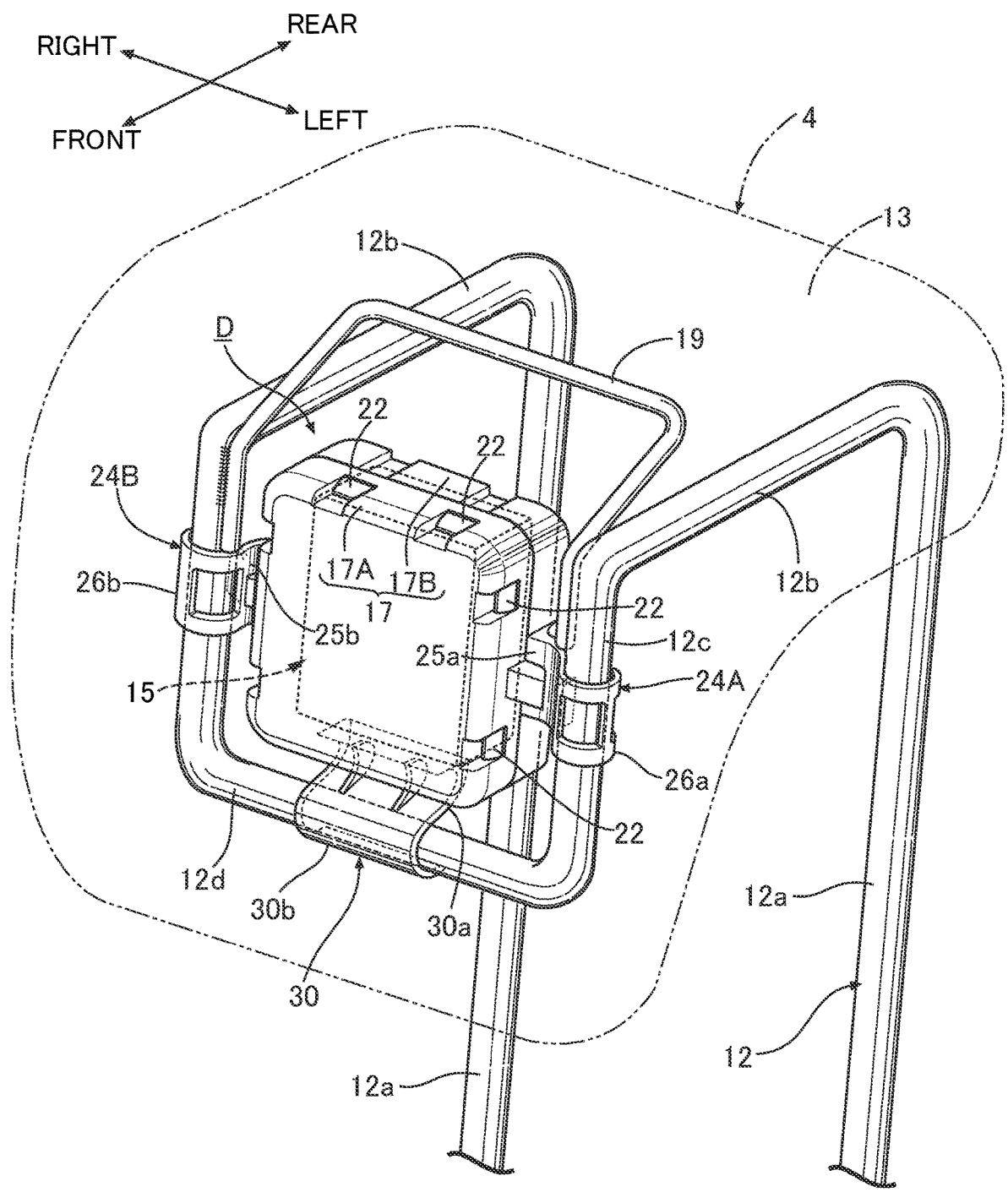
FIG. 5 is a perspective view showing the internal structure of the headrest.
Figure 6:
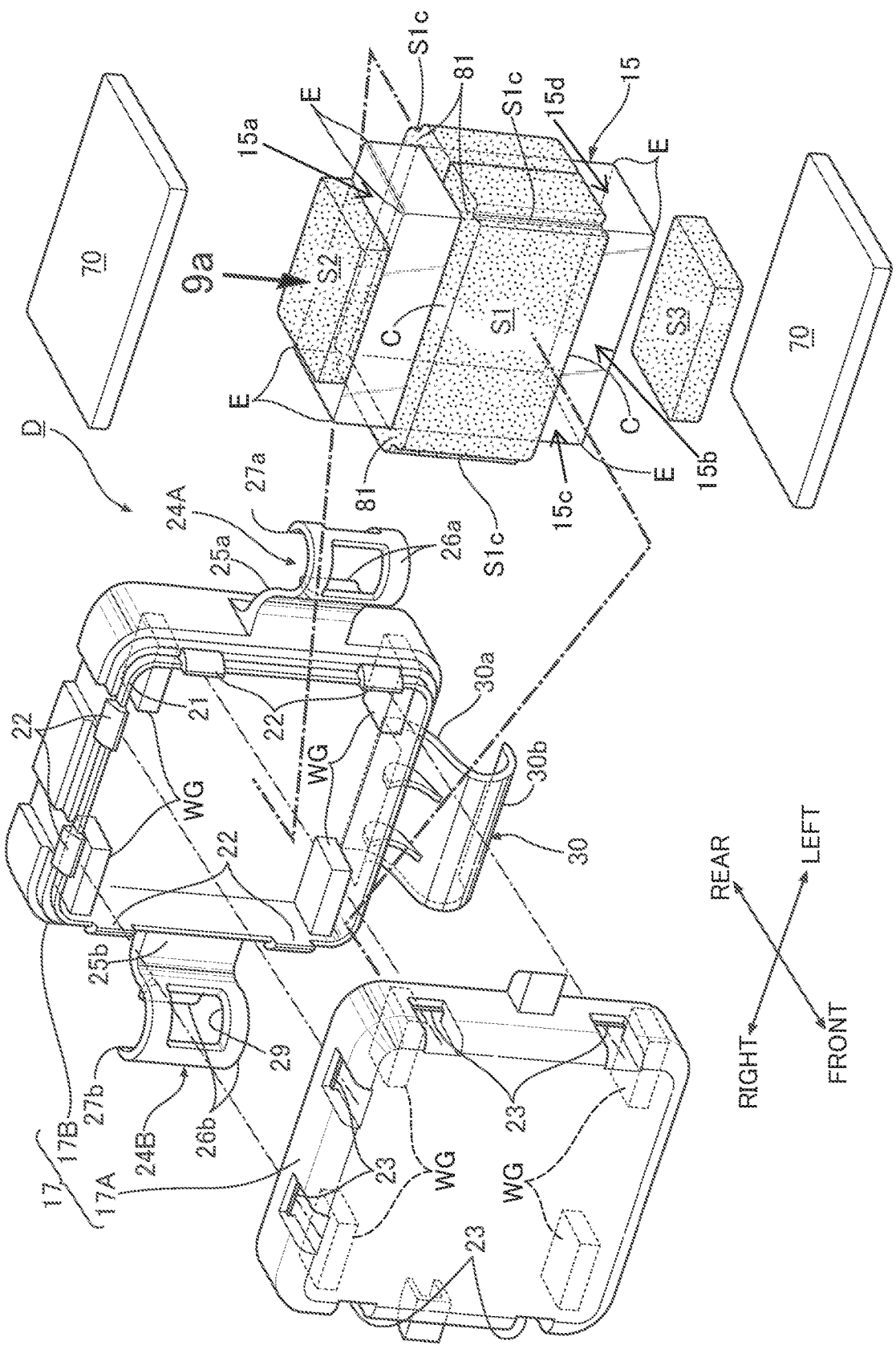
FIG. 6 is an exploded perspective view of a dynamic damper in the interior of the headrest.

The bending facilitation means is formed, as shown in FIG. 4, FIG. 6, and FIG. 10 (a) in the present embodiment, from a thin part 81 that is formed in part of the first elastic member S1 so as to correspond to the corner of the outside face of the weight 15, that is, a corner part. Alternatively, the bending facilitation means may be formed, as shown in FIG. 10 (b), from a plurality of small holes 82 bored in part of the first elastic member at intervals so as to correspond to a corner of the weight 15 (that is, in the form of perforations along the bent part S1c).

Each of the elastic members S1 to S3 is desirably formed from a sheet-shaped elastic material that is softer than the cushion member 13. In the embodiment, the first elastic member S1 and the second and third elastic members S2, S3 are formed from different elastic materials, for example, elastic materials that are made of a urethane foam molded so as to have a desired thickness and have different foaming ratios (that is, elastic forces).

In a state in which the second and third elastic members S2, S3 are set within the damper case 17, they are thicker than the first elastic member S1 and have a higher hardness. In order to impart sufficient hardness to the second and third elastic members S2, S3, in the above set state the second and third elastic members S2, S3 are placed in a compressed state between inner faces of the upper and lower side walls of the damper case 17 and the upper and lower end faces of the weight 15.

The first elastic member S1 and the second and third elastic members S2, S3 may be formed from elastic materials made of different materials (for example, a urethane foam material and a rubber material) or may be formed from the same elastic material. Even in a free state, the second and third elastic members S2, S3 are desirably formed from an elastic material that has higher hardness than the first elastic member S1.

The second and third elastic members S2, S3 are formed into a rectangular sheet shape that is smaller than the cross-sectional shape of the weight 15, and joined (for example, adhered) to the one end face and the other end face in the up-and-down direction of the weight 15. A rectangular flat plate-shaped friction-reducing member 70 that is positioned on the side opposite to the weight 15 and abuts against the inner faces of the upper and lower side walls of the damper case 17 is joined (for example, adhered) to the second and third elastic members S2, S3, and the second and third elastic members S2, S3 are disposed in a compressed state between the end face of the weight 15 and the friction-reducing member 70, which is pressed against and fixed to the inner faces of the upper and lower side walls of the damper case 17 by means of the elastic force of the second and third elastic members S2, S3.

In this way, due to the outer ends of the second and third elastic members S2, S3 not being directly secured to the inner faces of the upper and lower side walls of the damper case 17 but being pressed thereagainst and fixed thereto via the friction-reducing member 70, the second and third elastic members S2, S3 can easily be pressed against and fixed to the inner face of the damper case 17 via the friction-reducing member 70 without looseness. Since the friction-reducing member 70 comes into smooth sliding contact with the inner face of the damper case 17 when carrying out the fixing operation, the workability is very good, and the ease of assembly of the dynamic damper can be enhanced.

The friction-reducing member 70 of the present embodiment is formed from a synthetic resin material having a low coefficient of friction on the surface, thereby making it possible for the friction-reducing member 70 to be easily molded into a desired shape. The friction-reducing member 70 may be formed from another material having a low coefficient of friction on the surface, for example, a metal plate having a polished surface.

The friction-reducing member 70 can be omitted, and the second and third elastic members S2, S3 may be directly joined (for example, adhered, etc.) to the inner faces of the upper and lower side walls of the damper case 17.

Figure 8:
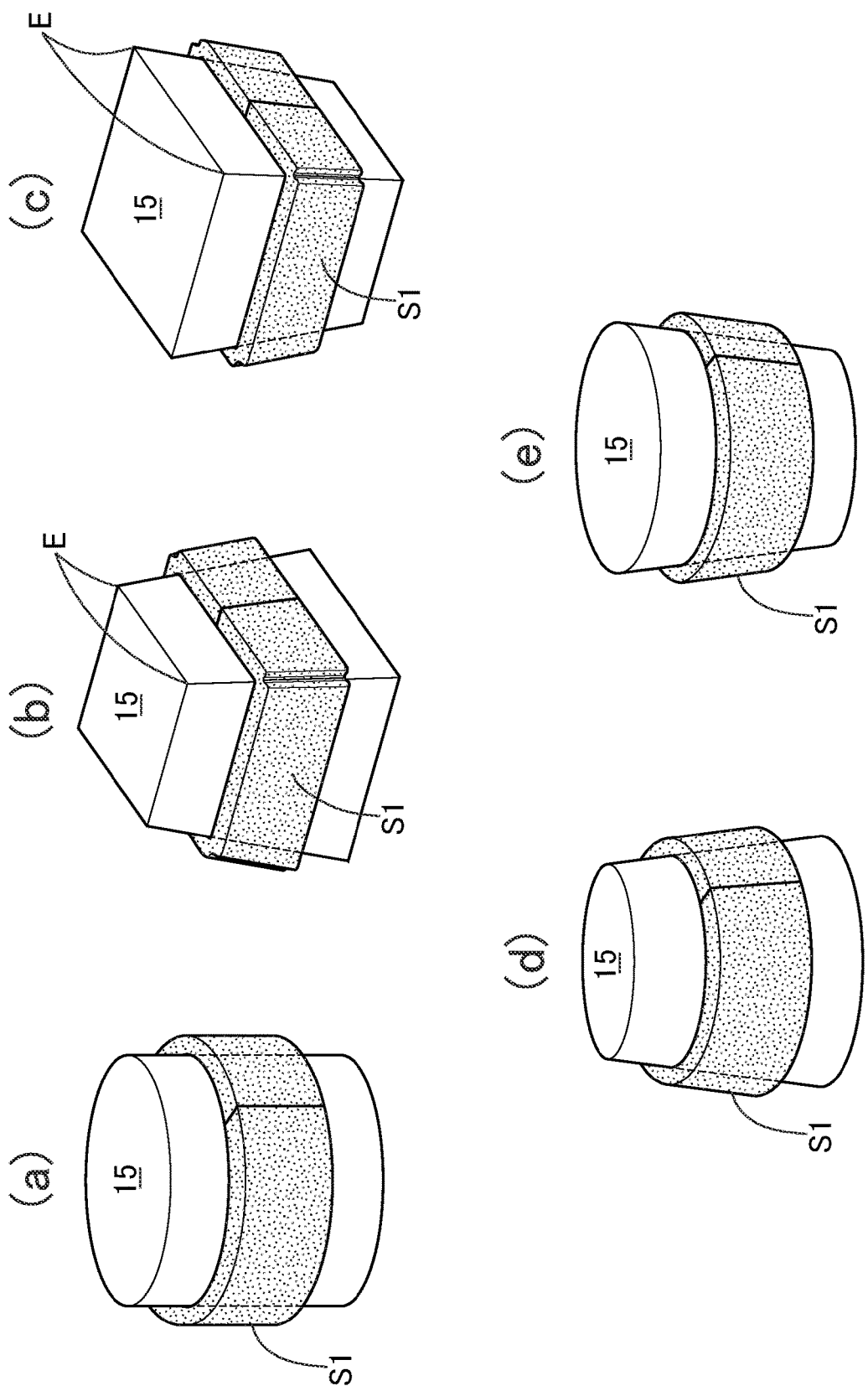
FIG. 8 is a perspective view showing a modified example of a structure via which a weight and a first elastic member are combined.

FIG. 8 shows modified examples of the weight 15. For example, (a) shows an arrangement in which the weight 15 is formed into a columnar shape, (b) shows an arrangement in which it is formed into a pyramidal shape tapered upward, (c) shows an arrangement in which it is formed into a pyramidal shape tapered downward, (d) shows an arrangement in which it is formed into a truncated cone shape, and (e) shows an arrangement in which it is formed into a reversely truncated cone shape. The shape into which the sheet-shaped first elastic member S1 is developed is appropriately set so that it can be wrapped around the entire periphery of an outside face of the weight 15 in these modified examples.

Figure 9:
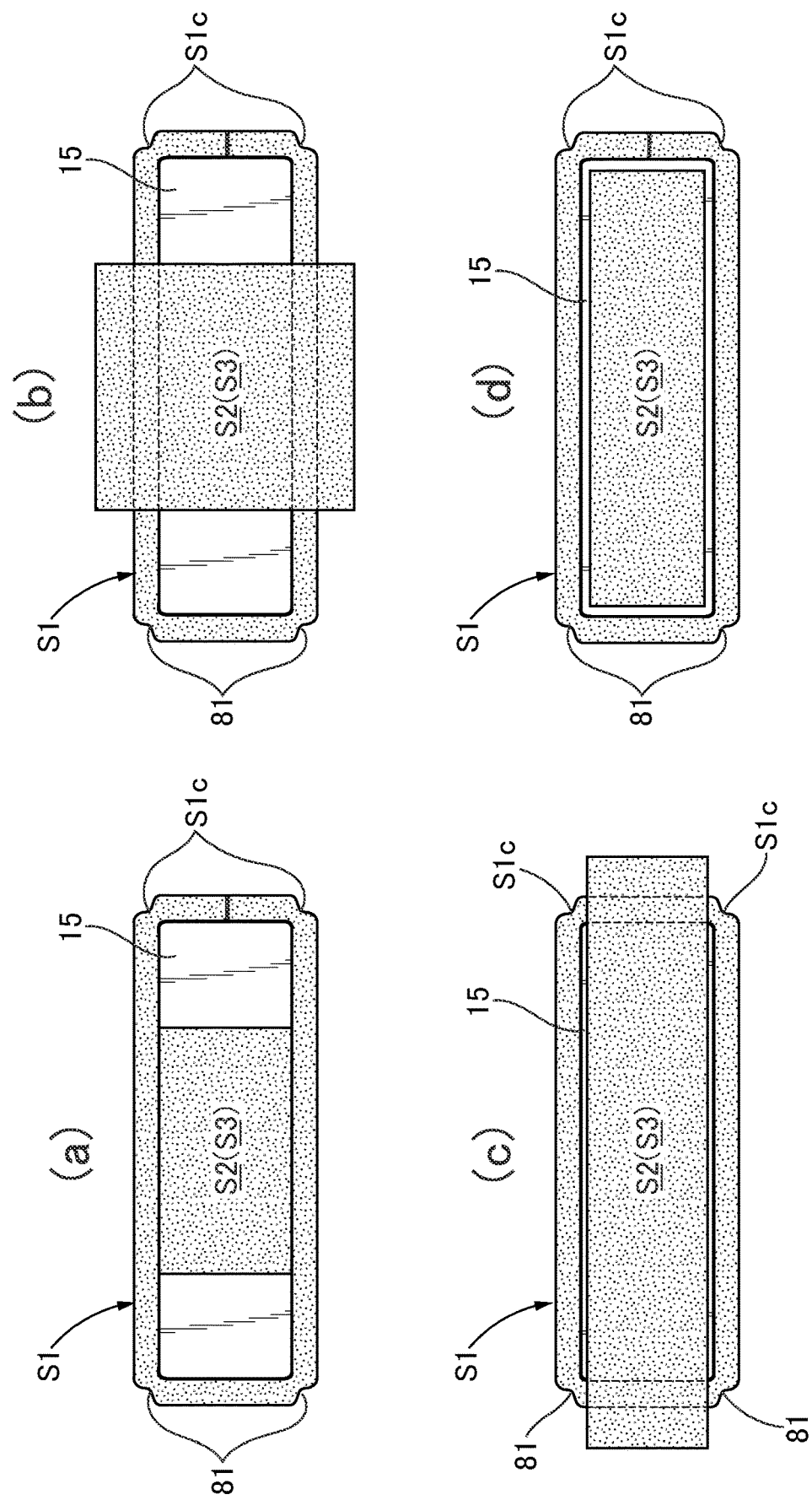
FIG. 9 is a plan view in which the structure via which the elastic member and the weight are combined is viewed from above.

FIG. 9 shows modified examples of the second and third elastic members S2, S3. That is, (a) shows the present embodiment, (b) shows an arrangement in which the second and third elastic members S2, S3 are longer than the weight 15 in the shorter direction of the weight 15 in plan view (specifically, in the fore-and-aft direction), (c) shows an arrangement in which the second and third elastic members S2, S3 are longer than the weight 15 in the longer direction of the weight 15 in plan view (specifically, in the left-and-right direction), and (d) shows an arrangement in which the second and third elastic members S2, S3 are shorter than the weight 15 in both the longer and shorter directions in plan view (specifically, in both the fore-and-aft and left-and-right directions).

The weight 15, which is covered with the sheet-shaped first to third elastic members S1 to S3 as described above, is housed within the damper case 17, which is formed from two, that is, front and rear parts. The weight 15 is elastically supported by the damper case 17 mainly via the second and third elastic members S2, S3 so that it can vibrate.

As shown in FIG. 2 to FIG. 6, the damper case 17 has a shape that is similar to the external shape of the weight 15, that is, a box shape that is flat in the fore-and-aft direction, a front wall 17f is formed as a flat face so as to correspond to a front face 15f of the weight 15 or a curved face that is similar thereto, and a rear wall 17r is formed as a flat face so as to correspond to a rear face 15r of the weight 15 or a curved face that is similar thereto.

The damper case 17 is divided into two, that is, a first case half body 17A on the front side and a second case half body 17B on the rear side, and each of the case half bodies 17A, 17B is molded from a synthetic resin. A fitting groove 20 and a fitting projecting wall 21 that can be fitted together are formed on one and the other respectively of opposing faces of the two case half bodies 17A, 17B, a plurality of linking claws 22 protruding outward are formed on an extremity part of the fitting projecting wall 21, and a plurality of linking holes 23 into which the linking claws 22 can elastically snap-engage are formed in a bottom part of the fitting groove 20.

First and second elastic support parts 24A, 24B are formed integrally with left and right side walls of the second case half body 17B. The first and second elastic support parts 24A, 24B are each formed from plate-shaped arms 25a, 25b protruding outward from the left and right side walls of the second case half body 17B, and major arc-shaped gripping claws 26a, 26b that are provided so as to be connected to extremities of the arms 25a, 25b and can snap-engage with the front longitudinal frame members 12c so as to grip them. That is, the major arc-shaped gripping claws 26a, 26b can elastically grip the front longitudinal frame members 12c beyond a half of the periphery. The major arc-shaped gripping claws 26a, 26b have openings 27a, 27b oriented rearward so as to engage with the front longitudinal frame members 12c from the front. Therefore, a rearward-facing load from the head of an occupant acts in a direction to make the gripping claws 26a, 26b of the first and second elastic support parts 24A, 24B engage with the front longitudinal frame members 12c, thus making it possible to prevent the gripping claws 26a, 26b from disengaging therefrom. It is also possible, by selecting the length for the arms 25a, 25b, to make the distance between the centers of the gripping claws 26a, 26b coincide with the distance between the centers of the two front longitudinal frame members 12c, thus enabling the gripping claws 26a, 26b to be appropriately engaged with the front longitudinal frame members 12c.

The major arc-shaped gripping claws 26a, 26b are formed so that internal diameters D1, D2 thereof are different from each other. In the illustrated example, the internal diameter D2 of the gripping claw 26b of the second elastic support part 24B is set to be larger than the internal diameter D1 of the gripping claw 26a of the first elastic support part 24A. The major arc-shaped gripping claws 26a, 26b are formed so as to have different stiffnesses from each other. In the illustrated example, a cutout 28 is provided in an extremity part of the gripping claw 26a of the first elastic support part 24A so that the stiffness of the gripping claw 26a of the first elastic support part 24A is lower than that of the gripping claw 26b of the second elastic support part 24B, or the thickness of the gripping claw 26a is set to be thinner than the gripping claw 26b. The first and second elastic support parts 24A, 24B are disposed so as to sandwich the center of gravity G of the weight 15.

Each of the gripping claws 26a, 26b is provided with a window hole 29, and the state in which the gripping claws 26a, 26b and the front longitudinal frame members 12c are engaged can be visually checked through the window hole 29.

On the other hand, a positioning support part 30 is formed integrally with a lower wall of the first case half body 17B. The positioning support part 30 is formed from a plate-shaped arm 30a that protrudes downward from the lower wall of the first case half body 17B, and a U-shaped abutment claw 30b that is provided so as to be connected to the lower end of the arm 30a and that can abut against and engage with the front lateral frame member 12d, and the abutment claw 30b abutting against the front lateral frame member 12d from the rear defines the position of engagement between the gripping claws 26a, 26b and the left and right front longitudinal frame members 12c. The position of the damper case 17 mounted on the headrest frame 12 is thus determined.

A thick part 31 is formed on the base of the arms 25a, 25b of the first and second elastic support parts 24A, 24B and the positioning support part 30 in order to increase the stiffness of the base. A pair of stoppers 32 are formed on the left and right side walls of the first case half body 17A, the stoppers 32 abutting against the arms 25a, 25b of the first and second elastic support parts 24A, 24B so as to restrict forward flexing thereof, that is, flexing of the arms 25a, 25b toward the side opposite to the openings 27a, 27b of the gripping claws 26a, 26b. Each stopper 32 is formed so as to have a squared U-shaped cross section from a middle wall portion 32a that abuts linearly against a back face of the corresponding gripping claws 26a, 26b, and a pair of side wall portions 32b, 32b that are continuous from opposite ends of the middle wall portion 32a and abut against curved faces ranging from the corresponding arms 25a, 25b to the back faces of the gripping claws 26a, 26b. Since the stoppers 32 thus arranged have high stiffness and can abut against the back face from the corresponding arms 25a, 25b to the gripping claws 26a, 26b over a large area, it is possible to restrict effectively flexing of the arms 25a, 25b while avoiding as much as possible a concentration of stress. Therefore, even if a large rearward-facing load is applied from the head of an occupant to the damper case 17, the stoppers 32 abut against the front faces of the arms 25a, 25b to thus restrict forward flexing of the arms 25a, 25b, thus enabling unnecessary rearward movement of the damper case 17 to be restricted.

Since the stopper 32 is integrally linked to an outer wall of the fitting groove 20, it contributes to an increase in the stiffness of the outer wall of the fitting groove 20. A plurality of reinforcing ribs 33 providing a link between the lower wall of the first case half body 17A and the abutment claw 30b are formed on the arm portion 30a of the positioning support part 30.

The dynamic damper D is equipped with movement restriction means WG that restricts movement of the weight 15 in a predetermined direction (in the illustrated example in the up-and-down direction). In the present embodiment, the movement restriction means WG is formed from a weight guide part WG that slidably guides movement of the weight 15 in a specific direction (in the illustrated example in the fore-and-aft direction and the left-and-right direction) that is different from the predetermined direction.

More specifically, a pair of left and right projecting weight guide parts WG protruding in directions that approach each other and extending in the fore-and-aft direction are projectingly provided integrally with upper and lower parts of inner faces of mutually opposing left and right side walls of the first and second case half bodies 17A, 17B, which form the damper case 17 in a divided manner. The pair of weight guide parts WG on the lower parts of the first and second case half bodies 17A, 17B abut against a lower end part of the weight 15 so that they can slide in the fore-and-aft and left-and-right directions, and the pair of weight guide parts WG on the upper parts abut against an upper end part of the weight 15 so that they can slide in the fore-and-aft and left-and-right directions, thereby restricting movement of the weight 15 in the up-and-down direction with respect to the damper case 17.

The upper and lower weight guide parts WG abut against the inner faces, on the weight 15 side, of the corresponding upper and lower friction-reducing members 70 and support the friction-reducing member 70 from the weight 15 side. Although not illustrated, a modified example in which a slight gap is set in the up-and-down direction between the weight guide part WG and the friction-reducing member 70 can also be implemented.

Furthermore, as another modified example of the damper case 17, although not illustrated, a pair of left and right projecting weight guide parts WG may be projectingly provided only on inner faces of left and right side wall parts of either one case half body among the first and second case half bodies 17A, 17B.

The weight guide parts WG of the upper and lower parts are disposed at positions that avoid the elastic members S1 to S3. The pairs of left and right weight guide parts WG of the upper and lower parts are disposed so as to face each other with the second elastic member S2 and the third elastic member S3 sandwiched therebetween. This enables restriction of movement and guiding of sliding of the weight 15 to be stably and appropriately carried out by means of the mutually opposing left and right weight guide parts WG.

The friction-reducing member 70 joined to an outer end face (an end face on the side opposite to the weight 15) of the second and third elastic members S2, S3 is disposed between the upper and lower weight guide parts WG and upper and lower inner end faces of the damper case 17. This enables the friction-reducing member 70 to be disposed without problems by utilizing a dead space between the weight guide part WG (and consequently the movement restriction means) and the damper case 17, thus simplifying the structure and reducing the size. The friction-reducing member 70 can be stably and strongly held at a fixed position between the weight guide part WG and the inner faces of the upper and lower side walls of the damper case 17.

The length of the weight guide part WG in the longitudinal direction when viewed from the front (see FIG. 3) is substantially equal to or longer than the length of the shortest side of the weight 15 (that is, a dimension in the fore-and-aft direction). This enables a sufficient effective length for the weight guide part WG to be ensured, thereby enabling the weight 15 to be stably supported on the weight guide part WG.

Figure 11:
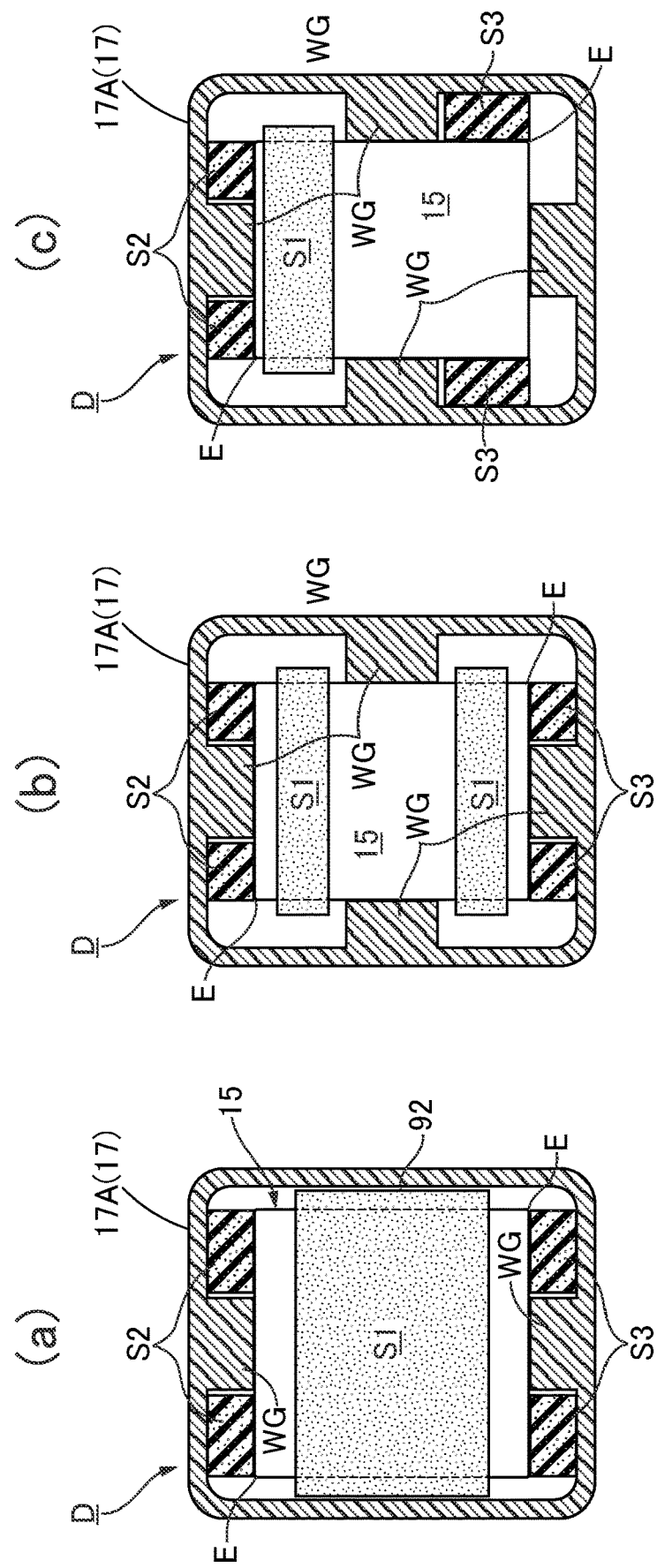
FIG. 11 is a sectional view, corresponding to FIG. 3, schematically showing first to third modified examples of the structure via which the elastic member, a damper case, the weight and a weight guide part are combined.
Figure 12:
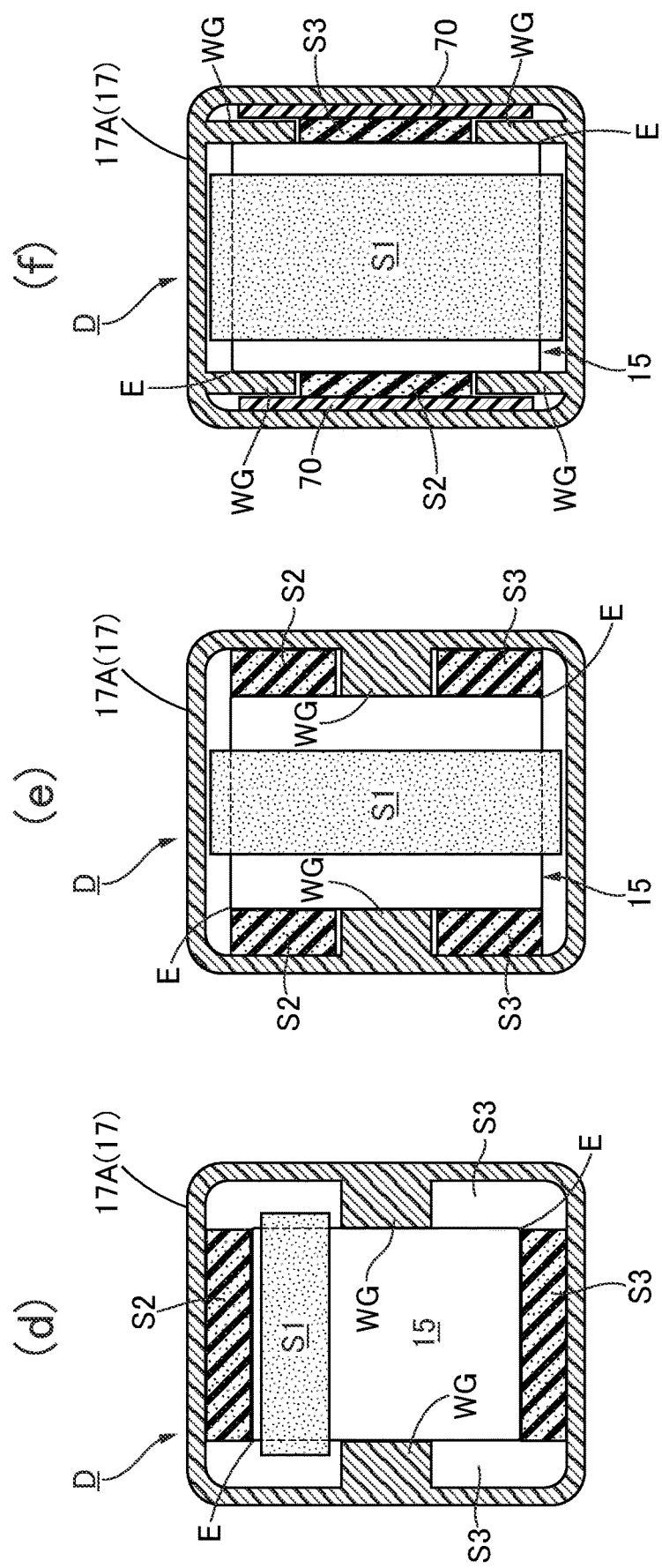
FIG. 12 is a sectional view, corresponding to FIG. 3, schematically showing fourth to sixth modified examples of the structure via which the elastic member, the damper case, the weight and the weight guide part are combined.
Figure 13:
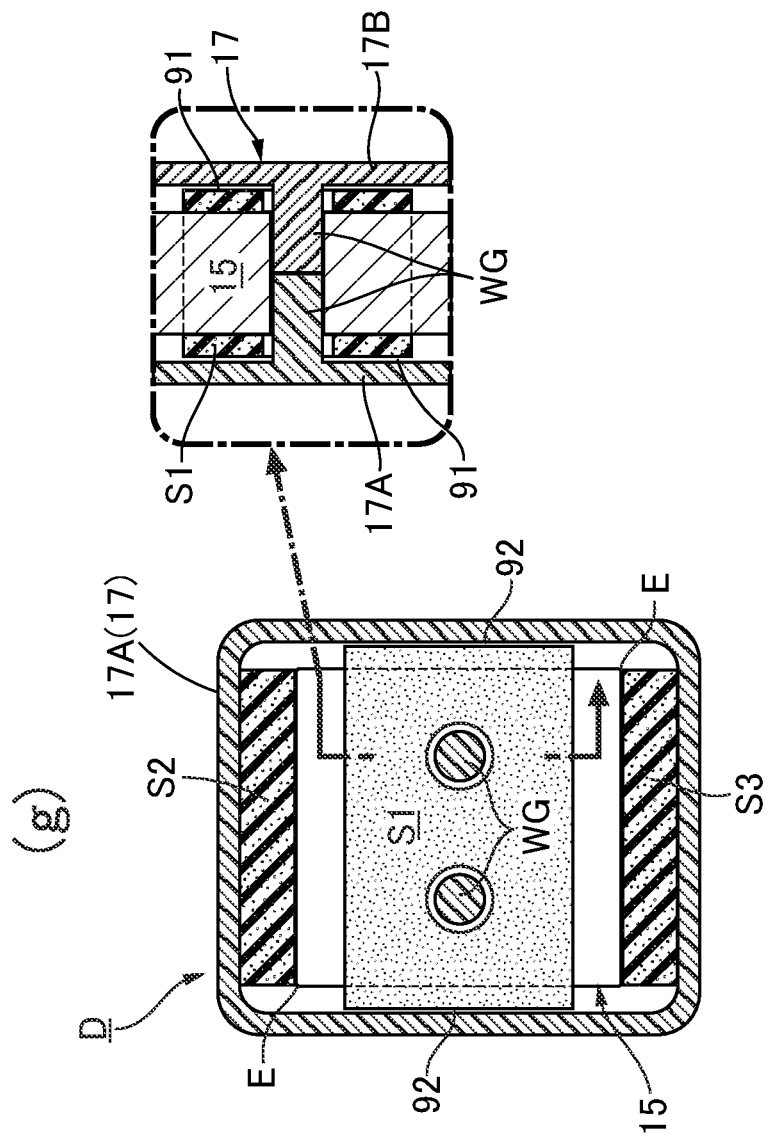
FIG. 13 is a sectional view, corresponding to FIG. 3, schematically showing a seventh modified example of the structure via which the elastic member, the damper case, the weight and the weight guide part are combined.

FIG. 11 to FIG. 13 show modified examples of the weight guide part WG forming the movement restriction means for the weight 15. For example, in a first modified example shown in (a), a pair of upper and lower weight guide parts WG are projectingly provided on inner faces of upper and lower walls of the damper case 17 (that is, either one or both of the first and second case half bodies 17A, 17B) so as to avoid the second and third elastic members S2, S3, and the upper and lower end faces of the weight 15 are abutted against the weight guide part WG so that it can slide in the fore-and-aft and left-and-right directions. This restricts movement of the weight 15 in the up-and-down direction.

In a second modified example shown in (b), upper and lower end faces and left and right side faces of the weight 15 are abutted against the pairs of upper and lower and left and right weight guide parts WG so that it can slide in the fore-and-aft direction while the first elastic member S1 wrapped around and fixed to the outside face of the weight 15 is formed from upper and lower parts. This restricts movement of the weight 15 in the up-and-down direction and the left-and-right direction.

In a third modified example shown in (c), one of the upper and lower first elastic members S1 of the second modified example of (b) is omitted.

In a fourth modified example shown in (d), the pair of upper and lower weight guide parts WG in the third modified example of (c) are omitted, and the pair of left and right weight guide parts WG abut against the left and right side faces of the weight so that the weight can slide in the fore-and-aft and up-and-down directions. This restricts movement of the weight 15 in the left-and-right direction.

In a fifth modified example shown in (e), the first elastic member S1 is wrapped around and fixed to the weight 15 around the horizontal axis in the left-and-right direction, whereas the pair of left and right weight guide parts WG are projectingly provided on the inner faces of the left and right side walls of the damper case 17 (that is, either one or both of the first and second case half bodies 17A, 17B) so as to avoid the second and third elastic members S2, S3, and the left and right side faces of the weight 15 are abutted against the weight guide parts WG so that it can slide in the fore-and-aft and up-and-down directions. This restricts movement of the weight 15 in the left-and-right direction.

In a sixth modified example shown in (f), the placement of the weight 15 and the elastic members S1 to S3 of the embodiment shown in FIG. 1 to FIG. 6 is changed by 90 degrees around the center line of the dynamic damper D in the fore-and-aft direction. In this case, movement of the weight 15 in the left-and-right direction is restricted by the weight guide part WG, that is, the weight 15 is supported on the weight guide part WG so that it can slide in the up-and-down and fore-and-aft directions. This restricts movement of the weight 15 in the left-and-right direction.

In a seventh modified example shown in (g), the weight guide part WG is formed from a support pin projectingly provided on inner faces of front and rear side walls of the damper case 17 (that is, either one or both of the first and second case half bodies 17A, 17B) so as to extend in the fore-and-aft direction. That is, an intermediate part of the weight 15 in the up-and-down direction is fitted and supported on the support pin WG so that it can slide in the fore-and-aft direction without play, and the support pin WG restricts movement of the weight 15 in the up-and-down and left-and-right directions.

In the modified examples of FIG. 11 to FIG. 13, other than the sixth modified example (0, the friction-reducing member 70 is omitted, and the second and third elastic members S2, S3 are joined directly to the inner face of the damper case 17, but in the modified examples other than the sixth modified example the second and third elastic members S2, S3 may also be pressed against and fixed to the inner face of the damper case 17 via the friction-reducing member 70.

The operation of the first embodiment is now explained.

With regard to the procedure for assembling the dynamic damper D, the first elastic member S1 is first wrapped around and fixed (e.g. adhered) to the outside face of the weight 15 between the one end face and the other end face, that is, the upper and lower end faces, and the second and third elastic members S2, S3 are joined (e.g. adhered) to the one end face and the other end face of the weight 15, that is, the upper and lower end faces, thus forming a sub-assembly of the weight and elastic members. Mating faces of the first and second case half bodies 17A, 17B are detachably joined so as to sandwich the sub-assembly between the opposing faces of the two case half bodies 17A, 17B, thus assembling the damper case 17.

In this case, the second and third elastic members S2, S3 are press fitted to the inner faces of the upper and lower walls of the damper case 17 (the first and second case half bodies 17A, 17B) via the friction-reducing member 70 in a state in which the second and third elastic members S2, S3 are compressively deformed in the up-and-down direction, whereas the front and rear faces and the left and right faces of the first elastic member S1 are made to oppose the inner faces of the front and rear walls and the left and right walls of the damper case 17 (the first and second case half bodies 17A, 17B) across the gaps 91, 92.

The dynamic damper D thus assembled is, together with the skin 14, set in a cavity of a mold (not illustrated) for injection molding the cushion member 13 of the headrest 4. In this set state the cushion member 13 is injection molded and at the same time the dynamic damper D is integrally embedded at a predetermined position within the cushion member 13.

While the automobile is traveling, when vibration of the automobile is transmitted from the floor F to the seat back 3 and the headrest 4 via the seat cushion 2 and the pivot shaft 9, in the dynamic damper D the weight 15 resonates accompanied by elastic deformation of mainly the second and third elastic members S2, S3, and vibration energy of the seat back 3 and the headrest 4 is instead absorbed, thus enabling the vibration of the seat back 3 and the headrest 4 to be damped.

In such a dynamic damper D, since the weight 15 is formed into a polyhedron (substantially a rectangular parallelepiped), and the weight 15 is covered by the sheet-shaped elastic members S1 to S3 molded in advance so as to have a desired thickness and is supported, it is possible to form an elastic member having a desired thickness on the outside face of the weight 15 very easily, thus enabling the dynamic damper D having stable damping characteristics to be provided at low cost.

In the dynamic damper D of the embodiment, since the weight guide part WG is provided as movement restriction means for restricting movement of the weight 15 in a predetermined direction (for example, in the up-and-down direction), movement of the weight 15 in the predetermined direction is restricted, and unnecessary movement of the weight in the predetermined direction is suppressed. This enables the dynamic damper D to efficiently exhibit an effect of damping the vibration in a specific direction (for example, in the fore-and-aft and left-and-right directions) that is originally desired to be damped, and it becomes easy to optimize (tune) the mode of damping corresponding to the mode of vibration of a damping target.

Since the weight 15 can move in the fore-and-aft and left-and-right directions (and consequently can vibrate) even when its movement in the up-and-down direction is restricted, and in this process it stably vibrates in the fore-and-aft and left-and-right directions while being accompanied by elastic deformation of the second and third elastic members S2, S3, which have relatively high hardness, it is possible for the dynamic damper D to exhibit an effect of damping effectively vibration in the fore-and-aft and left-and-right directions.

In the present embodiment, the weight guide part WG, which slidably guides the weight 15 in the specific direction, also functions as the movement restriction means, thus accordingly simplifying the structure and consequently reducing the cost.

In a state in which the first elastic member S1 of the present embodiment and the weight 15 are together set within the damper case 17, the slight gaps 91, 92 are set between the first elastic member S1 and the inner faces of the front and rear walls and the inner faces of the left and right walls of the damper case 17. When the weight 15 vibrates in the fore-and-aft and left-and-right directions, the front and rear faces or the left and right faces of the elastic member S1 collide with the inner face of the damper case 17 so as to fill the gaps 91, 92, and the impact thus generated is absorbed and alleviated by virtue of elastic deformation of the first elastic member S.

On the other hand, if the first elastic member S1 were omitted, there is a possibility that when the weight 15 vibrates in the fore-and-aft and left and right directions it would directly collide with the inner face of the damper case 17 to thus generate an unpleasant collision noise, but in the present embodiment it is possible to prevent effectively an unpleasant collision noise from occurring by virtue of the buffer effect exhibited by the first elastic member S1.

The first elastic member S1 can undergo elastic compressive deformation to apply elastic resistance to the weight 15 when the weight 15 vibrates in the fore-and-aft or left-and-right direction even after the front and rear faces and the left and right faces of the first elastic member S1 have abutted against the inner face of the damper case 17 as described above.

In the present embodiment, among the corner parts E where at least one of the one end face and the other end face in the up-and-down direction of the weight 15 and the first and second side faces (the front side face and the left and right faces), which are continuous from the end face and are adjacent to each other, meet, at least some of the corner parts E are visible when the weight 15 is assembled into the damper case 17. Since this enables positioning of the weight corner part E with respect to the inner face of the damper case 17 when the weight 15 is assembled to be carried out directly and easily, it is possible to enhance the ease of assembly of the weight 15 into the damper case 17, and consequently the ease of assembly of the dynamic damper D. Moreover, since the state in which the first elastic member S1 is mounted on the weight end part E can be checked in advance by checking the corner part E of the weight 15 prior to the weight 15 being assembled into the damper case 17, it is possible to further enhance the ease of assembly.

In the present embodiment, the elastic members S1 to S3 covering the weight 15 are formed in a divided manner from the first elastic member S1 covering the entire periphery of the outside face of the weight 15, and the second and third elastic members S2, S3 covering the one end face and the other end face of the weight 15. This enables the shape of the individual elastic members S1 to S3 to be simplified as much as possible compared with a case in which the weight 15 is covered by a single sheet-shaped elastic member, thus resulting in good ease of molding. Moreover, since the material, thickness, etc. of an elastic material forming the first elastic member S1 and an elastic material forming the second and third elastic members S2, S3 can easily be changed, the material, hardness, thickness, etc. of the elastic members S1 to S3 can be selected so that each of the first elastic member S1 and the second and third elastic members S2, S3 can exhibit an optimum dynamic damper effect according to the damping target or the placement position and attitude.

Figure 14:
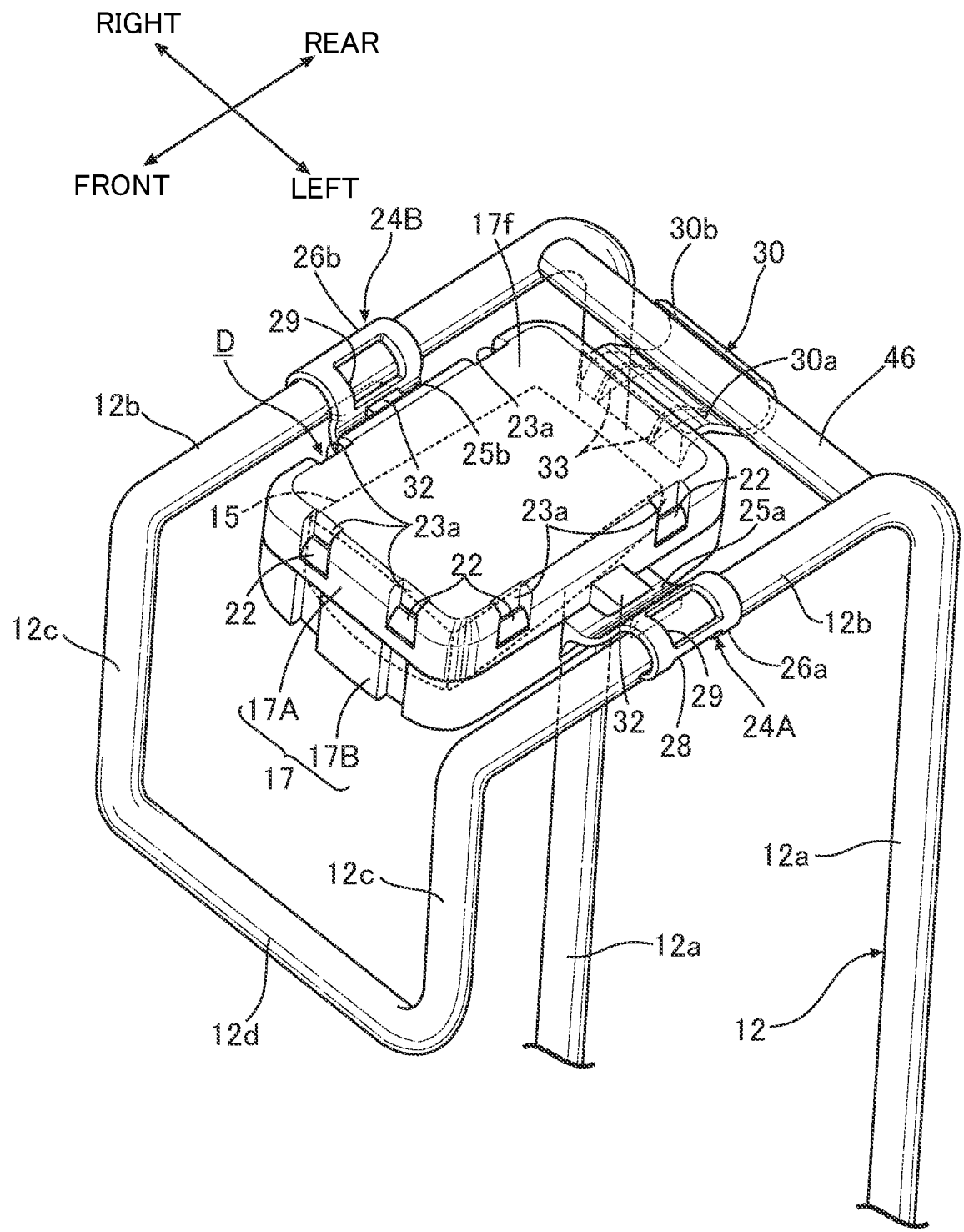
FIG. 14 is a perspective view showing the internal structure of a headrest showing a second embodiment of the present invention.

FIG. 14 shows a second embodiment, and in this arrangement the dynamic damper D is mounted on the left and right upper frame members 12b of the headrest frame 12. That is, the first and second elastic support parts 24A, 24B of the damper case 17 snap-engage with the left and right upper frame members 12b from above, and the positioning support part 30 abuts against and engages with a cross member 46, providing a link between rear end parts of the left and right upper frame members 12b, from below. The arrangement is otherwise the same as that of the first embodiment, and parts in FIG. 14 corresponding to those of the first embodiment are denoted by the same reference numerals and symbols, duplication of the explanation being omitted.

In accordance with the second embodiment, it is possible, by utilizing effectively a space between the left and right upper frame members 12b for placing the dynamic damper D, to ensure that a front part of the cushion member 13 of the headrest 4 has a sufficient thickness for the head of an occupant to abut thereagainst and to ensure that the distance from the point of support of a vibration system formed from the seat cushion 2 and the headrest 4 to the center of gravity G of the weight 15 is sufficient, thus enabling the damping function of the dynamic damper D to be enhanced.

Figure 15:
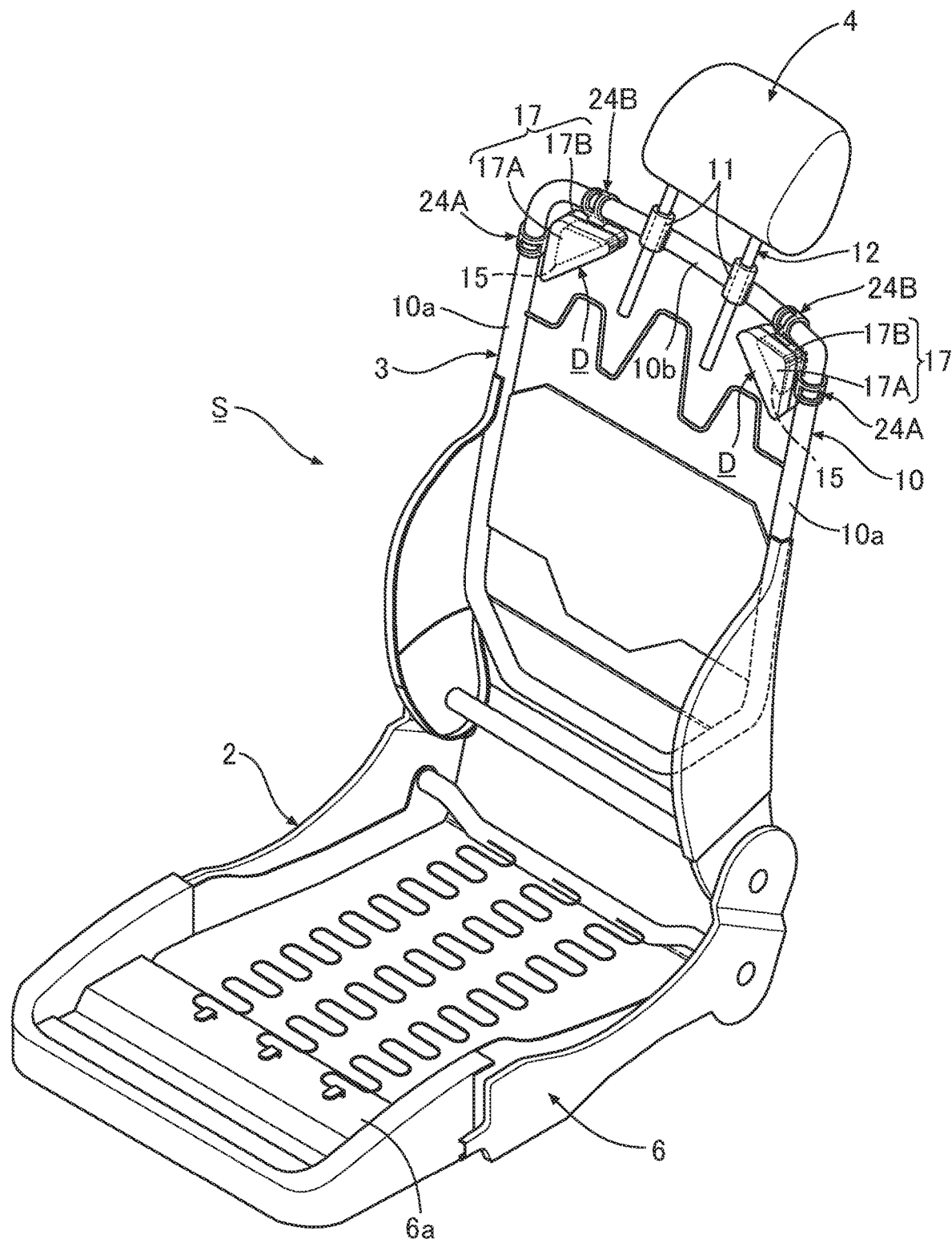
FIG. 15 is a perspective view showing the internal structure of an automobile seat showing a third embodiment of the present invention.

FIG. 15 shows a third embodiment, and in this arrangement the dynamic damper D, which includes the damper case 17 having a substantially right-angled triangle shape when viewed from the front, is disposed in inner corners of upper left and right corner parts of the seat back frame 10 of the seat back 3, and the pair of elastic support parts 24A, 24B formed on an upper face and one side face of the damper case 17 snap-engage with a longitudinal frame member 10a and a lateral frame member 10b respectively of the seat back frame 10. The structure of the dynamic damper D is basically the same as that of the first embodiment apart from the shapes of the damper case 17 and the weight 15 housed therein.

In accordance with the third embodiment, it is possible to carry out effective damping of the seat back 3 by the action of the dynamic damper D, which is disposed in the uppermost part of the seat back frame 10. Moreover the dead space of the inner corner of the upper corner part of the seat back frame 10 can be utilized effectively for placing the dynamic damper D. The dynamic damper D may be disposed in an inner corner of only one of the upper left and right corner parts of the seat back frame 10.

Figure 16:
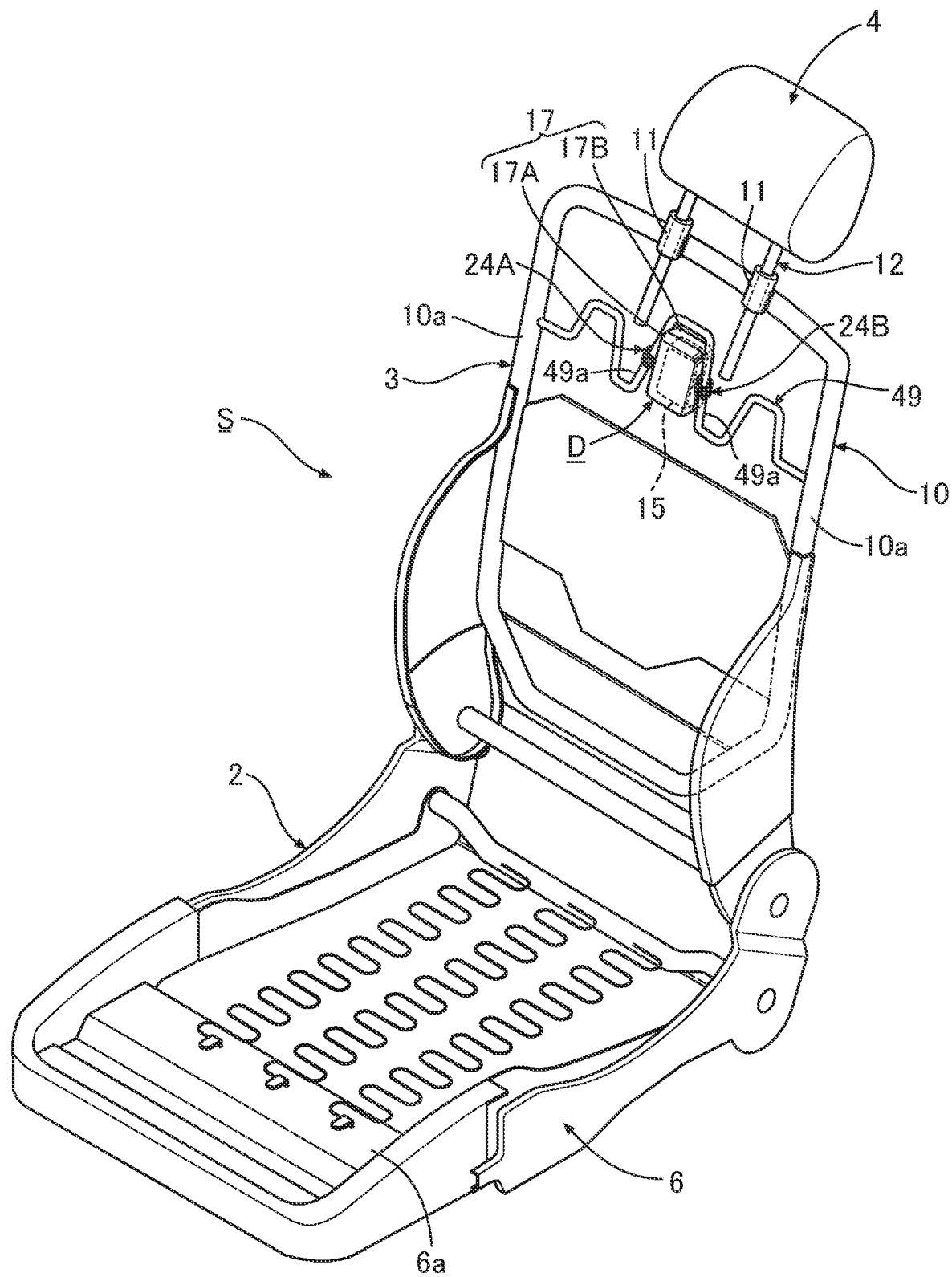
FIG. 16 is a perspective view showing the internal structure of an automobile seat showing a fourth embodiment of the present invention.

FIG. 16 shows a fourth embodiment, and in this arrangement the pair of elastic support parts 24A, 24B formed on the left and right side faces of the damper case 17 snap-engage with a pair of inclined frame portions 49a, inclined in opposite directions from each other, in a middle part of an undulating frame member 49 providing an integral link between upper parts of the left and right longitudinal frame members 10a of the seat back frame 10. In this arrangement, the pair of elastic support parts 24A, 24B are disposed obliquely so as to correspond to the pair of inclined frame portions 49a, and the pair of elastic support parts 24A, 24B are prevented from moving in the up-and-down direction on the pair of inclined frame portions 49a. The structure of the dynamic damper D is basically the same as that of the first embodiment. It is thus possible by the action of one dynamic damper D mounted in the upper middle part of the seat back frame 10 to suppress effectively vibration of the seat back 3.

Figure 17:
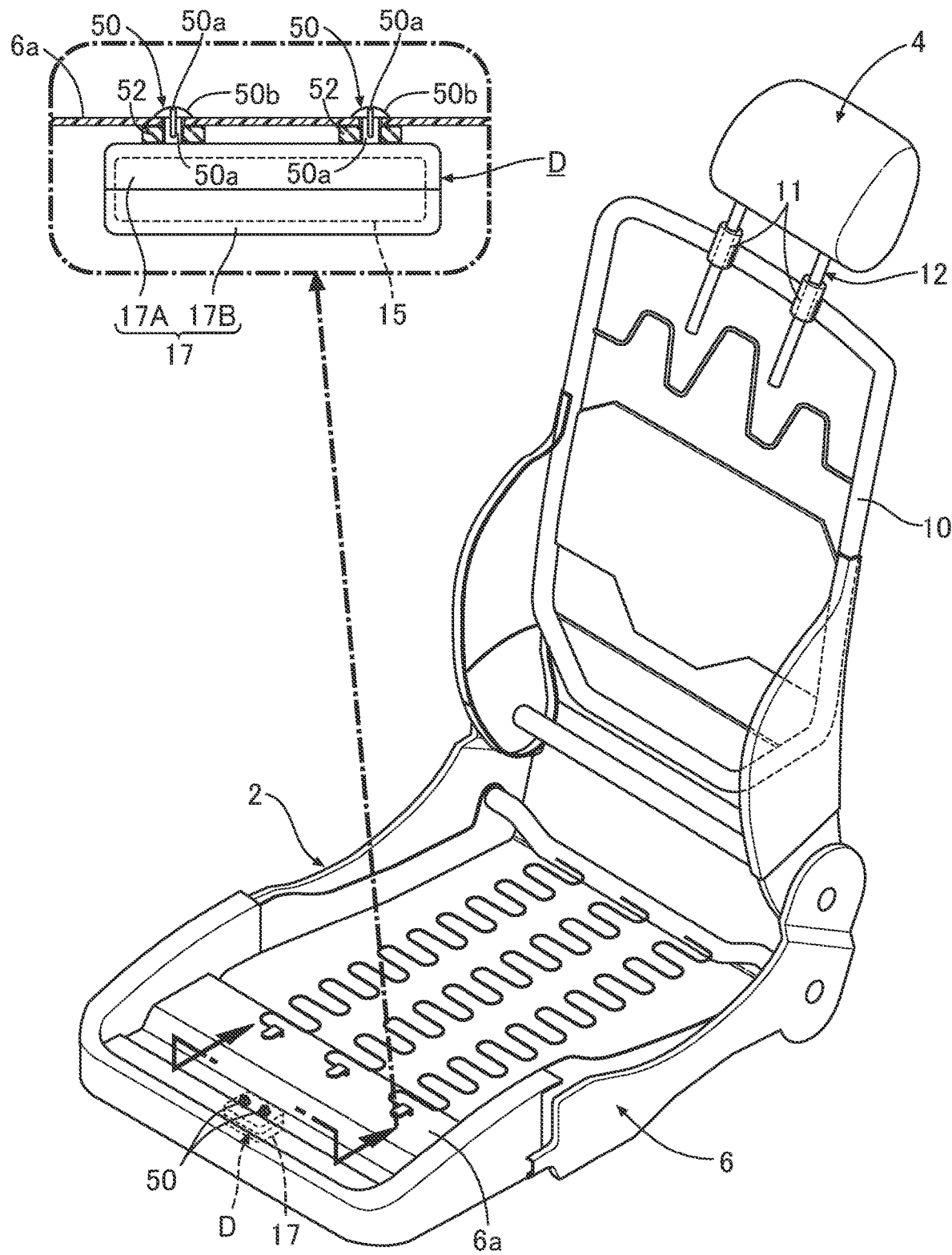
FIG. 17 is a perspective view showing the internal structure of an automobile seat showing a fifth embodiment of the present invention.

FIG. 17 shows a fifth embodiment, and in this arrangement in order to suppress vibration of the seat cushion 2 the damper case 17 of the dynamic damper D is mounted on a front reinforcing plate 6*a* that is welded to a front part of the seat cushion frame 6 and extends in the left-and-right direction. In this case, a pair of elastic support parts 50 are formed on an upper face of the damper case 17. Each elastic support part 50 is formed from a shaft portion 50*a* protruding from an outside face of the damper case 17, and an arrowhead-shaped latching projection 50*b* formed at the extremity of the shaft portion 50*a*; in order to make it possible for the latching projection 50*b* to elastically decrease in diameter, a slit 50*c* is provided through from the extremity of the latching projection 50*b* to the shaft portion 50*a*. An elastic collar 52 made of a rubber is fitted around the shaft portion 50*a*. On the other hand, a pair of latching holes 51 are bored in the front reinforcing plate 6*a* so as to correspond to the pair of elastic support parts 50, and pushing the latching projections 50*b* of the elastic support parts 50 into the latching holes 51 from below makes the latching projections 50*b* pass through the corresponding latching hole 51 while elastically decreasing in diameter and then increase in diameter to their original shape, that is, to snap-engage, thereby preventing them from disengaging from the latching holes 51. In this arrangement, the elastic collar 52 fitted around the shaft portion 50*a* is compressed between the front reinforcing plate 6*a* and the damper case 17, and due to the elastic force thereof the latching projection 50*b* is retained by the front face of the front reinforcing plate 6*a* without looseness. Other than the elastic support parts 50, the structures of the damper case 17, the weight housed therein, and the sheet-shaped elastic members S1 to S3 covering the weight 15 are basically the same as those of the first embodiment. Parts in FIG. 17 corresponding to those of the first embodiment are denoted by the same reference numerals and symbols, duplication of the explanation being omitted.

In accordance with the fifth embodiment, it is possible by the action of the dynamic damper D disposed on the front end part of the seat cushion frame 6 to suppress effectively vibration of the seat cushion 2. Furthermore, the dead space beneath the front reinforcing plate 6*a* at the front end of the seat cushion frame 6 can be utilized effectively for placing the dynamic damper D and, moreover, a simple pushing-in operation enables the elastic support parts 50 to be snap-engaged with the latching holes 51 of the front reinforcing plate 6*a*, thus allowing the damper case 17 to be easily mounted.

Figure 18:
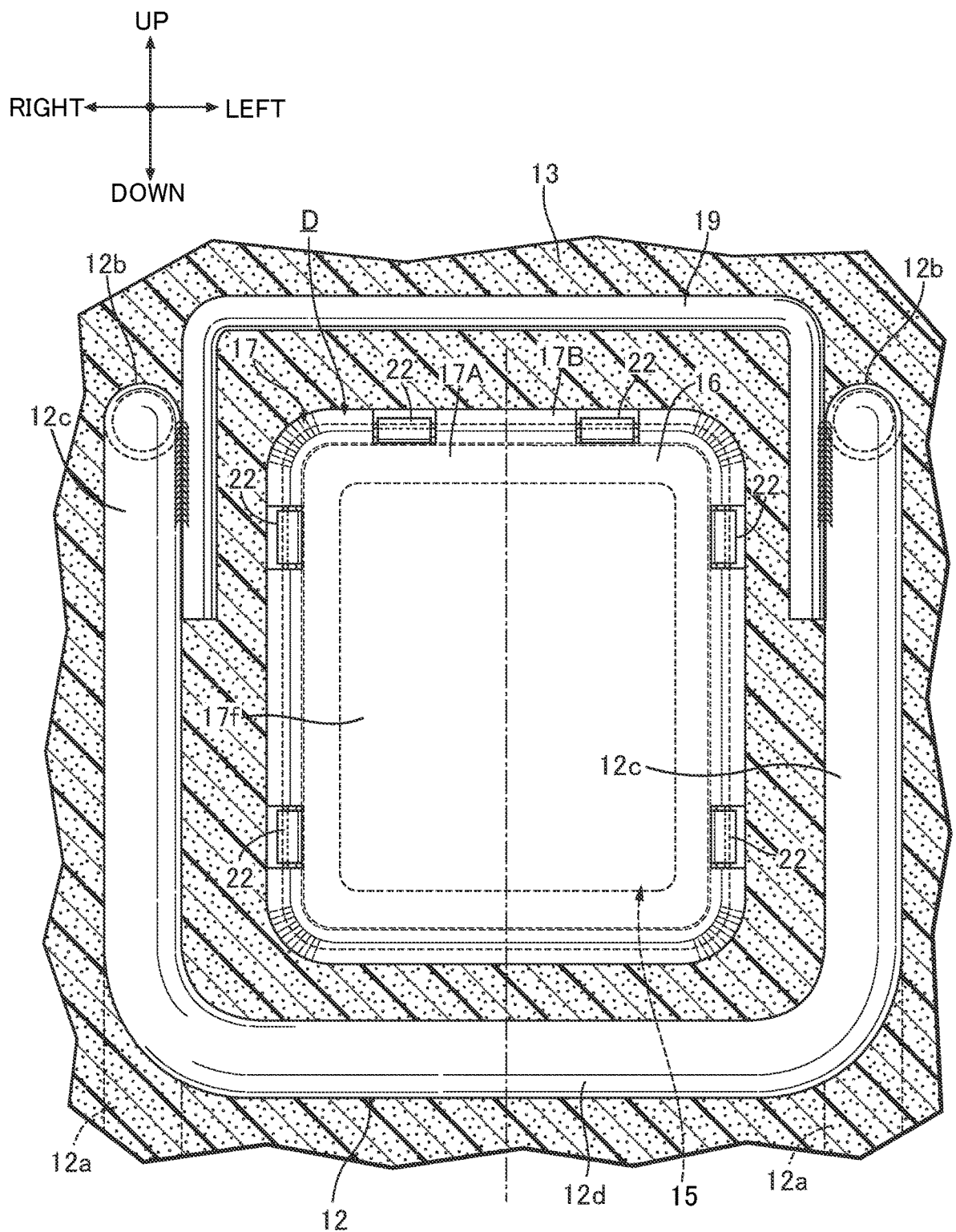
FIG. 18 is a sectional view, corresponding to FIG. 3, showing a sixth embodiment of the present invention.

FIG. 18 shows a sixth embodiment; in this arrangement the damper case 17 is provided with no elastic support part, the damper case 17 being embedded in and retained by the cushion member 13, which is harder than the sheet-shaped elastic members S1 to S3; the arrangement is otherwise the same as that of the first embodiment, and parts in FIG. 18 corresponding to those of the first embodiment are denoted by the same reference numerals and symbols, duplication of the explanation being omitted.

In accordance with the sixth embodiment, since no elastic support part is provided on the damper case 17, the structure of the dynamic damper D can accordingly be simplified. When the damper case 17 is embedded in the cushion member 13, which is made of a foam material, the damper case 17 is hung from the headrest frame 12 by thread so as to retain it at a predetermined position, and the thread is cut after molding the cushion member 13.

Figure 19:
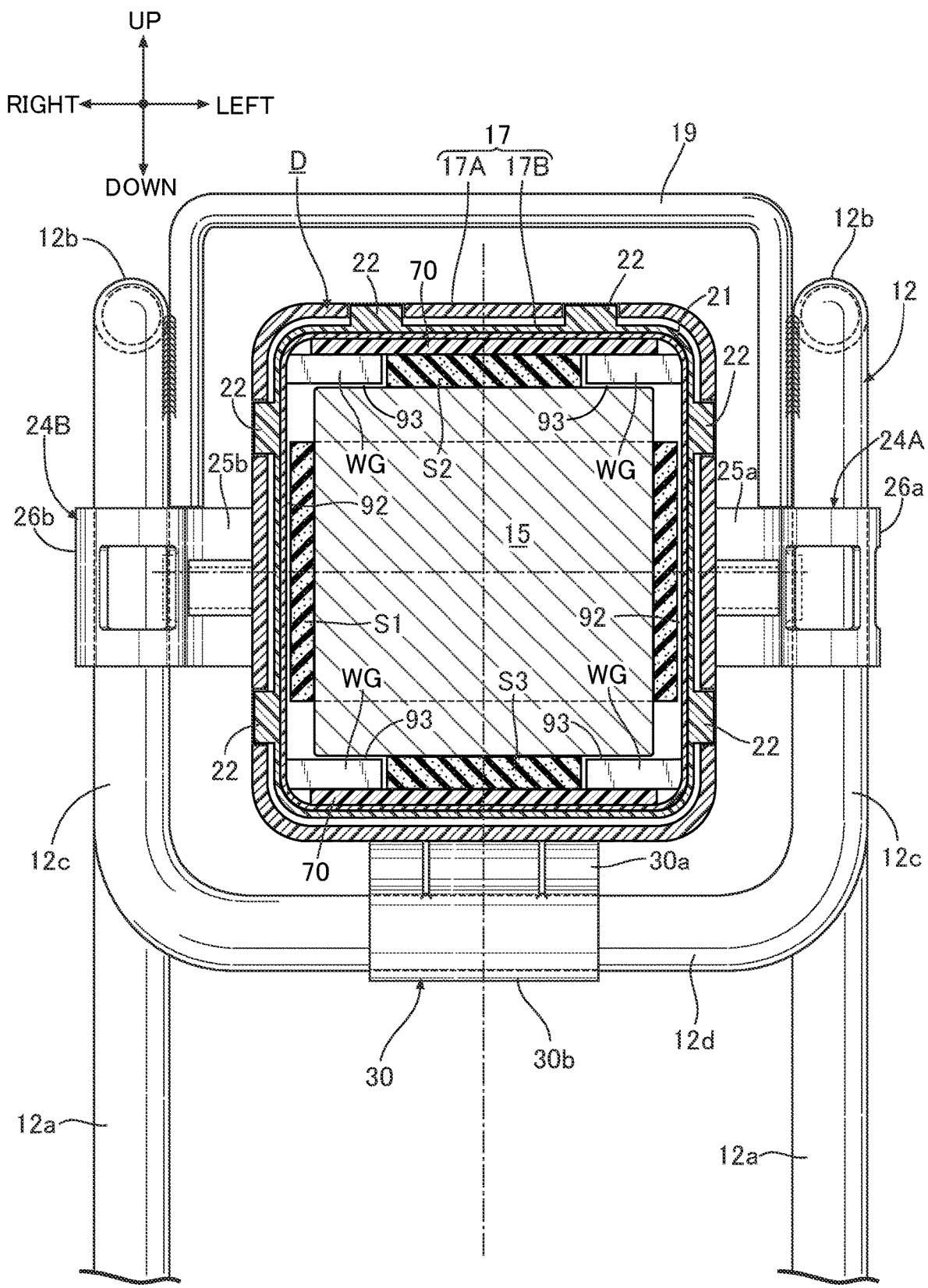
FIG. 19 is a sectional view, corresponding to FIG. 3, showing a seventh embodiment of the present invention.

FIG. 19 shows a seventh embodiment. In the embodiments described above, the weight 15 and the weight guide part WG are abutted against and engaged with each other in the up-and-down direction (that is, they are directly abutted against each other while being slidable in the fore-and-aft and left-and-right directions), whereas in the seventh embodiment a slight gap 93 is set between the weight 15 and the weight guide part WG in the up-and-down direction, and the weight 15 can be slightly displaced in the up-and-down direction with respect to the damper case 17 over the range of the gap 93.

The arrangement of the seventh embodiment is otherwise the same as that of the first embodiment, and constituent elements are merely denoted by the same reference numerals and symbols as the corresponding constituent elements of the first embodiment, further explanation being omitted. In the seventh embodiment also, basically the same operational effects as those of the first embodiment can be achieved.

Furthermore, in the seventh embodiment, since the slight gap 93 is set between the weight 15 and the weight guide part WG in the up-and-down direction, during a process in which the weight 15 vibrates in the fore-and-aft or left-and-right direction while accompanied by elastic deformation of the second and third elastic members S2, S3, the weight 15 does not receive a large sliding resistance from the weight guide part WG due to the gap 93 being present, and the rising damper characteristics of the dynamic damper D can be stabilized. When the weight 15 is made to vibrate greatly in the up-and-down direction also, since the weight 15 abuts against the weight guide part WG so as to fill the gap 93, movement in the up-and-down direction therebeyond is restricted. In this case also, movement in the fore-and-aft and left-and-right directions of the weight 15 is allowed due to the weight 15 undergoing sliding contact with the weight guide part WG in the fore-and-aft and left-and-right directions.

Embodiments of the present invention are explained above, and the present invention is not limited to the embodiments and can be modified in a variety of ways as long as the modifications do not depart from the subject matter thereof.

For example, at least one embodiment among the third to fifth embodiments may be employed in addition to the first or second embodiment.

Furthermore, one of the first and second half bodies 17A, 17B forming the damper case 17 may be formed into a box shape having an opening and the other may be formed into a lid shape that closes the opening.

Moreover, the vehicular seat 1 of the present invention is not limited to one for an automobile and may be one for a railroad car, an aircraft, etc. The seat 1 may be placed so as to protrude from a wall face of a vehicle.

Furthermore, the embodiments show a case in which movement of the weight 15 in the up-and-down direction is restricted by the weight guide part WG (movement restriction means), but the direction of movement to be restricted can be freely set according to the damping target, for example, as shown in FIGS. 11 (*b*) and (*c*) and FIGS. 12 (*d*) to (*f*) movement of the weight 15 in the left-and-right direction may be restricted, or alternatively, although not illustrated, movement of the weight 15 in the fore-and-aft direction may be restricted.

Moreover, the embodiments show a case in which the elastic members S1 to S3 are molded into a sheet shape and they are then fixed to the weight 15 so as to cover it, but in the present invention an elastic member may be molded integrally with the periphery of the weight 15.

Furthermore, the embodiments show a case in which the headrest 4, which is a component separate from the seat back 3, is mounted thereon afterward, but the present invention may be implemented as a dynamic damper that is provided on a headrest-equipped seat back in which the headrest is integrated with the seat back.

Moreover, the embodiments show a case in which the dynamic damper D is equipped with the movement restriction means (weight guide part WG) for restricting movement of the weight 15 in a predetermined direction (the up-and-down direction), but in the present invention (solution means for first problem) the movement restriction means may be omitted and the weight 15 may be formed so that it can move in all of the fore-and-aft, left-and-right, and up-and-down directions.

Furthermore, the embodiments show a case in which the dynamic damper D is equipped with the corner part checking means C, C' for checking at least some of the corner parts E of the weight 15, but in the present invention (solution means for second problem) the corner part checking means may be omitted, thus making it impossible for the corner part E of the weight 15 to be checked.

Embodiment of Solution Means for Third Problem

A first embodiment of the present invention shown in FIG. 20 to FIG. 25 (that is, solution means for third problem) is first explained.

Figure 20:
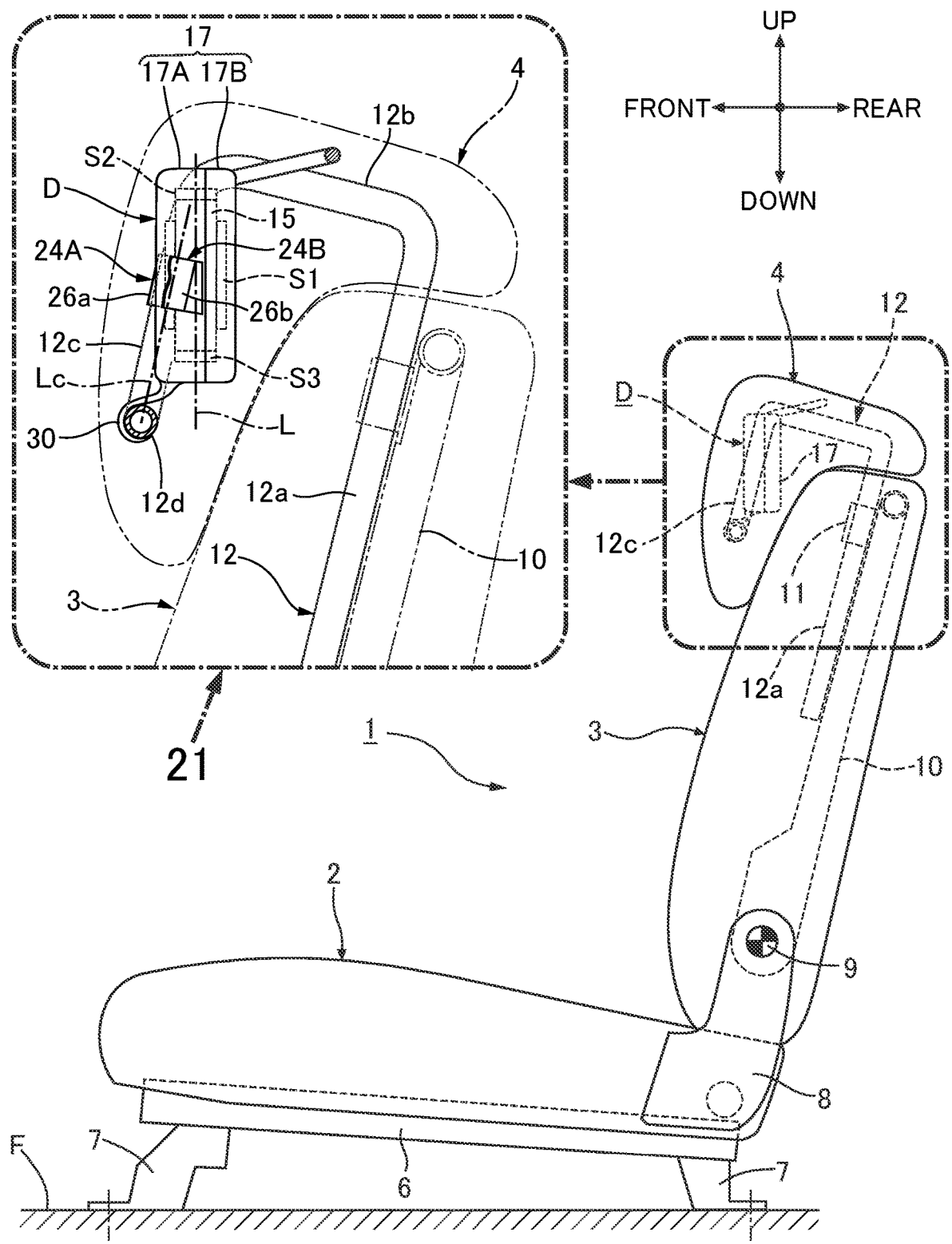
FIG. 20 is a side view of an automobile seat device related to the first embodiment of the present invention (that is, the solution means for the third problem).

In FIG. 20, an automobile seat 1 is formed from a seat cushion 2, a seat back 3, and a headrest 4. The seat cushion 2 has a seat cushion frame 6 having a plurality of support legs 7 formed on its lower part, and the support legs 7 are fixed to an automobile floor F. A conventionally known position-adjusting mechanism that can adjust the position of the support legs 7 in the fore-and-aft direction may be disposed between the support legs 7 and the floor F.

A pair of left and right brackets 8 protruding upward are provided so as to be connected to a rear end part of the seat cushion frame 6, and a seat back frame 10 of the seat back 3 is reclinably linked to the brackets 8 via a pivot shaft 9. The seat back frame 10 is inclined upward to the rear and extends in the up-and-down direction.

A pair of left and right support tubes 11 are fixedly provided on an upper end part of the seat back frame 10, these support tubes 11 support the headrest 4 so that it can be raised and lowered and can be fixed, and the headrest 4 can be adjusted to any height.

As shown in FIG. 21 to FIG. 25, the headrest 4 is formed into a teardrop shape from a headrest frame 12, a foamed urethane cushion member 13 supported by the headrest frame 12, and a skin 14 covering the surface of the cushion member 13, and a dynamic damper D is mounted on the headrest frame 12.

The headrest frame 12 is formed by bending a pipe material and is formed from a pair of left and right main frame members 12a supported on the pair of support tubes 11, upper frame members 12b bending forward from upper ends of the main frame members 12a, a pair of left and right inclined frame members 12c extending while bending downward from front ends of the upper frame members 12b, and a lateral frame member 12d extending in the left-and-right direction in order to provide an integral link between lower end parts of the inclined frame members 12c, and a reinforcing cross bar 19 having a smaller diameter than that of the pipe material is welded to upper parts of the left and right inclined frame members 12c so as to bridge them.

The cushion member 13 is formed so as to cover the headrest frame 12 from upper parts of the main frame members 12a to the lateral frame member 12d. That is, the cushion member 13 is fixedly supported on the headrest frame 12 over a range from the upper parts of the main frame members 12a to the lateral frame member 12d at the same time as it is molded, and the surface of the cushion member 13 is covered by the skin 14. Before forming the cushion member 13, the dynamic damper D is mounted by utilizing the inclined frame members 12c and the lateral frame member 12d.

The inclined frame member 12c is one example of the inclined pillar part of the present invention that is inclined upward to one of the front and rear sides (to the rear side in the present embodiment) and extends in the up-and-down direction, and the lateral frame member 12d is one example of the lateral linking bar of the present invention that provides a link between lower ends of the inclined pillar parts.

The dynamic damper D includes a weight 15, a first elastic member S1 covering an outside face of the weight 15 between upper and lower end faces over the entire periphery, second and third elastic members S2, S3 covering the upper and lower end faces respectively of the weight 15, and a damper case 17 housing the weight 15 and the elastic members S1 to S3. As described later, the weight 15 is elastically supported on the damper case 17 mainly via the second and third elastic members S2, S3 so that it can vibrate at least in the fore-and-aft direction.

The weight 15 is made of a metal (for example, cast iron), and an upper half and a lower half thereof are formed symmetrically; in the illustrated example the weight 15 is formed into a substantially rectangular parallelepiped that is flat in the fore-and-aft direction and extends in the up-and-down direction. As is clear from FIG. 20 and FIG. 21 also, the weight 15 is disposed so as to extend linearly in the up-and-down direction on one vertical line L (for example, a longitudinal center line of the damper case 17) when the seat is viewed from the side, and at the same time the pair of upper and lower second and third elastic members S2, S3 sandwiching the weight 15 in the up-and-down direction are disposed on the one vertical line L when the seat is viewed from the side while being arranged side by side with the weight 15 in the up-and-down direction. The second and third elastic members S2, S3 are one example of the elastic member of the present invention.

Figure 21:
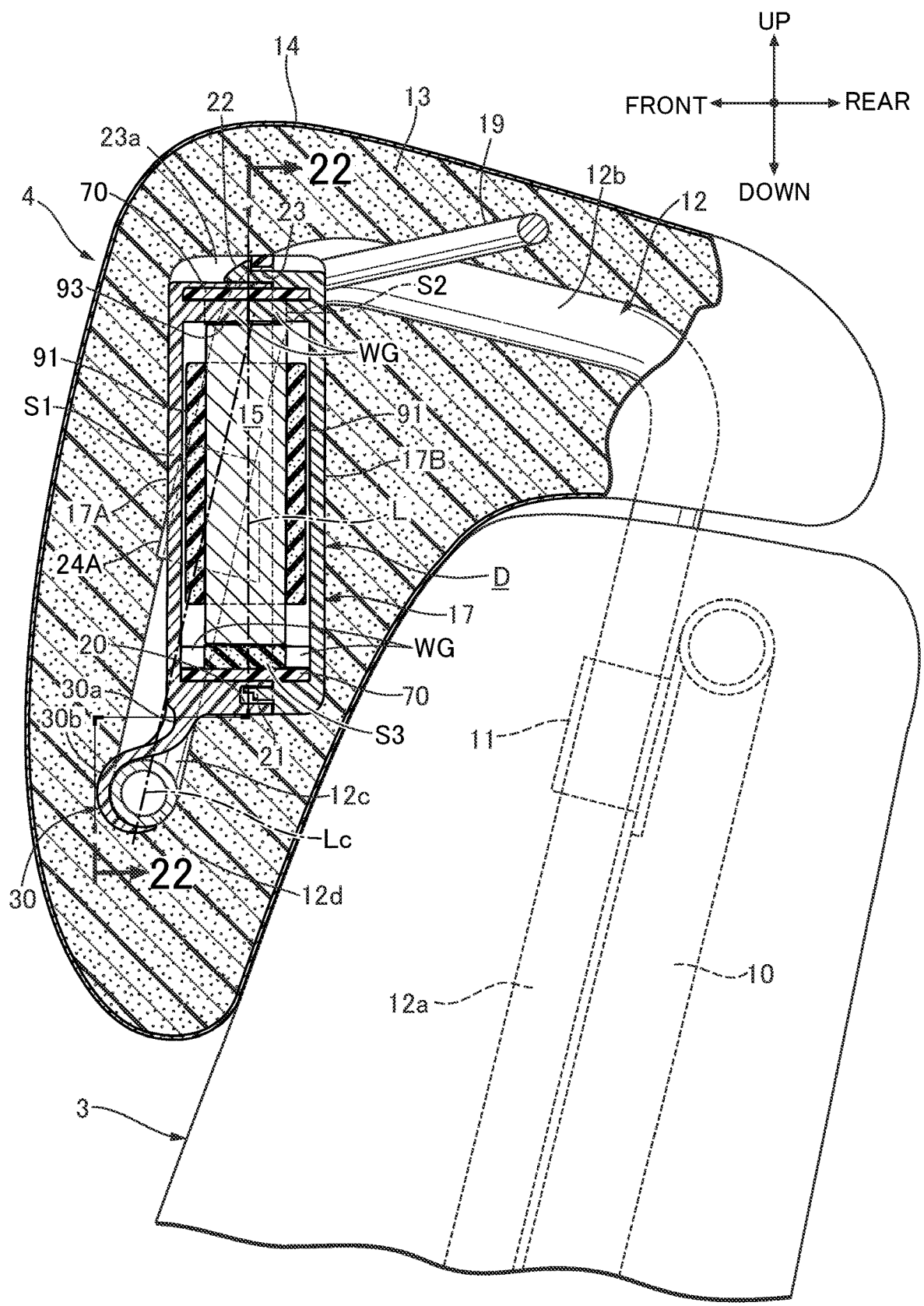
FIG. 21 is an enlarged sectional view of part shown by arrow 21 of FIG. 20 (a sectional view along line 21-21 in FIG. 22).
Figure 22:
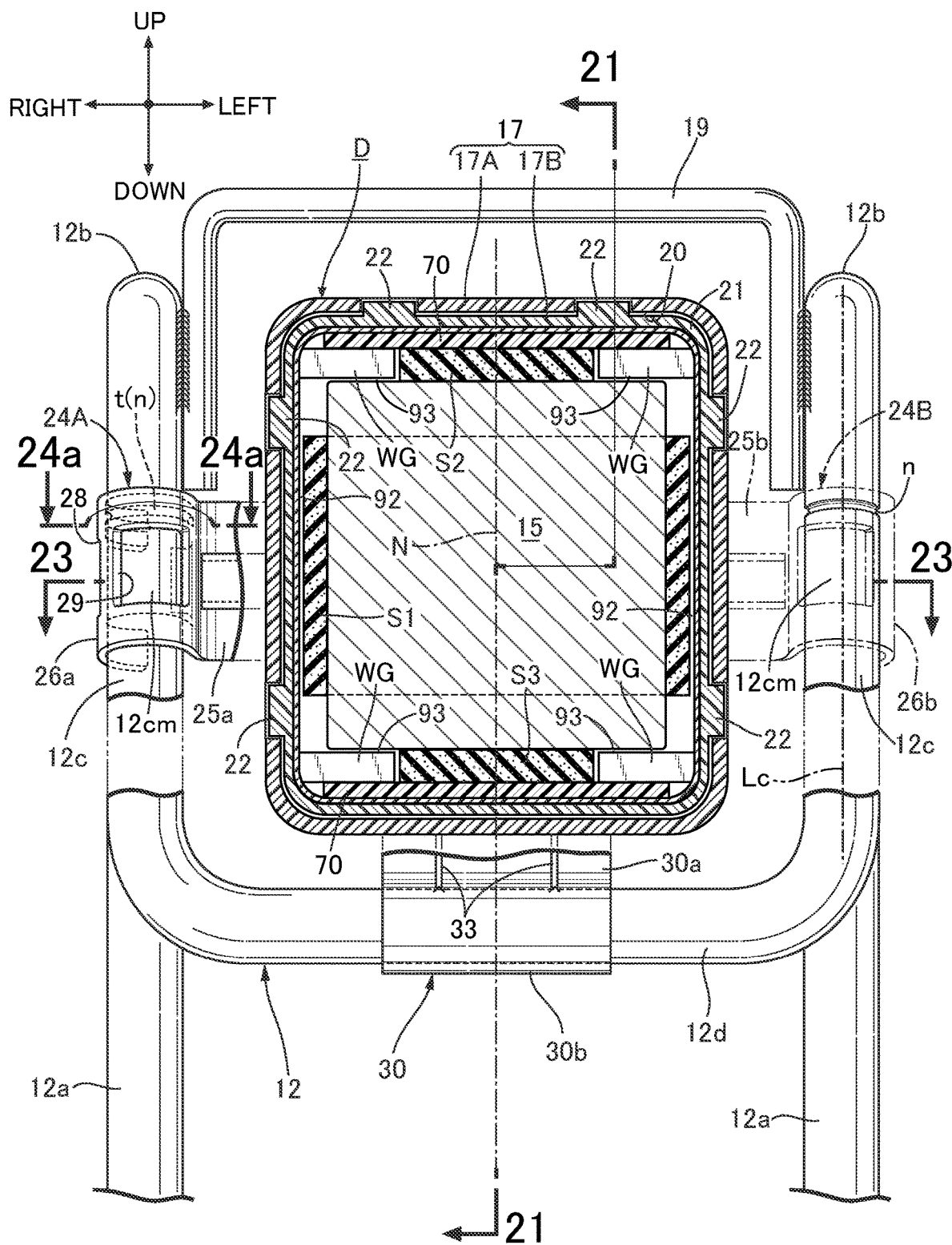
FIG. 22 is a front view showing the internal structure of a headrest (a sectional view along line 22-22 in FIG. 21).

As is clearly shown in FIG. 20 and FIG. 21, the damper case 17 is also disposed so as to extend linearly in the up-and-down direction on the one vertical line L when the seat is viewed from the side. That is, the damper case 17 is set so that its longitudinal direction is vertical when the seat is viewed from the side, and is disposed so that front and rear side faces of the damper case 17 extend in the up-and-down direction along the one vertical line L. The damper case 17 in the vertical attitude is disposed so as to overlap and obliquely intersect an axis Lc of the inclined frame member 12c (the inclined pillar part) when the seat is viewed from the side.

Moreover, the damper case 17 is disposed so that an upper part and a lower part of the damper case 17 protrude further forward and rearward respectively than the inclined frame member 12c and the amount of forward protrusion of the upper part with respect to the inclined frame member 12c is smaller than the amount of rearward protrusion of the lower part.

The first elastic member S1 is formed into a rectangular sheet shape and fixed (for example, adhered) to a side face of the weight 15 in a state in which it is wrapped around the outside face of the weight 15 over the entire periphery. In a state in which the first elastic member S1 and the weight 15 are set within the damper case 17, slight gaps 91, 92 are set between the first elastic member S1 and inner faces of front and rear side walls and inner faces of left and right side walls of the damper case 17. When the weight 15 vibrates in the fore-and-aft and left-and-right directions, front and rear side faces and left and right side faces of the first elastic member S1 collide with the inner faces of the damper case 17 so as to fill the gaps 91, 92, and the impact at that time is absorbed and alleviated by elastic deformation of the first elastic member S1.

The first elastic member S1 may be disposed so that the gaps 91, 92 are not generated in a state in which the first elastic member S1 and the weight 15 are set within the damper case 17 (that is, it abuts against the inner faces of the damper case 17 in a non-compressed state or a slightly compressed state).

An upper end part and a lower end part of the first elastic member S1 are formed into an end part shape so as to expose an upper end part and a lower end part, including left and right corner parts on the upper and lower sides, of the weight 15 as a band shape (that is, so as to have an end part shape that is set further back toward the center in the up-and-down direction than the upper end and the lower end of the weight 15, in other words so as to have a size that is shorter in the up-and-down direction than the weight 15).

Since the weight 15 is formed so as to have a polygonal shape in cross section (more specifically, in a horizontal cross section) because of the weight 15 being formed into a substantially rectangular parallelepiped shape as described above, the first elastic member S1 has a bent part S1c corresponding to a corner on an outside face of the weight 15. The bent part S1c is provided with bending facilitation means that makes it easier to bend than a portion of the first elastic member S1 other than the bent part S1c.

Figure 23:
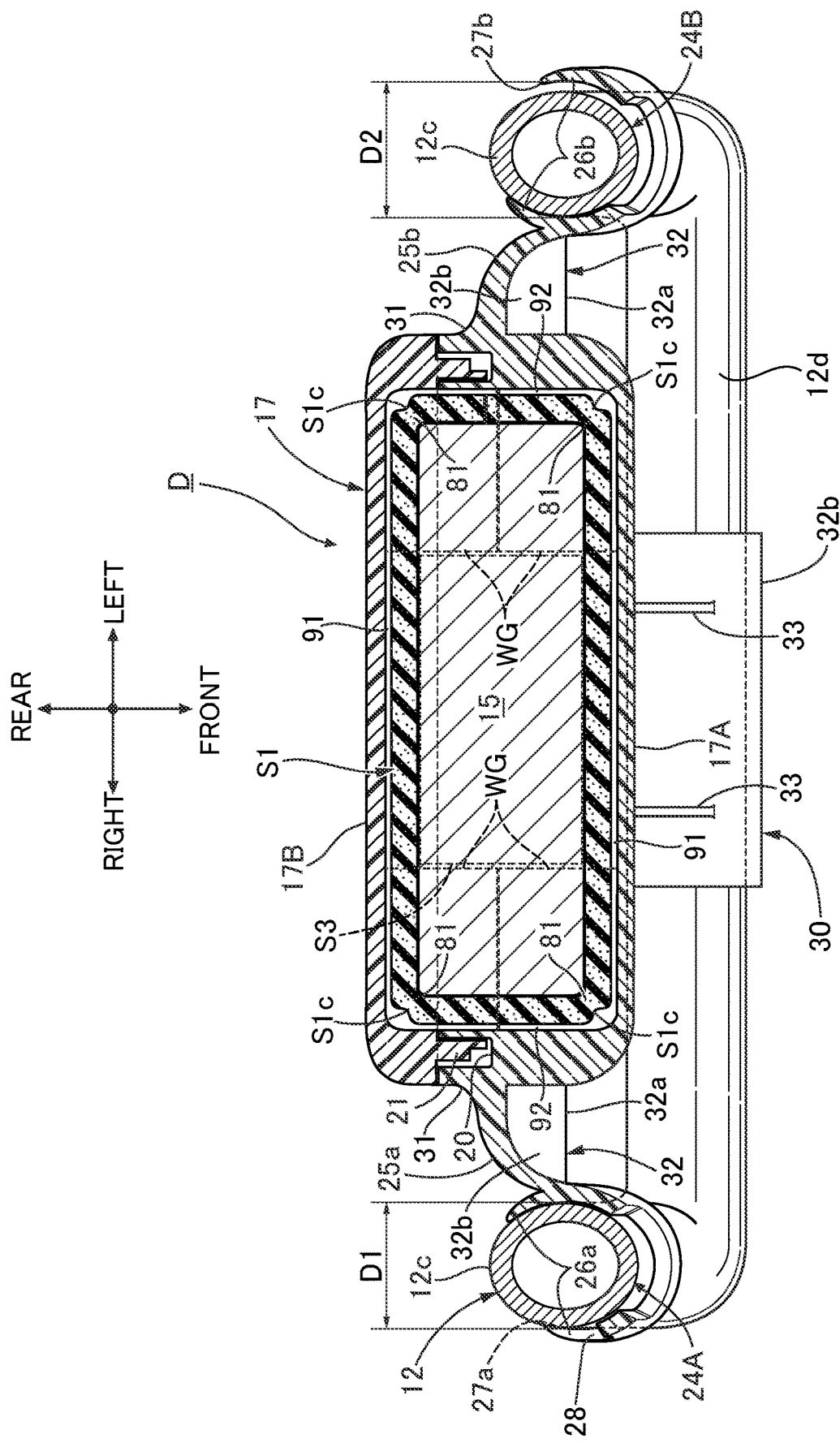
FIG. 23 is an enlarged sectional view along line 23-23 in FIG. 22.
Figure 24:
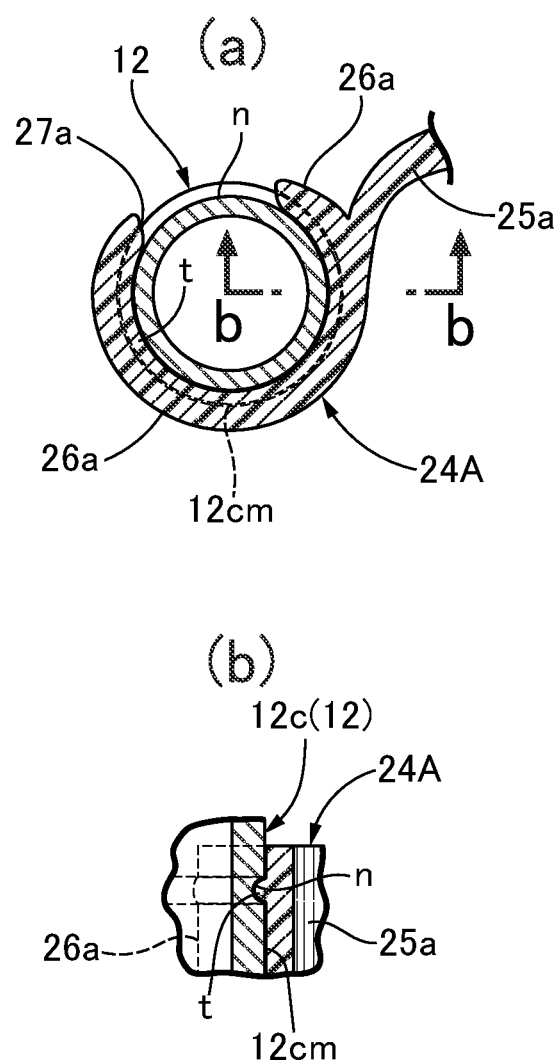
FIG. 24 (a) is an enlarged sectional view along line 24a-24a in FIG. 22, and FIG. 24 (b) is a sectional view along line b-b in FIG. 24 (a).
Figure 25:
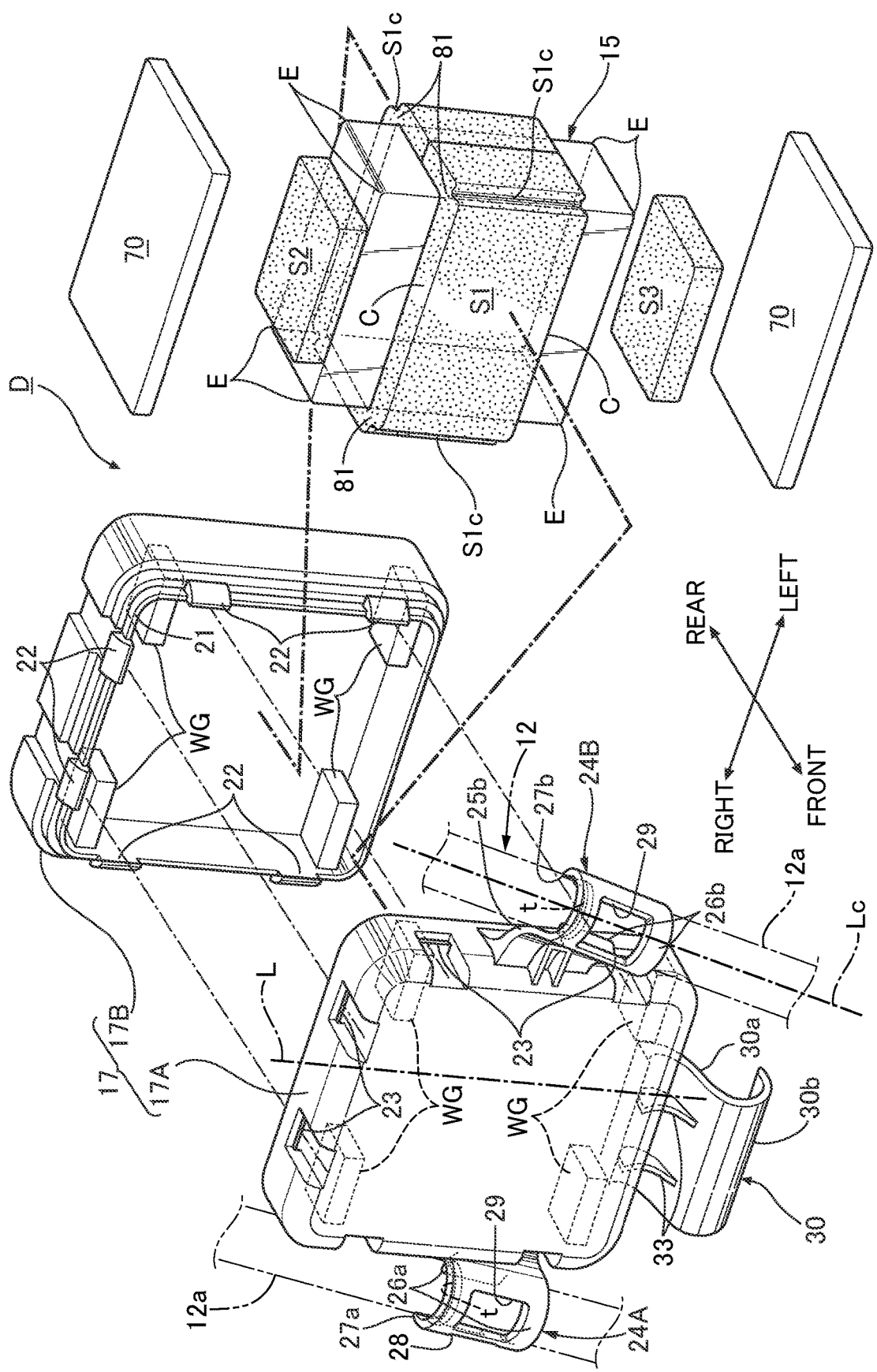
FIG. 25 is an exploded perspective view of a dynamic damper.

The bending facilitation means is formed, as shown in FIG. 23 and FIG. 25 in the present embodiment, from a thin part 81 that is formed in part of the first elastic member S1 so as to correspond to the corner of the outside face of the weight 15, that is, a corner part. Furthermore, although not illustrated, the bending facilitation means may be formed from a plurality of small holes bored in part of the first elastic member at intervals so as to correspond to a corner of the weight 15 (that is, in the form of perforations along the bent part S1c).

Each of the elastic members S1 to S3 is desirably formed from a sheet-shaped elastic material that is softer than the cushion member 13. In the embodiment, the first elastic member S1 and the second and third elastic members S2, S3 are formed from different elastic materials, for example, elastic materials that are made of a urethane foam molded so as to have a desired thickness and have different foaming ratios (that is, elastic forces).

In particular, in a state in which the second and third elastic members S2, S3 are set within the damper case 17, they are thicker than the first elastic member S1 and have a higher hardness. In order to impart sufficient hardness to the second and third elastic members S2, S3, in the above set state the second and third elastic members S2, S3 are placed in a compressed state between inner faces of the upper and lower side walls of the damper case 17 and the upper and lower end faces of the weight 15.

The first elastic member S1 and the second and third elastic members S2, S3 may be formed from elastic materials made of different materials (for example, a urethane foam material and a rubber material) or may be formed from the same elastic material. Even in a free state, the second and third elastic members S2, S3 are desirably formed from an elastic material that has higher hardness than the first elastic member S1.

The second and third elastic members S2, S3 are formed into a rectangular sheet shape that is smaller than the cross-sectional shape of the weight 15, and joined (for example, adhered) to the upper and lower end faces of the weight 15. A support plate 70, which is formed from a rectangular flat plate-shaped friction-reducing material, is positioned on the side opposite to the weight 15, and abuts against the inner faces of the upper and lower side walls of the damper case 17, is joined (for example, adhered) to the second and third elastic members S2, S3, and the second and third elastic members S2, S3 are disposed in a compressed state between the end face of the weight 15 and the support plate 70, which is pressed against and fixed to the inner faces of the upper and lower side walls of the damper case 17 by means of the elastic force of the second and third elastic members S2, S3.

In this way, due to the outer ends of the second and third elastic members S2, S3 not being directly secured to the inner faces of the upper and lower side walls of the damper case 17 but being pressed thereagainst and fixed thereto via the support plate 70, the second and third elastic members S2, S3 can easily be pressed against and fixed to the inner face of the damper case 17 via the support plate 70 without looseness. Since the support plate 70, which is formed from a friction-reducing material, comes into smooth sliding contact with the inner face of the damper case 17 when carrying out the fixing operation, the workability is very good, and the ease of assembly of the dynamic damper can be enhanced.

The support plate 70 of the present embodiment is formed from a synthetic resin material having a low coefficient of friction on the surface, thereby making it possible for the support plate 70 to be easily molded into a desired shape. The support plate 70 may be formed from another material having a low coefficient of friction on the surface, for example, a metal plate having a polished surface. The support plate 70 can be omitted, and the second and third elastic members S2, S3 may be directly joined (for example, adhered, etc.) to the inner faces of the upper and lower side walls of the damper case 17.

The weight 15, which is covered with the sheet-shaped first to third elastic members S1 to S3 as described above, is housed within the damper case 17, which is formed from two, that is, front and rear parts. The weight 15 is elastically supported by the damper case 17 mainly via the second and third elastic members S2, S3 so that it can vibrate.

As shown in FIG. 21 to FIG. 25, the damper case 17 has a shape that is substantially similar to the external shape of the weight 15, that is, a box shape that is flat in the fore-and-aft direction and extends in the up-and-down direction, a front wall thereof is formed as a flat face so as to correspond to a front face 15f of the weight 15 or a curved face that is similar thereto, and a rear wall thereof is formed as a flat face so as to correspond to a rear face 15r of the weight 15 or a curved face that is similar thereto.

The damper case 17 is divided into two, that is, a first case half body 17A on the front side and a second case half body 17B on the rear side, and each of the case half bodies 17A, 17B is molded from a synthetic resin. A fitting groove 20 and a fitting projecting wall 21 that can be fitted together are formed on one and the other respectively of opposing faces of the two case half bodies 17A, 17B, a plurality of linking claws 22 protruding outward are formed on an extremity part of the fitting projecting wall 21, and a plurality of linking holes 23 into which the linking claws 22 can elastically snap-engage are formed in a bottom part of the fitting groove 20.

First and second elastic support parts 24A, 24B are formed integrally with right and left side walls of the first case half body 17A. The first and second elastic support parts 24A, 24B are each formed from plate-shaped arms 25a, 25b protruding outward from the right and left side walls of the first case half body 17A, and major arc-shaped gripping claws 26a, 26b that are provided so as to be connected to extremities of the arms 25a, 25b and can snap-engage with the inclined frame members 12c so as to grip them.

That is, the major arc-shaped gripping claws 26a, 26b can elastically grip the inclined frame members 12c beyond a half of the periphery. The major arc-shaped gripping claws 26a, 26b have openings 27a, 27b oriented rearward so as to engage with grip portions 12cm of the inclined frame members 12c from the front. Therefore, a rearward-facing load from the head of an occupant acts in a direction to make the gripping claws 26a, 26b of the first and second elastic support parts 24A, 24B engage with the inclined frame members 12c, thus making it possible to prevent the gripping claws 26a, 26b from disengaging therefrom. It is also possible, by selecting the length for the arms 25a, 25b, to make the distance between the center lines of the gripping claws 26a, 26b coincide with the distance between the center lines of the grip portions 12cm of the two inclined frame members 12c, thus enabling the gripping claws 26a, 26b to be appropriately engaged with the inclined frame members 12c.

The major arc-shaped gripping claws 26a, 26b are formed so that internal diameters D1, D2 thereof are different from each other. In the illustrated example, the internal diameter D2 of the gripping claw 26b of the second elastic support part 24B is set to be larger than the internal diameter D1 of the gripping claw 26a of the first elastic support part 24A. The major arc-shaped gripping claws 26a, 26b are formed so as to have different stiffnesses from each other. In the illustrated example, a cutout 28 is provided in an extremity part of the gripping claw 26a of the first elastic support part 24A so that the stiffness of the gripping claw 26a of the first elastic support part 24A is lower than that of the gripping claw 26b of the second elastic support part 24B, or the thickness of the gripping claw 26a is set to be thinner than the gripping claw 26b. The first and second elastic support parts 24A, 24B are disposed so as to sandwich the center of gravity of the weight 15.

Each of the gripping claws 26a, 26b is provided with a window hole 29, and the state in which the gripping claws 26a, 26b and the inclined frame members 12c are engaged can be visually checked through the window hole 29. At least one positioning projecting part t is projectingly provided integrally with an inner face of each of the gripping claws 26a, 26b, the positioning projecting part t being capable of concavo-convexly engaging with at lease one annular notch n recessed in an outer peripheral face of the grip portion 12cm of the inclined frame members 12c facing the gripping claws 26a, 26b. By virtue of concavo-convex engagement between the notch n and the positioning projecting part t, it is possible to prevent effectively the gripping claws 26a, 26b from being displaced in the axial direction with respect to the grip portion 12cm of the inclined frame members 12c. In this way, the notch n and the positioning projecting part t form, in cooperation with each other, concavo-convex engagement means that provides concavo-convex engagement between the gripping claws 26a, 26b and the inclined frame members 12c to thus exhibit an effect in preventing the displacement.

In addition, another embodiment in which the internal diameters D1, D2 of the gripping claws 26a, 26b are set to be the same can also be implemented.

Furthermore, a positioning support part 30 is formed integrally with a lower wall of the first case half body 17A. The positioning support part 30 is formed from a curved plate-shaped arm 30a that protrudes downward from the lower wall of the first case half body 17A and extends forward, and a U-shaped abutment claw 30b that is provided so as to be connected to the lower end of the arm 30a and that can abut against and engage with the lateral frame member 12d, and the abutment claw 30b abutting against the lateral frame member 12d from the rear defines the position of engagement between the gripping claws 26a, 26b and the left and right inclined frame members 12c. The position of the damper case 17 mounted on the headrest frame 12 is thus determined.

A thick part 31 is formed on the base of the arms 25a, 25b of the first and second elastic support parts 24A, 24B and the positioning support part 30 in order to increase the stiffness of the base. A pair of stoppers 32 are formed on the right and left side walls of the first case half body 17A, the stoppers 32 abutting against the arms 25a, 25b of the first and second elastic support parts 24A, 24B so as to restrict forward flexing thereof, that is, flexing of the arms 25a, 25b toward the side opposite to the openings 27a, 27b of the gripping claws 26a, 26b. Each stopper 32 is formed so as to have a squared U-shaped cross section from a middle wall portion 32a that abuts linearly against a back face of the corresponding gripping claws 26a, 26b, and a pair of side wall portions 32b, 32b that are continuous from opposite ends of the middle wall portion 32a and abut against curved faces ranging from the corresponding arms 25a, 25b to the back faces of the gripping claws 26a, 26b. Since the stoppers 32 thus arranged have high stiffness and can abut against the back face from the corresponding arms 25a, 25b to the gripping claws 26a, 26b over a large area, it is possible to restrict effectively flexing of the arms 25a, 25b while avoiding as much as possible a concentration of stress. Therefore, even if a large rearward-facing load is applied from the head of an occupant to the damper case 17, the stoppers 32 abut against the front faces of the arms 25a, 25b to thus restrict forward flexing of the arms 25a, 25b, thus enabling unnecessary rearward movement of the damper case 17 to be restricted.

Since the stopper 32 is integrally linked to an outer wall of the fitting groove 20, it contributes to an increase in the stiffness of the outer wall of the fitting groove 20. A plurality of reinforcing ribs 33 providing a link between the lower wall of the first case half body 17A and the abutment claw 30b are formed on the arm portion 30a of the positioning support part 30.

The first and second elastic support parts 24A, 24B are one example of the mounting arm part of the present invention, which is provided so as to be connected to the left and right side walls of the damper case 17, and the gripping claws 26a, 26b are one example of the gripping means of the present invention, which can grip the inclined frame members 12c as the inclined pillar part. Since the first and second elastic support parts 24A, 24B integrally have the gripping claws 26a, 26b, which grip a portion, obliquely intersecting and overlapping the damper case 17 when the seat is viewed from the side, of the inclined frame member 12c, even if the inclined frame member 12c gripped by the gripping claws 26a, 26b is in a positional relationship in which it obliquely intersects the damper case 17 (in other words a positional relationship in which the gripping claws 26a, 26b in a rearwardly-inclined attitude and the damper case 17 in the vertical attitude are twisted), it becomes possible to mount the damper case 17 on the inclined frame member 12*c* without problems.

The dynamic damper D is equipped with movement restriction means WG that restricts movement of the weight 15 in a predetermined direction (in the illustrated example in the up-and-down direction). In the present embodiment, the movement restriction means WG is formed from a weight guide part WG that can slidably guide movement of the weight 15 in a specific direction (in the illustrated example in the fore-and-aft direction and the left-and-right direction) that is different from the predetermined direction.

More specifically, a pair of left and right projecting weight guide parts WG protruding in directions that approach each other and extending in the fore-and-aft direction are projectingly provided integrally with upper and lower parts of inner faces of mutually opposing left and right side walls of the first and second case half bodies 17A, 17B, which form the damper case 17 in a divided manner. The upper faces of the pair of weight guide parts WG of the lower parts of the first and second case half bodies 17A, 17B oppose the lower end part of the weight 15 via a slight gap 93 in the up-and-down direction, and the lower faces of the pair of weight guide parts WG of the upper parts oppose the upper end part of the weight 15 via the slight gap 93.

When the weight 15 vibrates in the up-and-down direction while elastically deforming the second and third elastic members S2, S3 so as to fill the gap 93, it is possible, by the weight 15 abutting against the upper and lower weight guide parts WG so that it can slide in the fore-and-aft and left-and-right directions, to restrict relative movement thereof in the up-and-down direction with respect to the damper case 17. In addition, a variation in which the gap 93 is eliminated and the upper and lower weight guide parts WG always slidably abut against the upper and lower end faces of the weight 15 can also be implemented.

Furthermore, the upper and lower weight guide parts WG abut against the inner faces, on the weight 15 side, of the corresponding upper and lower support plates 70 and support the support plate 70 from the weight 15 side.

Furthermore, as another modified example of the damper case 17, although not illustrated, a pair of left and right projecting weight guide parts WG may be projectingly provided only on inner faces of left and right side wall parts of either one case half body among the first and second case half bodies 17A, 17B.

The weight guide parts WG of the upper and lower parts are disposed at positions that avoid the elastic members S1 to S3. The pairs of left and right weight guide parts WG of the upper and lower parts are disposed so as to face each other with the second elastic member S2 and the third elastic member S3 sandwiched therebetween. This enables restriction of movement and guiding of sliding of the weight 15 to be stably and appropriately carried out by means of the mutually opposing left and right weight guide parts WG.

The support plate 70 joined to an outer end face (an end face on the side opposite to the weight 15) of the second and third elastic members S2, S3 is disposed between the upper and lower weight guide parts WG and upper and lower inner end faces of the damper case 17. This enables the support plate 70 to be disposed without problems by utilizing a dead space between the weight guide part WG (and consequently the movement restriction means) and the damper case 17, thus simplifying the structure and reducing the size. The support plate 70 can be stably and strongly held at a fixed position between the weight guide part WG and the inner faces of the upper and lower side walls of the damper case 17.

The operation of the first embodiment is now explained.

With regard to the procedure for assembling the dynamic damper D, the first elastic member S1 is first wrapped around and fixed (e.g. adhered) to the outside face of the weight 15 between the upper and lower end faces, and the second and third elastic members S2, S3 are joined (e.g. adhered) to the upper and lower end faces of the weight 15, thus forming a sub-assembly of the weight 15 and the elastic members S1 to S3. Mating faces of the first and second case half bodies 17A, 17B are detachably joined so as to sandwich the sub-assembly between the opposing faces of the two case half bodies 17A, 17B, thus assembling the damper case 17, and at the same time of the assembly, the weight 15 is supported on the damper case 17 via the second and third elastic members S2, S3 and the support plate 70.

In this case, the second and third elastic members S2, S3 are press fitted to the inner faces of the upper and lower walls of the damper case 17 (the first and second case half bodies 17A, 17B) via the support plate 70 in a state in which the second and third elastic members S2, S3 are compressively deformed in the up-and-down direction, and the upper and lower end faces of the weight 15 closely face the upper and lower weight guide parts WG across the gap 93. On the other hand, the front and rear faces and the left and right faces of the first elastic member S1 are made to closely face the inner faces of the front and rear walls and the left and right walls of the damper case 17 (the first and second case half bodies 17A, 17B) across the gaps 91, 92.

The dynamic damper D thus assembled and mounted on the inclined frame member 12*c* of the headrest frame 12 via the first and second elastic support parts 24A, 24B is, together with the headrest frame 12 and the skin 14, set in a cavity of a mold (not illustrated) for injection molding the cushion member 13 of the headrest 4. In this set state the cushion member 13 is injection molded and at the same time the dynamic damper D is integrally embedded at a predetermined position within the cushion member 13.

While the automobile is traveling, when vibration of the automobile is transmitted from the floor F to the seat back 3 and the headrest 4 via the seat cushion 2 and the pivot shaft 9, in the dynamic damper D the weight 15 resonates accompanied by elastic deformation of mainly the second and third elastic members S2, S3, and vibration energy of the seat back 3 and the headrest 4 is instead absorbed, thus enabling the vibration of the seat back 3 and the headrest 4 to be damped.

In the dynamic damper D of the embodiment, since the weight guide part WG is provided as movement restriction means for restricting movement of the weight 15 in a predetermined direction (for example, in the up-and-down direction), movement of the weight 15 in the up-and-down direction is restricted, and unnecessary movement of the weight in the direction is minimized. This enables the dynamic damper D to efficiently exhibit an effect of damping the vibration in a specific direction (for example, in the fore-and-aft and left-and-right directions) that is originally desired to be damped, and it becomes easy to optimize (tune) the mode of damping corresponding to the mode of vibration of a damping target.

Since the weight 15 can move in the fore-and-aft and left-and-right directions (and consequently can vibrate) even when its movement in the up-and-down direction is restricted, and in this process it stably vibrates in the fore-and-aft and left-and-right directions while being accompanied by elastic deformation of the second and third elastic members S2, S3, which have relatively high hardness, it is possible for the dynamic damper D to exhibit an effect of damping effectively vibration in the fore-and-aft and left-and-right directions. In this case, in the present embodiment, since the slight gap 93 is present between the weight 15 and the weight guide part WG in the up-and-down direction, during a process in which the weight 15 vibrates in the fore-and-aft or left-and-right direction while accompanied by elastic deformation of the second and third elastic members S2, S3, the weight 15 does not receive a large sliding resistance from the weight guide part WG due to the gap 93 being present, and the rising damper characteristics of the dynamic damper D can be stabilized. When the weight 15 is made to vibrate greatly in the up-and-down direction also, since the weight 15 abuts against the upper and lower weight guide parts WG so as to fill the gap 93, movement in the up-and-down direction therebeyond is restricted. In this case also, vibration of the weight 15 in the fore-and-aft and left-and-right directions is allowed due to the weight 15 undergoing sliding contact with the weight guide part WG in the fore-and-aft and left-and-right directions.

In the present embodiment, the weight 15 extending in the up-and-down direction is disposed so as to extend in the up-and-down direction on one vertical line L when the seat is viewed from the side, and due to the weight 15 being disposed without being inclined, it is possible to make it more difficult for the weight 15 to receive a biasing force toward one side in the fore-and-aft direction caused by the self-weight thereof. This enables the weight 15 to vibrate smoothly with good balance in the fore-and-aft direction within the damper case 17 by means of a simple structure in which the weight 15 is merely placed in a vertical attitude, thereby enabling the damping effect to be improved compared with an arrangement as in a conventional headrest in which a weight of a dynamic damper is disposed in a rearwardly-inclined attitude.

Moreover, since the upper half and the lower half of the weight 15 in the vertical attitude have a symmetrical shape, the weight balance between that above and that below the center of gravity of the weight 15 is good, and it becomes less inclined forward and backward. This enables the weight 15 to vibrate in the fore-and-aft direction with better balance, thus further improving the damping effect.

Furthermore, the weight 15 of the present embodiment is disposed so that the weight 15 is supported on the damper case 17 via the second and third elastic members S2, S3 sandwiching the weight 15 in the up-and-down direction, and the upper and lower elastic members S2, S3 and the weight 15 are arranged on one vertical line L when the seat is viewed from the side. Since this enables the weight 15 to be elastically supported in a stable vertical attitude via the elastic members S2, S3, which are immediately above and beneath the weight 15, the weight 15 can vibrate smoothly with better balance in the fore-and-aft direction.

In the present embodiment, the inclined frame member 12c of the headrest frame 12 extends while being inclined upward to the rear on the periphery of the damper case 17, but not only the damper case 17 but also the weight 15 within the case 17 are disposed on the one vertical line L when the seat is viewed from the side. That is, even when the inclined frame member 12c is present on the periphery thereof, since the weight 15 is placed in a vertical attitude (that is, a non-inclined attitude) obliquely intersecting the inclined frame member 12c, it is possible for the weight 15 to vibrate smoothly with good balance in the fore-and-aft direction.

As shown in FIG. 20 and FIG. 21, the damper case 17 is disposed so that part thereof overlaps an axis Lc of the inclined frame member 12c when the seat is viewed from the side. The damper case 17 is disposed so that its upper part and lower part protrude further forward and rearward respectively than the inclined frame member 12c, and the amount of forward protrusion of the upper part of the damper case 17 with respect to the inclined frame member 12c is smaller than the amount of rearward protrusion of the lower part of the damper case 17. Due to such placement of the damper case 17, not only is it possible to suppress as much as possible a disagreeable sensation from the front face of the headrest 4 due to the forward protrusion of the damper case 17 (more specifically, a disagreeable sensation that the head of an occupant receives accompanying a decrease in the thickness of the cushion member 13 on the front side of the damper case 17), but it is also possible to suppress to some extent any increase in the size of the headrest 4 or interference with another member (for example, an upper part of a front face of the seat back 3) due to the damper case 17 protruding rearward.

In a state in which the first elastic member S1 of the present embodiment is set within the damper case 17 together with the weight 15, slight gaps 91, 92 are formed between the first elastic member S1 and inner faces of the front and rear walls and inner faces of the left and right walls of the damper case 17, and when the weight 15 vibrates in the fore-and-aft and left-and-right directions as described above, the front and rear faces or the left and right faces of the first elastic member S1 collide with the inner face of the damper case 17 so as to fill the gaps 91, 92, thus enabling the impact to be adsorbed and alleviated by elastic deformation of the first elastic member S1. If the first elastic member S1 were omitted, there is a possibility that when the weight 15 vibrates in the fore-and-aft and left and right directions it would directly collide with the inner face of the damper case 17 to thus generate an unpleasant collision noise, but in the present embodiment it is possible to prevent effectively an unpleasant collision noise from occurring by virtue of the buffer effect exhibited by the first elastic member S1.

The first elastic member S1 can undergo elastic compressive deformation to thus suppress excess vibration of the weight 15 when the weight 15 vibrates in the fore-and-aft or left-and-right direction even after the front and rear faces and the left and right faces of the first elastic member S1 have abutted against the inner face of the damper case 17 as described above.

In the present embodiment, the elastic members S1 to S3 covering the weight 15 are formed in a divided manner from the first elastic member S1 covering the entire periphery of the outside face of the weight 15, and the second and third elastic members S2, S3 covering the one end face and the other end face of the weight 15. This enables the shape of the individual elastic members S1 to S3 to be simplified as much as possible compared with a case in which the weight 15 is covered by a single sheet-shaped elastic member, thus resulting in good ease of molding. Moreover, since the material, thickness, etc. of an elastic material forming the first elastic member S1 and an elastic material forming the second and third elastic members S2, S3 can easily be changed, the material, hardness, thickness, etc. of the elastic members S1 to S3 can be selected so that each of the first elastic member S1 and the second and third elastic members S2, S3 can exhibit an optimum dynamic damper effect according to the damping target or the placement position and attitude.

Figure 26:
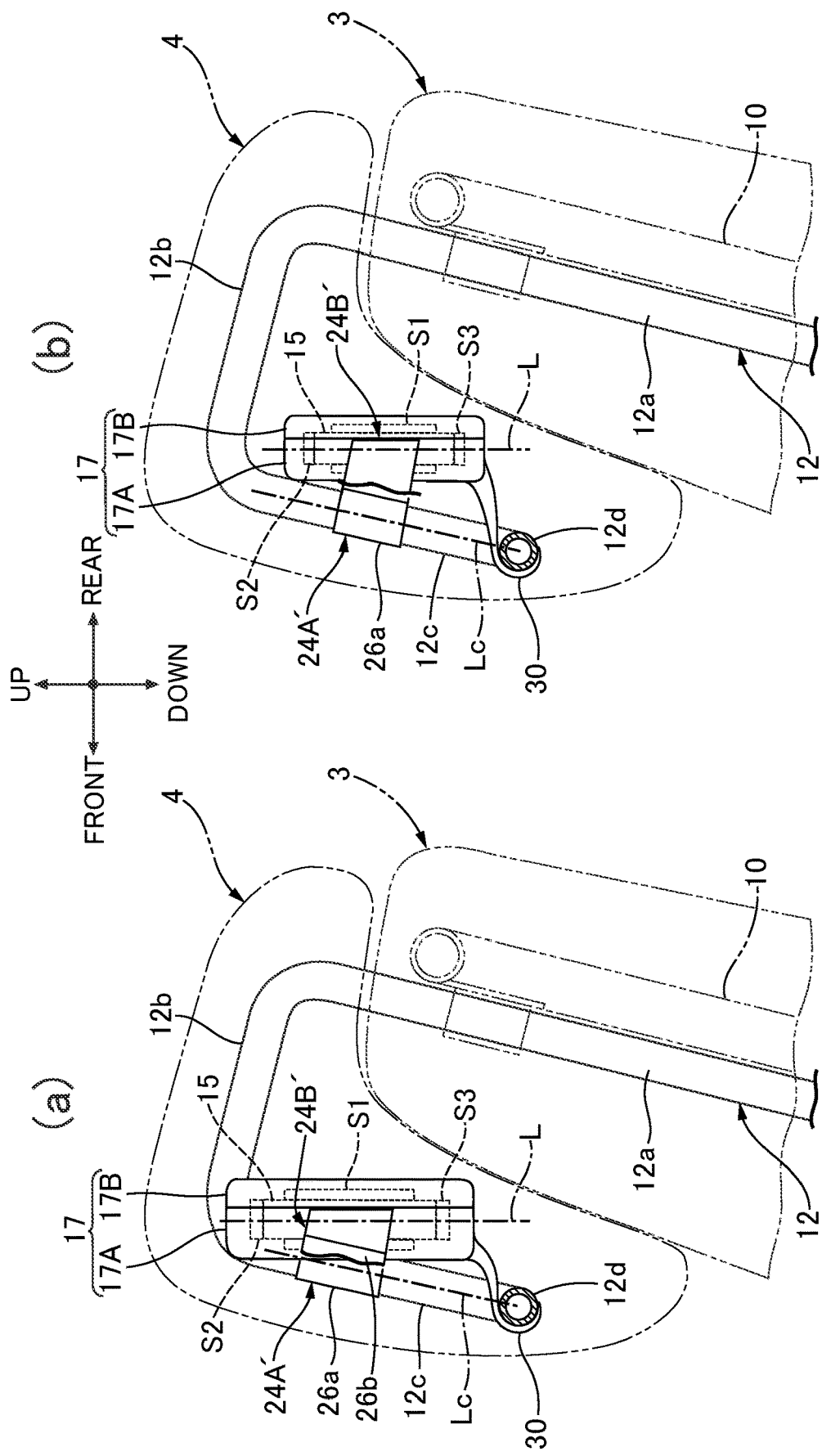
FIG. 26 (a) shows the internal structure of a headrest related to the second embodiment and FIG. 26 (b) shows the internal structure of a headrest related to the third embodiment, both corresponding to an enlarged view of part of FIG. 20.

FIG. 26 (a) shows a second embodiment and FIG. 26 (b) shows a third embodiment. In both of the second and third embodiments, the damper case 17 is disposed further rearward than the front face of the inclined frame member 12c as the inclined pillar part when the seat is viewed from the side (that is, it is disposed so that it does not protrude further forward than the front face of the inclined frame member 12c). This enables the cushion member 13 of the headrest 4 to have a sufficient thickness on the side further forward than the damper case 17, and it is possible to sufficiently suppress the occurrence of a disagreeable sensation on the front face side of the headrest 4 due to the damper case 17 protruding forward (more specifically, a disagreeable sensation that the head of an occupant receives accompanying a decrease in the thickness of the cushion member 13 on the front side of the damper case 17). In the second embodiment in particular, since as shown in FIG. 26 (a) the upper part of the damper case 17 partially overlaps the inclined frame member 12c when the seat is viewed from the side, the damper case 17 is accordingly present toward the front, and the amount of protrusion of the lower part of the damper case 17 further rearward than the inclined frame member 12c can be suppressed to some extent.

In the second and third embodiments, due to the damper case 17 being disposed further rearward than the front face of the inclined frame member 12c when the seat is viewed from the side, at least a lower half of the damper case 17 is positioned considerably spaced to the rear from the inclined frame member 12c. However, first and second elastic support parts 24A', 24B' as mounting arm parts provided so as to be connected integrally with the damper case 17 (more specifically, the first case half body 17A on the front side) are extended lengthwise further forward than the front face of the damper case 17, and gripping claws 26a, 26b formed on the extended extremity parts can grip the inclined frame member 12c further on the front side than the front face of the damper case 17. In the second and third embodiments, therefore, even if the lower half of the damper case 17 is spaced considerably further rearward than the inclined frame member 12c, it is possible to mount, without problems, the damper case 17 on the inclined frame member 12c via the elastic support parts 24A', 24B', which extend further forward than the front face of the damper case 17.

The arrangement is otherwise the same as that of the first embodiment, and constituent elements of the second and third embodiments are denoted by the same reference numerals and symbols as those of the corresponding constituent elements of the first embodiment, duplication of the explanation being omitted. The second and third embodiments can achieve basically the same operational effects as those of the first embodiment.

Figure 27:
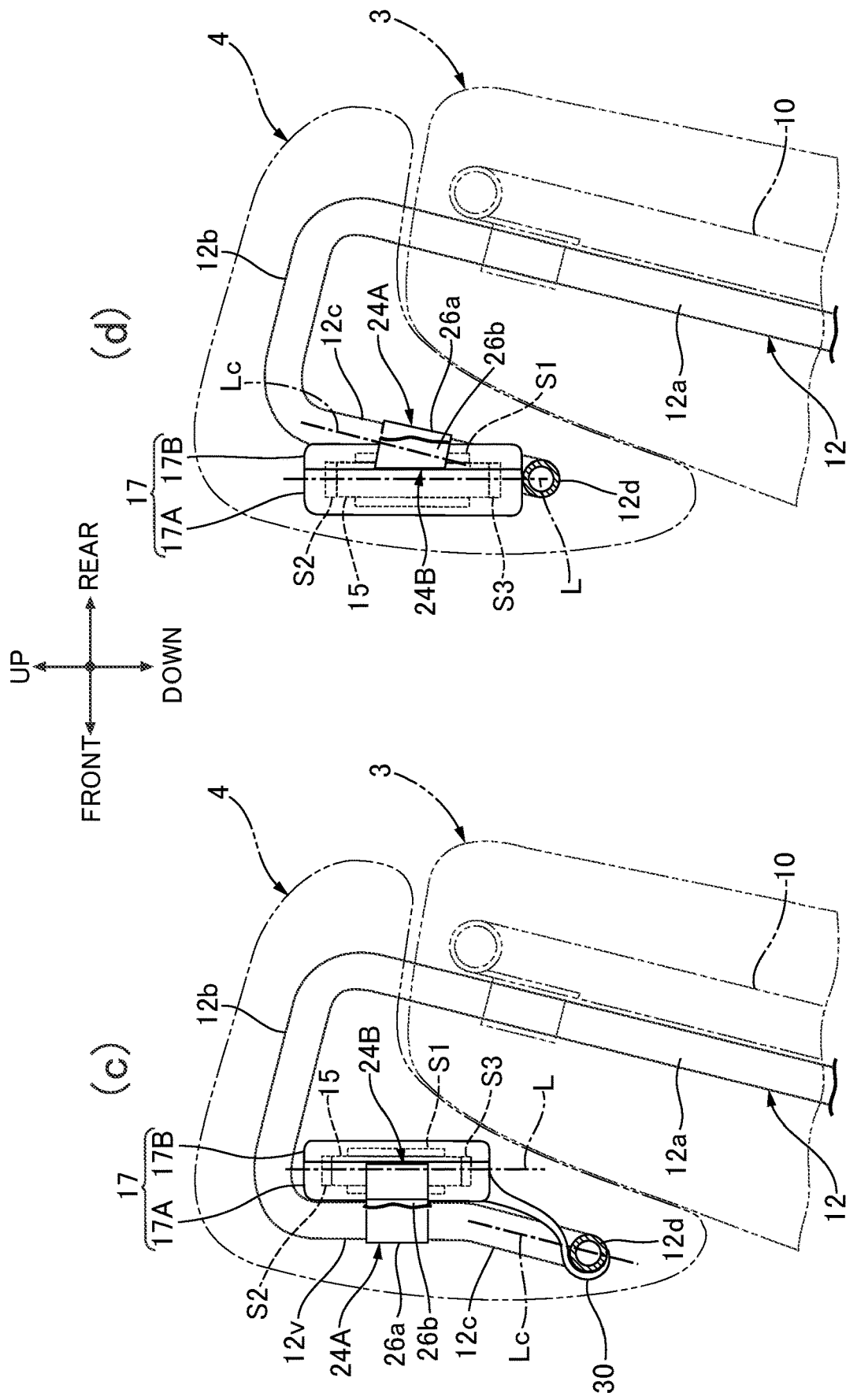
FIG. 27 (c) shows the internal structure of a headrest related to the fourth embodiment and FIG. 27 (d) shows the internal structure of a headrest related to the fifth embodiment, both corresponding to an enlarged view of part of FIG. 20.

FIG. 27 (c) shows a fourth embodiment and FIG. 27 (d) shows a fifth embodiment. In the fourth embodiment in particular, as shown in FIG. 27 (c) the left and right inclined frame members 12c extend obliquely downward to the front from lower ends of left and right vertical frame members 12v hanging downward from front ends of the left and right upper frame members 12b of the headrest frame 12, and the damper case 17 is disposed along the vertical frame member 12v in a vertical attitude. As in the second and third embodiments, the damper case 17 has first and second elastic support parts 24A, 24B as mounting arm parts extending lengthwise further forward than the front face of the damper case 17, and due to gripping claws 26a, 26b as gripping means provided on an extremity part of the first and second elastic support parts 24A, 24B gripping the vertical frame member 12v, the damper case 17 is mounted on the vertical frame member 12v via the first and second elastic support parts 24A, 24B.

In the fifth embodiment, as shown in FIG. 27 (d) a lower face of the damper case 17 in a vertical attitude is placed and supported on an upper face of the lateral frame member 12d of the headrest frame 12, and the damper case 17 protrudes further forward than the inclined frame member 12c in going upward away from the support part. The damper case 17 (more specifically, the second case half body 17B on the rear side) has the first and second elastic support parts 24A, 24B as the mounting arm parts extending further rearward than the rear face of the damper case 17, and due to gripping claws 26a, 26b as gripping means provided on extremity parts of the first and second elastic support parts 24A, 24B gripping the inclined frame member 12c, the damper case 17 is mounted on the inclined frame member 12c via the first and second elastic support parts 24A, 24B.

The arrangement is otherwise the same as that of the first embodiment, and constituent elements of the fourth and fifth embodiments are denoted by the same reference numerals and symbols as those of the corresponding constituent elements of the first embodiment, duplication of the explanation being omitted. The fourth and fifth embodiments can achieve basically the same operational effects as those of the first embodiment.

In the fourth embodiment, even when the vertical frame member 12v connected to the inclined frame member 12c is present on the headrest frame 12, the damper case 17 in a vertical attitude can be mounted thereon without problems. In the fifth embodiment, since the lower face of the damper case 17 in the vertical attitude is abutted against and supported on the upper face of the lateral frame member 12d as the lateral linking bar, the positioning support part 30 of the previous embodiment can be omitted, and it is therefore possible to stably and directly support the lower face of the damper case 17 on the headrest frame 12 (the lateral frame member 12d in particular) without considerably complicating the structure via which the damper case 17 is supported by the headrest frame 12.

Figure 28:
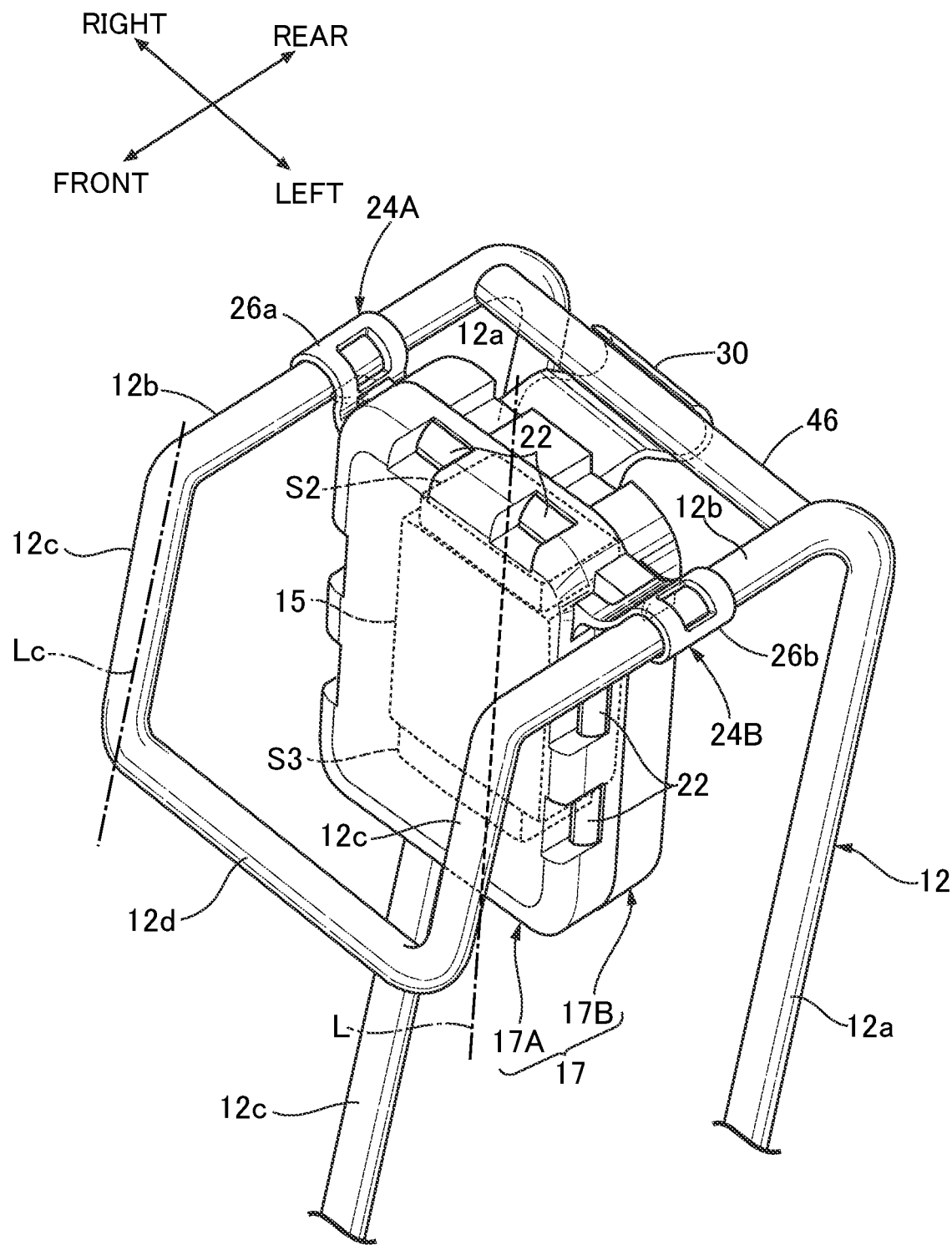
FIG. 28 is a perspective view showing the internal structure of a headrest related to the sixth embodiment.

FIG. 28 shows a sixth embodiment, and in this arrangement the dynamic damper D is mounted on the left and right upper frame members 12b of the headrest frame 12. That is, the first and second elastic support parts 24A, 24B as the mounting arm parts are provided connectedly and integrally with upper parts of the left and right side walls of the damper case 17 (either one of the first and second case half bodies 17A, 17B), and the gripping claws 26a, 26b provided on the extremity parts of the elastic support parts 24A, 24B are snap-engaged with the left and right upper frame members 12b from above. The positioning support part 30 is provided so as to be connected to the upper part of the second case half body 17B of the damper case 17 and extends rearward, and is abutted against and engaged from beneath with a cross member 46 providing a link between rear end parts of the left and right upper frame members 12b.

In the sixth embodiment also, although the main frame member 12a and the inclined frame member 12c, which are inclined upward to the rear of the headrest frame 12, are positioned on the periphery of the damper case 17, the damper case 17 and the weight 15 therewithin are disposed so as to extend in the up-and-down direction on one vertical line L when the seat is viewed from the side. The arrangement is otherwise the same as that of the first embodiment, and parts of FIG. 28 corresponding to those of the first embodiment are denoted by the same reference numerals and symbols, duplication of the explanation being omitted.

In accordance with the sixth embodiment, it is possible, by utilizing effectively a space between the left and right upper frame members 12b for placing the dynamic damper D, to ensure that a front part of the cushion member 13 of the headrest 4 has a sufficient thickness for the head of an occupant to abut thereagainst and to ensure that the distance from the point of support of a vibration system formed from the seat cushion 2 and the headrest 4 to the center of gravity of the weight 15 is sufficient, thus enabling the damping function of the dynamic damper D to be enhanced.

FIG. 29 shows a seventh embodiment, and in this arrangement mutually mating faces Z of the first and second case half bodies 17A, 17B of the damper case 17 extend so as to follow the axis Lc of the inclined frame member 12c when the seat is viewed from the side (that is, so as to obliquely intersect the longitudinal center line L of the damper case 17 in the vertical attitude). Left and right parts of the first and second case half bodies 17A, 17B extend to the outside of the left and right inclined frame members 12c, and the left and right inclined frame members 12c are held between mating faces of left and right extended end parts 17Ae, 17Be. A positioning support part 30 engaged with and supported on the lateral frame member 12d is projectingly provided integrally with a lower wall of the case half body 17A, the function of the positioning support part 30 being the same as that of the positioning support part 30 of the first embodiment.

A plurality of linking claws and linking holes that are the same as the linking claw 22 and linking hole 23 of the first embodiment are provided on upper and lower side walls of the first and second case half bodies 17A, 17B, and the first and second case half bodies 17A, 17B are detachably joined by engagement and disengagement of the linking claw and the linking hole as in the first embodiment. A rectangular fitting groove 20 is formed in one of the mating faces of the first and second case half bodies 17A, 17B, the fitting groove 20 extending along the entirety in the peripheral direction of the mating face on the inner side of the left and right inclined frame member 12c, and a fitting projecting wall 21 similarly having a rectangular shape that is fitted into the fitting groove 20 is projectingly provided on the other mating face. Fitting the fitting projecting wall 21 into the fitting groove 20 when the first and second case half bodies 17A, 17B are joined to each other can prevent a molding resin in a molten state from entering a housing space for the weight 15, etc. within the damper case 17 at the time of injection molding of the cushion member 13.

Although not illustrated, a positioning projection that is the same as the positioning projection t of the first embodiment may be provided on the mating faces of the left and right extended end parts 17Ae, 17Be of the first and second case half bodies 17A, 17B (in particular, a face that abuts against the inclined frame member 12c), and a notch that is the same as the notch n of the first embodiment may be provided in an outer peripheral face of the inclined frame member 12c. In this case, since due to engagement between the positioning projection and the notch the left and right extended end parts 17Ae, 17Be (and consequently the damper case 17) can be prevented from being displaced in the up-and-down direction with respect to the inclined frame member 12c, and in a synergistic effect with the specially provided positioning support part 30 it is possible to further reliably carry out positioning and fixing of the damper case 17 to the headrest frame 12.

The arrangement of the seventh embodiment is otherwise the same as that of the first embodiment, and constituent elements of the seventh embodiment are denoted by the same reference numerals and symbols as those of the corresponding constituent elements of the first embodiment, duplication of the explanation being omitted. The seventh embodiment can achieve basically the same operational effects as those of the first embodiment. Furthermore, in the seventh embodiment, since the inclined frame member 12c is held directly between the mating faces of the first and second case half bodies 17A, 17B of the damper case 17, it is unnecessary to specially provide an outer surface of the damper case 17 with a mounting arm part (for example, the elastic support parts 24A, 24B of the embodiment) that is mounted on the inclined frame member 12c, thus simplifying the case structure.

Figure 30:
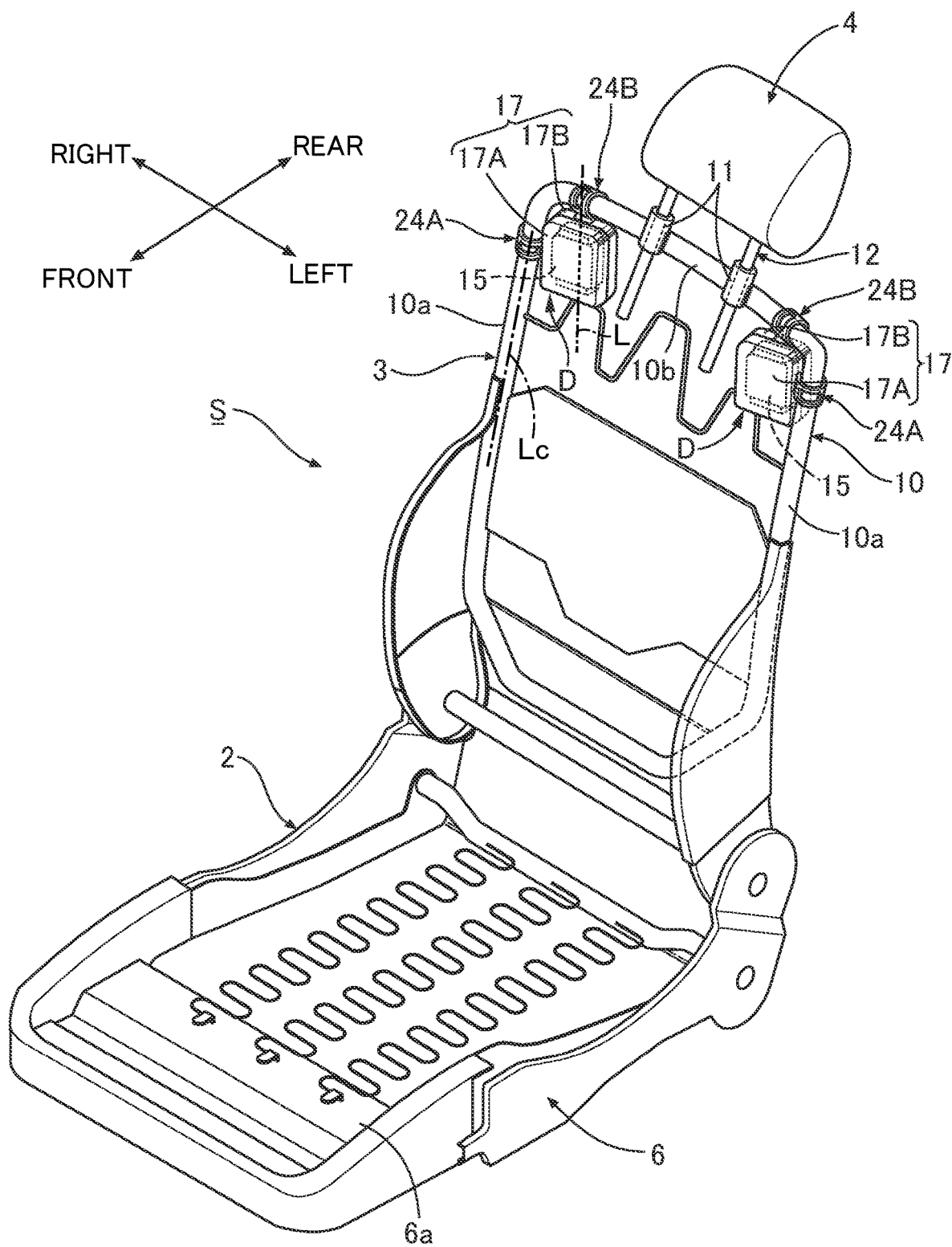
FIG. 30 is a perspective view showing the internal structure of an automobile seat related to an eighth embodiment.

FIG. 30 shows an eighth embodiment, and in this arrangement the dynamic damper D, which includes the damper case 17 having a substantially rectangular parallelepiped shape that is flat in the fore-and-aft direction, is disposed in inner corners of upper left and right corner parts of the seat back frame 10 of the seat back 3, and the pair of elastic support parts 24A, 24B formed on an upper face and one side face of the damper case 17 snap-engage with a longitudinal frame member 10a and a lateral frame member 10b respectively of the seat back frame 10. The structure of the interior of the dynamic damper D is basically the same as that of the first embodiment, but the damper case 17 and the weight 15 in its interior are disposed so as to extend in the up-and-down direction on one vertical line L when the seat is viewed from the side with respect to the longitudinal frame member 10a, inclined upward to the rear, of the seat back frame 10. The longitudinal frame member 10a is one example of the inclined pillar part of the seat back frame 10.

In accordance with the eighth embodiment, it is possible to carry out effective damping of the seat back 3 by the action of the dynamic damper D, which is disposed in the uppermost part of the seat back frame 10. In this case, the effect, particularly due to the weight 15 and the damper case 17 being disposed in the vertical attitude, in damping vibration of the weight 15 in the fore-and-aft direction is the same as that of the first embodiment. Moreover the dead space of the inner corner of the upper corner part of the seat back frame 10 can be utilized effectively for placing the dynamic damper D. The dynamic damper D may be disposed in an inner corner of only one of the upper left and right corner parts of the seat back frame 10.

Figure 31:
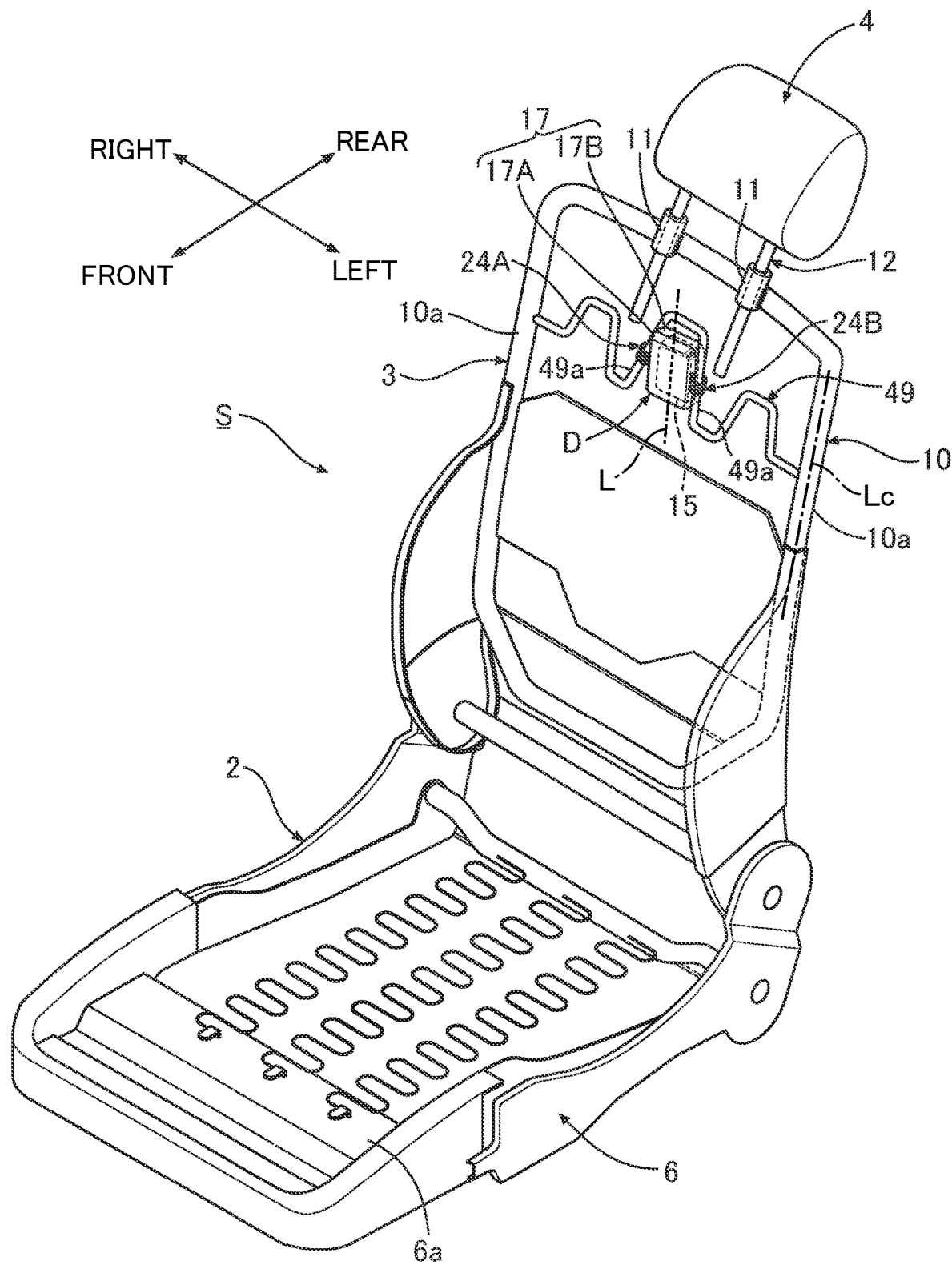
FIG. 31 is a perspective view showing the internal structure of an automobile seat related to a ninth embodiment.

FIG. 31 shows a ninth embodiment, and in this arrangement the pair of elastic support parts 24A, 24B formed on the left and right side faces of the damper case 17 snap-engage with a pair of inclined frame portions 49a, inclined in opposite directions from each other, in a middle part of an undulating frame member 49 providing an integral link between upper parts of the left and right longitudinal frame members 10a of the seat back frame 10. In this arrangement, the pair of elastic support parts 24A, 24B are disposed obliquely so as to correspond to the pair of inclined frame portions 49a, and the pair of elastic support parts 24A, 24B are prevented from moving in the up-and-down direction on the pair of inclined frame portions 49a. The structure of the dynamic damper D is basically the same as that of the first embodiment.

It is thus possible by the action of one dynamic damper D mounted in the upper middle part of the seat back frame 10 to suppress effectively vibration of the seat back 3. In the ninth embodiment also, the weight 15 and the damper case 17 are placed on one vertical line L when the seat is viewed from the side (and consequently obliquely disposed with respect to the longitudinal frame member 10a as the inclined pillar part), and the effect, based on the vertical placement, in damping vibration of the weight 15 in the fore-and-aft direction is the same as that of the eighth embodiment.

Figure 32:
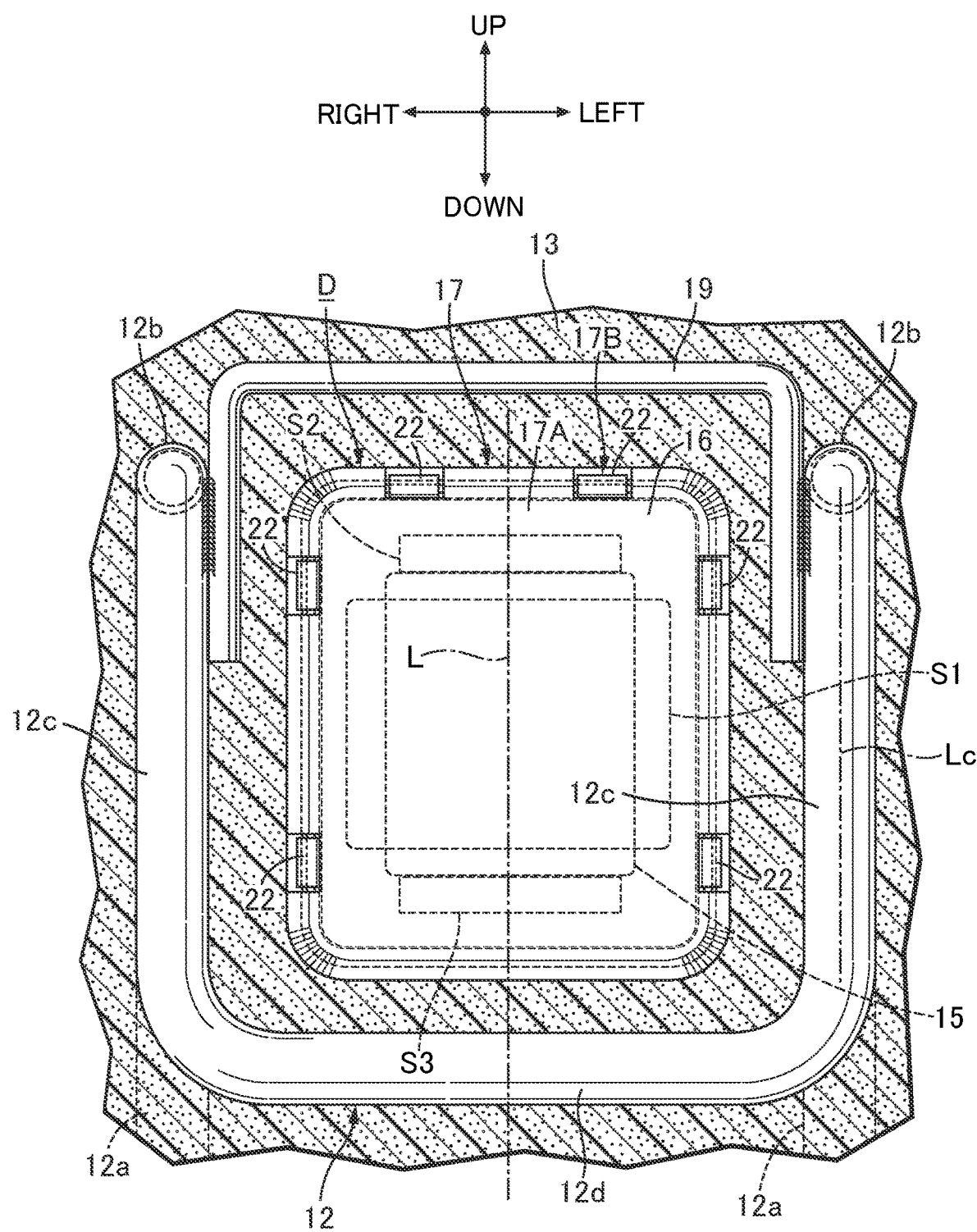
FIG. 32 is a sectional view, corresponding to FIG. 22, showing a tenth embodiment.

FIG. 32 shows a tenth embodiment, and in this arrangement the elastic support parts 24A, 24B as in the first to ninth embodiments are not provided on the damper case 17 placed in the headrest 4, and the damper case 17 in the vertical attitude is integrally embedded in and retained by the cushion member 13, which is harder than the sheet-shaped elastic members S1 to S3; the arrangement is otherwise the same as that of the first embodiment, and parts in FIG. 32 corresponding to those of the first embodiment are denoted by the same reference numerals and symbols, duplication of the explanation being omitted. The tenth embodiment can achieve basically the same operational effects as those of the first embodiment.

Furthermore, in accordance with the tenth embodiment, since no elastic support part is provided on the damper case 17, the structure of the dynamic damper D can accordingly be simplified. When the damper case 17 is embedded in the cushion member 13, which is made of a foam material, the damper case 17 is hung from the headrest frame 12 by thread so as to retain it at a predetermined position, and the thread is cut after molding the cushion member 13.

Figure 33:
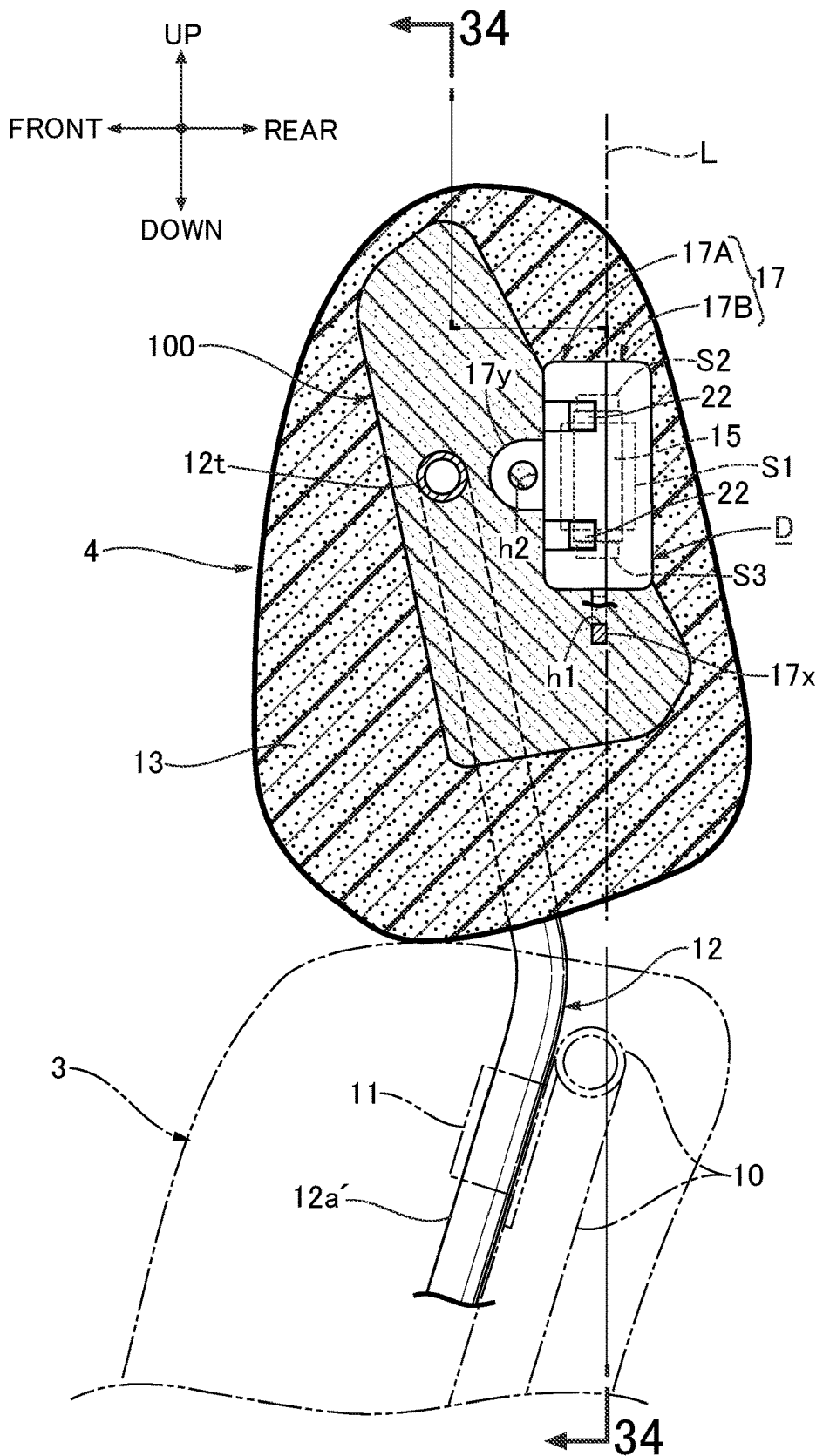
FIG. 33 is a longitudinal sectional view (a sectional view along line 33-33 in FIG. 34) of an essential part of a headrest showing an eleventh embodiment.
Figure 34:
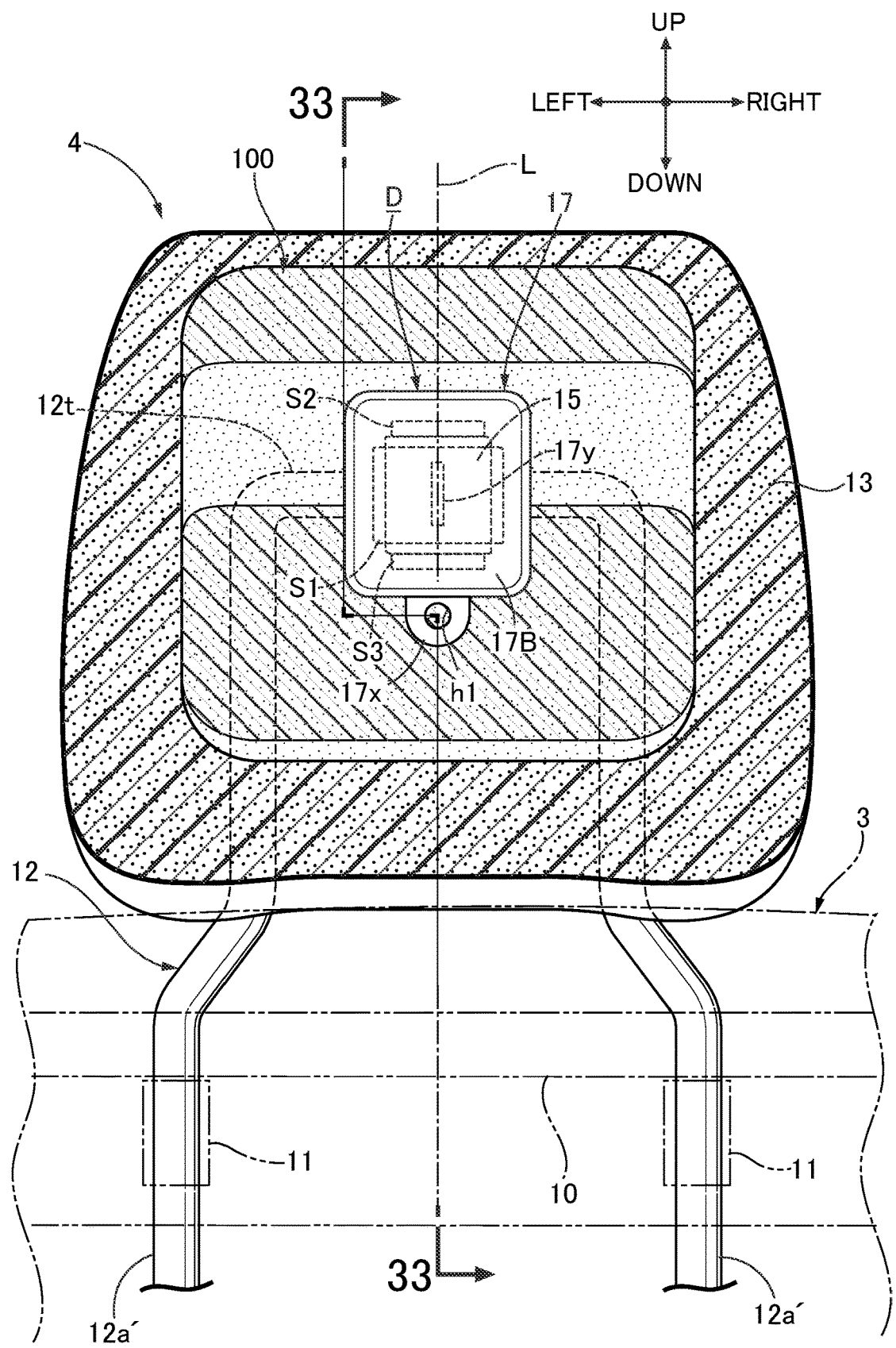
FIG. 34 is a sectional view along line 34-34 in FIG. 33.
Figure 35:
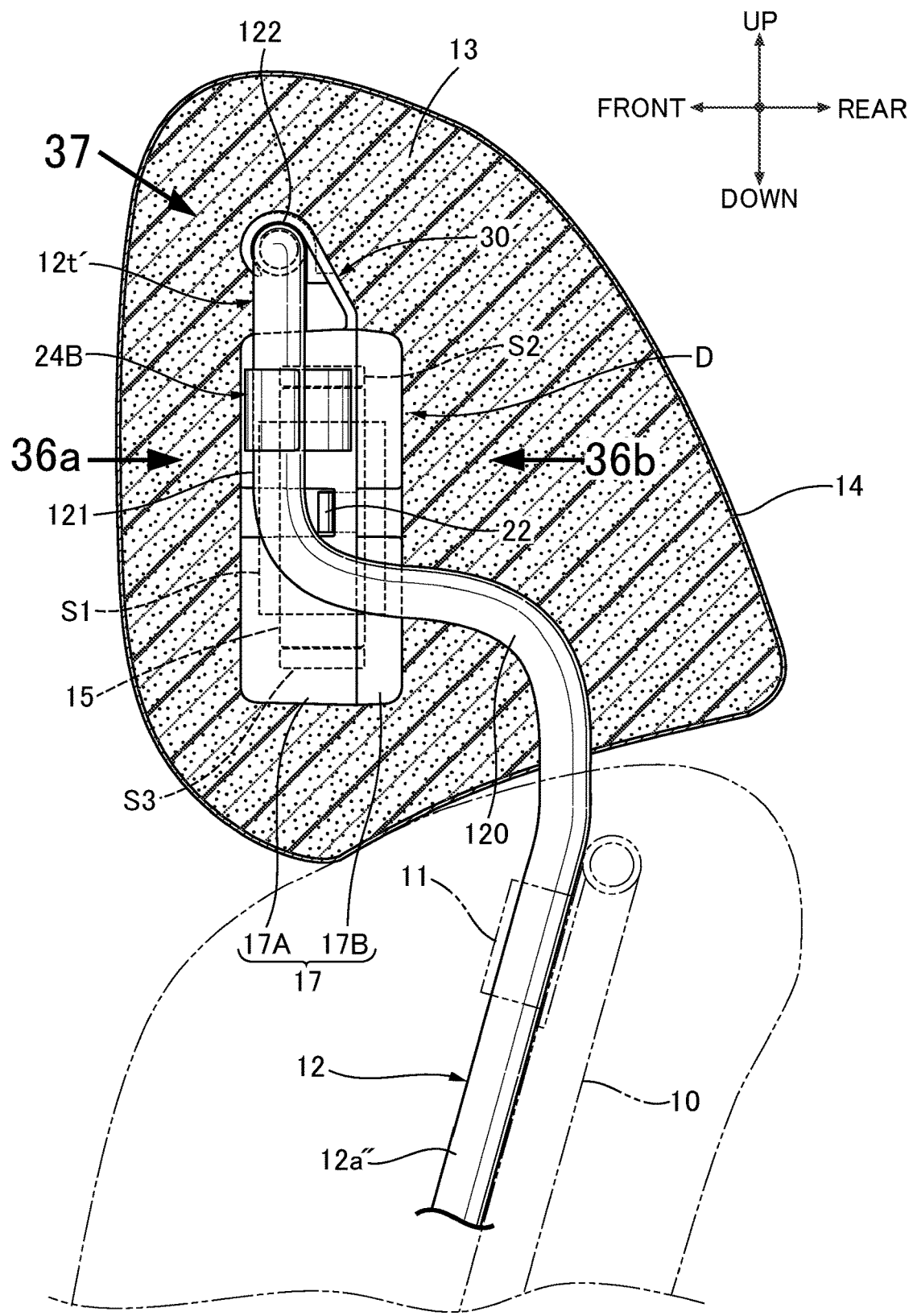
FIG. 35 is a longitudinal sectional view (a view corresponding to FIG. 21 and FIG. 33) of an essential part of a headrest related to a twelfth embodiment.
Figure 36:
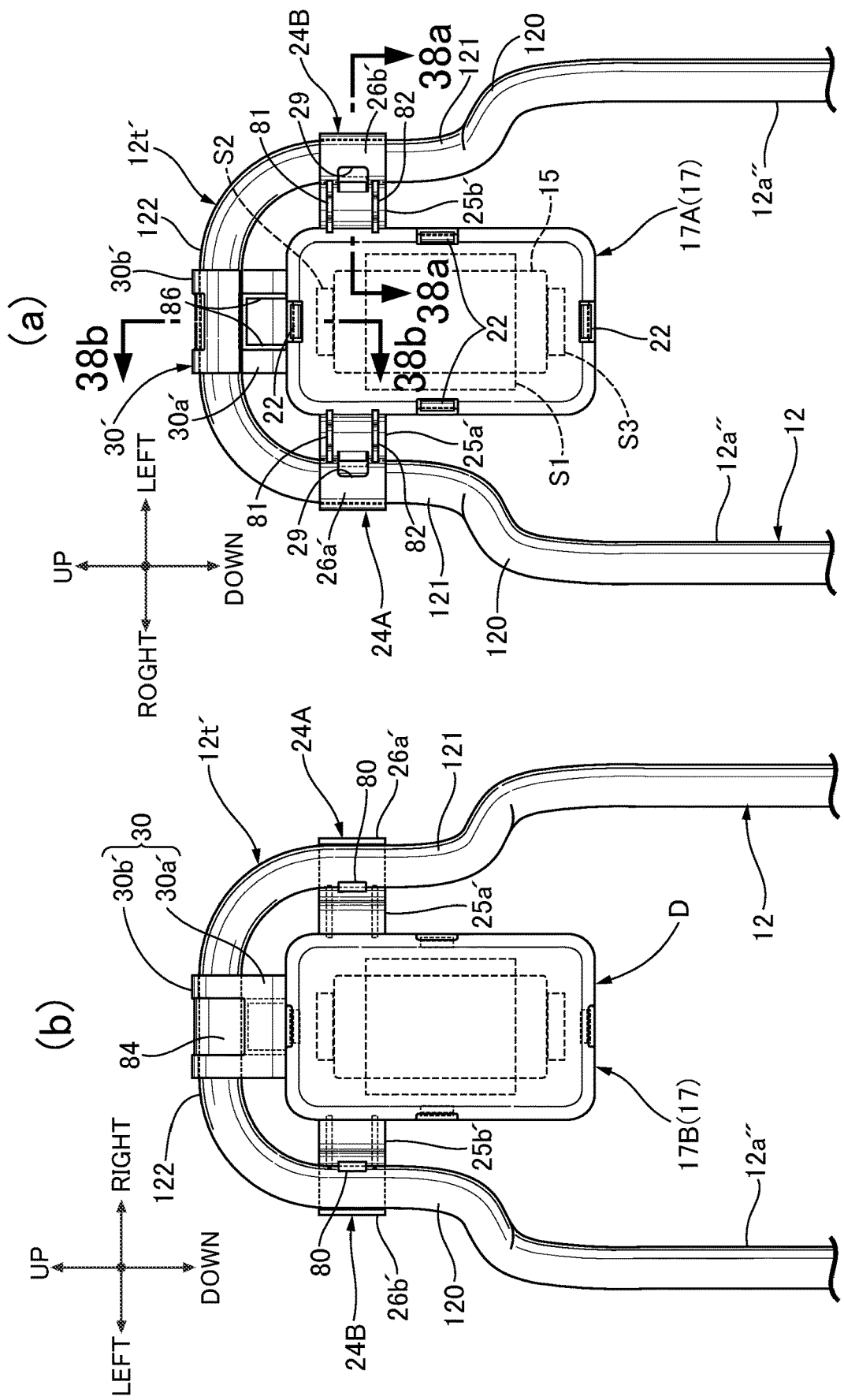
FIG. 36 (a) is a view in the direction of arrow 36a of FIG. 35 when the headrest and the headrest frame are viewed by detaching a cushion member, and FIG. 36 (b) is similarly a view in the direction of arrow 36b of FIG. 35.
Figure 37:
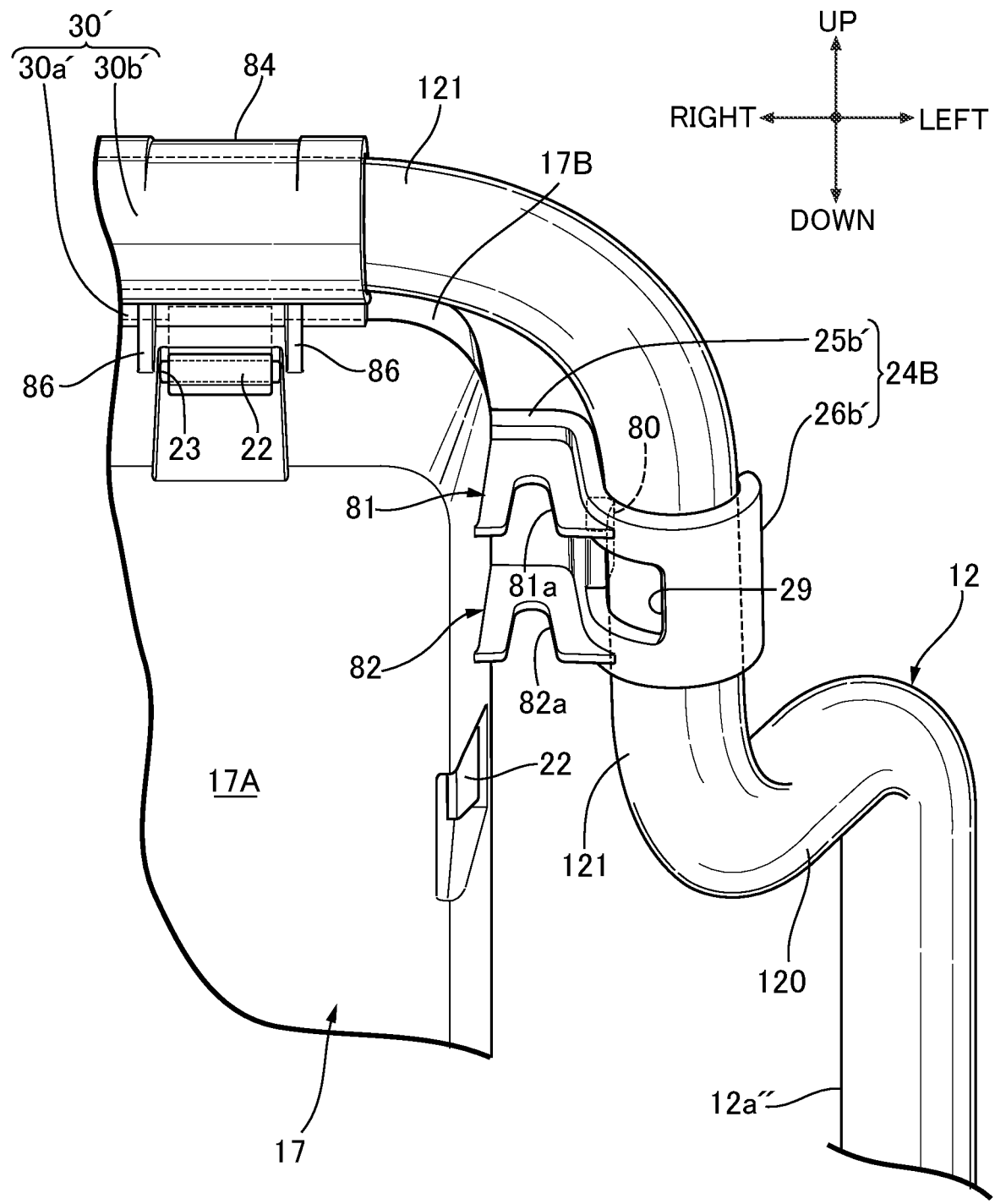
FIG. 37 is an enlarged perspective view (a view in the direction of arrow 37 in FIG. 35) of an essential part when the headrest and the headrest frame are viewed by detaching a cushion member.

FIG. 33 and FIG. 34 show an eleventh embodiment. In the eleventh embodiment, claw-shaped elastic support parts 24A, 24B are not provided on the damper case 17 placed within the headrest 4 as in the tenth embodiment, but instead the damper case 17, which is in a vertical attitude and has the aspects of the present invention, is supported on the hard cushion member 13 (e.g. made of a foamed urethane) via a support body 100 made of an EPP resin having excellent buffering properties.

The EPP resin referred to here is a foamed resin that is finished as a molded product by placing a large number of small polypropylene beads into a mold and making them refoam with high temperature steam, and it has excellent characteristics not only in terms of buffering properties but also in terms of light weight and dimensional stability.

In the eleventh embodiment, the support body 100 having at least part of the damper case 17 embedded in and retained by a rear part is obtained by primary molding using the EPP resin.

Moreover, with regard to the headrest frame 12, upper ends of left and right main frame members 12a' supported on the seat back frame 10 via a pair of support tubes 11 are integrally linked to each other via an inverted U-shaped linking frame member 12t, and the primary molding of the support body 100 is carried out so that an upper half of the linking frame member 12t is embedded in and fixed to the support body 100.

Protruding portions 17x, 17y having through holes h1, h2 respectively are formed integrally with a lower part and a front part of the damper case 17, and the strength via which the support body 100 and the damper case 17 are joined is enhanced by the EPP resin entering the through holes h1, h2 at the time of the primary molding. That is, the through holes h1, h2 function as anchoring holes for strengthening the join.

Such protruding portions 17x, 17y equipped with the through holes h1, h2 may be provided on at least one of left and right side parts and/or rear part of the damper case 17 instead of or in addition to the lower part and the front part of the damper case 17. The hole opening direction (that is, the axial direction) of the through holes h1, h2 may be either one of the fore-and-aft direction and the left-and-right direction or may be both directions. Alternatively, the hole opening direction of at least some of the through holes h1, h2 may be the up-and-down direction.

The support body 100 equipped with the damper case 17 and obtained by the primary molding is embedded in and retained by the hard cushion member 13 (for example, made of a foamed urethane) of the headrest 4, and the embedding is carried out by for example secondary molding the cushion member 13 in a state in which the damper case 17-equipped support body 100 is set in advance in a mold for the cushion member 13.

The arrangement is otherwise the same as that of the first embodiment, and parts in FIG. 33 and FIG. 34 corresponding to those of the first embodiment are denoted by the same reference numerals and symbols, duplication of the explanation being omitted. The eleventh embodiment can also achieve basically the same operational effects as those of the first embodiment.

In accordance with the eleventh embodiment, as in the tenth embodiment, no elastic support part is provided on the damper case 17, and the structure of the dynamic damper D can accordingly be simplified.

Moreover, since the damper case 17 is mounted on a rear part (that is, a portion close to the rear end) of the support body 100 formed from an EPP resin, it is possible to mount the dynamic damper D without giving an unpleasant sensation or a disagreeable sensation to an occupant whose head is in contact with a front face of the headrest 4. Furthermore, due to the damper case 17 being mounted on an upper part of the headrest frame 12 (in particular, the linking frame member 12t providing a link between the upper ends of the main frame members 12a) via the support body 100 made of an EPP resin, it is possible to mount the damper case 17 with a high degree of freedom in mounting without being affected by shape, angle, or attitude of the headrest frame 12, thus contributing to an improvement in the degree of freedom in design.

The eleventh embodiment illustrates a case in which part of the damper case 17 is embedded in and retained by the rear part of the support body 100 (that is, the support body 100 is insert molded together with the damper case 17) at the same time as primary molding of the support body 100 made of an EPP resin, but the damper case 17 may be joined and fixed (e.g. adhered or affixed) afterward to a rear face of the support body 100 made of an EPP resin. In this case, an upper part of the headrest frame 12 is embedded in and retained by the support body 100 (that is, the support body 100 is insert molded together with the headrest frame 12) at the same time as primary molding of the support body 100.

FIG. 35 to FIG. 38 show a twelfth embodiment. In the twelfth embodiment, only the headrest frame 12 and the structure via which the damper case 17 is mounted on the headrest frame 12 are different from those of the first embodiment. That is, the headrest frame 12 includes left and right main frame members 12a" supported on the seat back frame 10 via the pair of support tubes 11 as in the first embodiment, but the two main frame members 12a" integrally have, in their upper end parts, a bent frame part 120 that extends while bending forward and inward in the left-and-right direction, and the two bent frame parts 120 are integrally linked to each other via an inverted U-shaped linking frame member 12t' formed from left and right longitudinal pillar parts 121 extending upward from upper ends of the two bent frame parts 120 and a lateral pillar part 122 providing a connection between upper ends of the two longitudinal pillar parts 121. The cushion member 13 is molded so as to cover part of the headrest frame 12 (from an upper part of the main frame member 12a" to the linking frame member 12t') and the damper case 17.

As in the first embodiment, the damper case 17 is divided into two in the fore-and-aft direction, that is, the first and second case half bodies 17A, 17B, and as in the first embodiment one and the other of opposing faces of the two case half bodies 17A, 17B have formed thereon a fitting groove 20 and a fitting projecting wall 21 that can be fitted together. A plurality of linking claws 22 are formed on an extremity part of the fitting projecting wall 21 in upper, lower, left, and right parts of the damper case 17, and a linking hole 23 with which the linking claw 22 can elastically snap-engage is formed in a bottom part of the fitting groove 20.

The first and second elastic support parts 24A, 24B as the mounting arm part are formed integrally with right and left side walls respectively of the first case half body 17A. The first and second elastic support parts 24A, 24B include plate-shaped arms 25a', 25b' protruding outward from the left and right side walls of the first case half body 17A, and gripping claws 26a', 26b' provided so as to be connected to extremity parts of the arms 25a', 25b' and being capable of snap engaging with the left and right longitudinal pillar parts 121 so as to grip them. The gripping claws 26a', 26b', which have a major arc shape, can elastically grip the corresponding longitudinal pillar parts 121 beyond a half of the periphery thereof, and their openings are directed rearward so as to engage with the longitudinal pillar part 121 from the front.

Each of the gripping claws 26a', 26b' is provided with a window hole 29 that can impart thereto an appropriate degree of elasticity. It is possible to check by eye through the window hole 29 the state in which the gripping claws 26a', 26b' are engaged with the longitudinal pillar parts 121. A rib part 80 protruding toward the longitudinal pillar part 121 side is formed integrally with a face, opposing the longitudinal pillar part 121, of the gripping claws 26a', 26b' so as to follow the rear edge of the window hole 29. Since due to the rib part 80 being specially provided, a region via which the gripping claws 26a', 26b' are engaged with the longitudinal pillar parts 121 can be increased in the peripheral direction of the longitudinal pillar part 121, any decrease due to the window hole 29 in the strength via which the gripping claws 26a', 26b' grip the longitudinal pillar parts 121 can be minimized, thus enabling the longitudinal pillar part 121 to appropriately retain the gripping claws 26a', 26b'.

Horizontal reinforcing plate parts 81, 82 are formed integrally with the arms 25a', 25b' of the first and second elastic support parts 24A, 24B, base parts of the gripping claws 26a', 26b', and corresponding outer faces of left and right side walls of the first case half body 17A, the reinforcing plate parts 81, 82 being arranged at intervals in the up-and-down direction in order to integrally provide a join therebetween, and the stiffness of the first and second elastic support parts 24A, 24B can be enhanced by the reinforcing effect of the reinforcing plate parts 81, 82. However, if the reinforcing effect is too strong, elastic deformation of the gripping claws 26a', 26b' in the left-and-right direction is excessively restricted, and since there is a possibility that the operation of mounting the damper case 17 on the headrest frame 12a'' (specifically, the longitudinal pillar part 121) will become difficult, in the present embodiment the reinforcing plate parts 81, 82 are provided with slit-shaped flexible portions 81a, 82a.

Since the flexible portions 81c, 82c allow an appropriate degree of elastic deformation of the gripping claws 26a', 26b' in the left-and-right direction even with the reinforcing plate parts 81, 82 being provided, it is possible to easily carry out the operation of mounting the damper case 17 on the longitudinal pillar part 121 without problems. The structure of the flexible portions 81c, 82c is not limited to that of the embodiment (slit) as long as elastic deformation of the gripping claws 26a', 26b' in the left-and-right direction is facilitated, and for example a thin part formed in part of the reinforcing plate part 81, 82 may be a flexible part.

Furthermore, a positioning support part 30' for reliably positioning and fixing the damper case 17 to the headrest frame 12 is formed integrally with an upper wall of the first case half body 17A. The positioning support part 30' is formed from a plate-shaped arm 30a' rising from a rear part of the upper wall of the first case half body 17A and being inclined upward to the front, and an engagement claw 30b' having a substantially semi arc-shaped cross section, provided so as to be connected to an upper end part of the arm 30a', and capable of abutting against and engaging with the lateral pillar part 122. The engagement claw 30b' abutting against and engaging with the lateral pillar part 122 from the rear and above defines the position in the up-and-down direction at which the gripping claws 26a', 26b' and the longitudinal pillar parts 121 are engaged, thus determining the position where the damper case 17 is mounted on the headrest frame 12.

Furthermore, a recess part 84 is formed in an outer face of the positioning support part 30', in particular a portion straddling an upper half of the arm 30a' and an upper part of the engagement claw 30b'. The recess part 84 is formed so that it gradually becomes deeper in going downward in a rear face of the upper half of the arm 30a', and an upper half front face 85 of the arm 30a' extends vertically downward from a rear end face of the lateral pillar part 122 so as to correspond thereto. A region of engagement between the engagement claw 30b' and the lateral pillar part 122 can thereby be increased in the peripheral direction of the lateral pillar part 122, and it is therefore possible to appropriately engage and retain the engagement claw 30b', and consequently the upper part of the damper case 17, with the lateral pillar part 122. A pair of reinforcing plates 86 are integrally and projectingly provided on a front face of a lower half of the arm 30a' on left and right outer sides of the linking claw 22 and the linking hole 23, which are present in the upper part of the damper case 17, and the two reinforcing plates 86 integrally join the upper half of the arm 30a' and the first case half body 17A, thus enhancing the overall stiffness of the arm 30a'.

The structure of the dynamic damper D of the twelfth embodiment (for example, placement of the weight 15, the first to third elastic members S1 to S3, etc. within the damper case 17, the mounting structure, etc.) is otherwise the same as the dynamic damper D of the first embodiment. Constituent elements of the twelfth embodiment are therefore denoted by the same reference numerals and symbols as those of the corresponding constituent elements of the first embodiment, duplication of the explanation being omitted. The twelfth embodiment can also achieve basically the same operational effects as those of the first embodiment.

Embodiments of the present invention are explained above, and the present invention is not limited to the embodiments and can be modified in a variety of ways as long as the modifications do not depart from the subject matter thereof.

For example, the vehicular seat 1 of the present invention is not limited to one for an automobile and may be one for a railroad car, an aircraft, etc.

The embodiments illustrate a case in which the damper case 17 is formed from a material having stiffness (for example, a hard synthetic resin), but in the present invention it may be formed from a relatively flexible material (for example, a soft shell formed from a flexible synthetic resin).

Furthermore, the embodiments illustrate a case in which both the first and second case half bodies 17A, 17B forming the damper case 17 are formed into a flat box shape having one open end, but in the present invention one of the first and second case half bodies 17A, 17B may be formed into a box shape having an opening and the other may be formed into a lid shape that closes the opening.

Moreover, the embodiments illustrate a case in which open ends of the first and second case half bodies 17A, 17B forming the damper case 17 are detachably and separably joined to each other by engagement and disengagement of the plurality of linking claws 22 and linking holes 23 provided on one and the other of the open ends, but in the present invention edges on one side of the first and second case half bodies 17A, 17B (for example, edges on the upper side) may be hinge-linked to each other, open faces of the two case half bodies 17A, 17B may be opened and closed around the hinge-linking part, and in the open state the weight 15, the elastic members S1 to S3, etc. may be assembled into the damper case 17.

Furthermore, the embodiments illustrate a case in which the elastic members S1 to S3 elastically supporting the weight 15 are supported on the headrest frame 12, the seat back frame 10, or the cushion member 13 via the damper case 17 housing the above, but in the present invention the damper case 17 may be omitted, and the elastic members S1 to S3 elastically supporting the weight 15 may be mounted directly on the headrest frame 12, the seat back frame 10, or the cushion member 13, or may be mounted via a mounting member exclusively used therefor (for example, a mounting stay or a bracket).

Moreover, the embodiments show a case in which the elastic members S1 to S3 are molded into a sheet shape and they are then fixed to the weight 15 so as to cover it, but in the present invention an elastic member may be molded integrally with the periphery of the weight 15.

Furthermore, the embodiments illustrate a case in which an elastic member elastically supporting the weight 15 so that it can vibrate is formed in a divided manner from a plurality of sheet-shaped elastic members S1 to S3, but in the present invention as shown in for example Japanese Patent No. 6110853 the weight 15 may be wrapped with one large sheet-shaped elastic member so as to cover and fix the whole face or main faces of the weight 15.

Moreover, the embodiments show a case in which the headrest 4, which is a component separate from the seat back 3, is mounted thereon afterward, but the present invention may be implemented as a dynamic damper that is provided on a headrest-equipped seat back in which the headrest is integrated with the seat back.

Furthermore, the embodiments show a case in which movement of the weight 15 in the up-and-down direction is restricted by the weight guide part WG (movement restriction means), but the direction of movement to be restricted can be freely set according to the damping target, for example, movement of the weight 15 in the left-and-right direction may be restricted.

The invention claimed is:

1. A dynamic damper comprising a weight, an elastic member that supports the weight so that the weight can vibrate, and a damper case that houses the weight and the elastic member,
    wherein the weight includes:
        an upper end face, a lower end face, and first and second side faces that are continuous from the upper end face and the lower end face and are adjacent to each other; and
        corner parts, wherein each of the corner parts is formed by one of the upper end face and the lower end face, and the first and second side faces,
    wherein the elastic member comprises:
        a first elastic member that covers an outside face between the upper end face and the lower end face of the weight over substantially an entire periphery of the outside face;
        a second elastic member that covers the upper end face of the weight; and
        a third elastic member that covers the lower end face of the weight,
    wherein the first elastic member, the second elastic member and the third elastic member are separate members,
    wherein the dynamic damper comprises a corner part check device for checking at least one of the corner parts,
    wherein the corner part check device is a portion of the elastic member that does not cover the at least one of the corner parts to expose the at least one of the corner parts.

2. The dynamic damper according to claim 1, wherein the second and third elastic members each connect the upper end face and the lower end face of the weight to an inner face of the damper case.

3. The dynamic damper according to claim 1, wherein the corner part check device is formed from a cutout part that is formed in the first elastic member so as to expose the at least one of the corner parts of the weight.

4. The dynamic damper according to claim 1, wherein the first elastic member is formed into an end part shape that exposes at least one end part of the weight that includes at least two of the corner parts, and the end part shape forms the corner part check device.

5. The dynamic damper according to claim 1, wherein the weight is formed so as to have a polygonal cross section, the first elastic member has a bent part that corresponds to a corner of a side face of the weight, and
    the bent part is provided with a bending facilitation device that makes bending of the first elastic member easier via the bent part than via a part other than the bent part.

6. The dynamic damper according to claim 5, wherein the bending facilitation device is formed from a thin part that is formed in part of the first elastic member so as to correspond to a corner of a side face of the weight.

7. The dynamic damper according to claim 1, wherein the first elastic member and the second and third elastic members are formed from different elastic materials.

8. The dynamic damper according to claim 1, wherein the first elastic member is disposed so as to be spaced from at least one of the second and third elastic members.

9. The dynamic damper according to claim 1, wherein a friction-reducing member that is positioned on the side opposite to the weight and abuts against an inner face of the damper case is mounted on the second and third elastic members, and
    the second and third elastic members are disposed in a compressed state between the friction-reducing member and the weight within the damper case.

10. A headrest comprising the dynamic damper according to claim 1, wherein the damper case is retained by a frame or a cushion member of the headrest.

11. A vehicular seat comprising the dynamic damper according to claim 1, wherein the damper case is retained by a cushion member or a frame of at least one of a seat back and a seat cushion.

* * * * *